US009359991B2

(12) United States Patent
Davey et al.

(10) Patent No.: US 9,359,991 B2
(45) Date of Patent: Jun. 7, 2016

(54) ENERGY CONVERSION SYSTEMS AND METHODS

(75) Inventors: Kent Davey, Edgewater, FL (US); Ned R. Hansen, Hyde Park, UT (US); Daniel E. Power, III, Pace, FL (US)

(73) Assignee: Oceana Energy Company, Washington, DC (US)

( * ) Notice: Subject to any disclaimer, the term of this patent is extended or adjusted under 35 U.S.C. 154(b) by 611 days.

(21) Appl. No.: 13/504,472

(22) PCT Filed: Oct. 27, 2010

(86) PCT No.: PCT/US2010/054279
§ 371 (c)(1),
(2), (4) Date: Apr. 26, 2012

(87) PCT Pub. No.: WO2011/059708
PCT Pub. Date: May 19, 2011

(65) Prior Publication Data
US 2012/0211990 A1    Aug. 23, 2012

Related U.S. Application Data

(60) Provisional application No. 61/256,009, filed on Oct. 29, 2009, provisional application No. 61/325,563, filed on Apr. 19, 2010.

(51) Int. Cl.
*F03B 13/10*    (2006.01)
*H02P 9/04*    (2006.01)
(Continued)

(52) U.S. Cl.
CPC ........... *F03B 13/264* (2013.01); *F16C 32/0423* (2013.01); *H02K 7/09* (2013.01);
(Continued)

(58) Field of Classification Search
CPC .............. F03B 3/12; F03B 11/06; F03B 3/06; F03B 3/14; F03B 3/16; Y02E 10/28; H02K 57/003; H02K 35/02; H02K 7/09; H02K 7/1807; Y02T 10/7083; F04D 29/528; H01F 30/04

USPC .............. 290/54, 44, 53, 43, 52, 42, 55, 1 R; 307/151, 84; 415/76, 1; 174/21 JC; 244/153 A; 310/154.1; 318/400.29; 405/76; 74/DIG. 9

See application file for complete search history.

(56) References Cited

U.S. PATENT DOCUMENTS 1,518,022 A    12/1924    Twiford
1,715,291 A    5/1929    Hisle
(Continued)

FOREIGN PATENT DOCUMENTS

CA    2 397 850 A1    2/2004
CN    2372476 Y    4/2000
(Continued)

OTHER PUBLICATIONS

Extended European Search Report for corresponding European Patent Application No. 10830427.0, dated Jun. 10, 2013.
(Continued)

*Primary Examiner* — Tulsidas C Patel
*Assistant Examiner* — Charles Reid, Jr.
(74) *Attorney, Agent, or Firm* — Jones Robb, PLLC

(57) ABSTRACT

An energy conversion system may include a stationary structure, a rotatable structure configured to rotate relative to the stationary structure, wherein the rotatable structure defines an axis of rotation. The system may further include at least one blade member mounted to and extending radially outward from the rotatable structure, the at least one blade member being configured to interact with fluid currents flowing in a direction substantially parallel to the axis of rotation to cause the rotatable structure to rotate about the axis of rotation, and at least one bearing mechanism disposed to provide at least one of a radial and axial bearing between the rotatable structure and the stationary structure as the rotatable structure rotates about the stationary structure. The system may be configured to convert rotation of the rotatable structure to at least one of electricity and hydrogen production.

20 Claims, 43 Drawing Sheets

(51) Int. Cl.
  *F03B 13/00*  (2006.01)
  *F03B 13/26*  (2006.01)
  *F16C 32/04*  (2006.01)
  *H02K 7/09*   (2006.01)
  *H02K 7/18*   (2006.01)

(52) U.S. Cl.
  CPC .......... *H02K 7/1823* (2013.01); *F05B 2220/61* (2013.01); *F05B 2220/706* (2013.01); *F05B 2240/511* (2013.01); *F05B 2240/52* (2013.01); *F05B 2240/54* (2013.01); *F16C 2360/31* (2013.01); *Y02E 10/28* (2013.01); *Y02E 70/10* (2013.01); *Y02P 70/527* (2015.11)

(56) References Cited

U.S. PATENT DOCUMENTS

| | | | |
|---|---|---|---|
| 1,791,731 A | 2/1931 | Madarasz | |
| 1,923,971 A | 8/1933 | Evans | |
| 1,997,149 A | 4/1935 | Lake | |
| 2,375,286 A | 5/1945 | Creed | |
| 2,650,558 A | 9/1953 | Nizery | |
| 3,379,157 A | 4/1968 | Post | |
| 3,504,988 A | 4/1970 | Stenner | |
| 3,673,974 A | 7/1972 | Harper | |
| 3,730,122 A | 5/1973 | Odum et al. | |
| 3,791,327 A | 2/1974 | Deveney | |
| 3,872,679 A | 3/1975 | Fischer | |
| 3,895,495 A | 7/1975 | Akazaki et al. | |
| 3,912,937 A | 10/1975 | Lesser | |
| 3,943,644 A | 3/1976 | Walz | |
| 3,952,723 A | 4/1976 | Browning | |
| 3,986,787 A | 10/1976 | Mouton, Jr. et al. | |
| 3,992,125 A | 11/1976 | Schilling | |
| 4,084,529 A | 4/1978 | Katernberg | |
| 4,163,904 A | 8/1979 | Skendrovic | |
| 4,168,439 A | 9/1979 | Palma | |
| 4,224,527 A | 9/1980 | Thompson | |
| 4,248,044 A | 2/1981 | Woodilla | |
| 4,276,851 A | 7/1981 | Coleman | |
| 4,306,157 A | 12/1981 | Wracsaricht | |
| 4,313,059 A | 1/1982 | Howard | |
| 4,335,093 A | 6/1982 | Salomon | |
| 4,335,319 A | 6/1982 | Mettersheimer, Jr. | |
| 4,383,182 A | 5/1983 | Bowley | |
| 4,422,799 A | 12/1983 | Green et al. | |
| 4,472,149 A | 9/1984 | Ballantine | |
| 4,500,259 A | 2/1985 | Schumacher | |
| 4,582,582 A | 4/1986 | Gibbard | |
| 4,756,666 A | 7/1988 | Labrador | |
| 4,832,569 A | 5/1989 | Samuelsen et al. | |
| 4,850,190 A | 7/1989 | Pitts | |
| 4,913,059 A | 4/1990 | Fujie et al. | |
| 5,117,774 A | 6/1992 | English et al. | |
| 5,177,387 A | 1/1993 | McMichael et al. | |
| 5,245,270 A * | 9/1993 | Akiyama | 322/4 |
| 5,317,976 A | 6/1994 | Aruga et al. | |
| 5,394,044 A * | 2/1995 | Yamamura | 310/90.5 |
| 5,440,176 A | 8/1995 | Haining | |
| 5,481,146 A | 1/1996 | Davey | |
| 5,511,488 A | 4/1996 | Powell et al. | |
| 5,521,448 A * | 5/1996 | Tecza et al. | 310/90.5 |
| 5,525,849 A * | 6/1996 | Ito et al. | 310/90.5 |
| 5,592,816 A | 1/1997 | Williams | |
| 5,679,992 A * | 10/1997 | Miyamoto et al. | 310/90.5 |
| 5,710,469 A | 1/1998 | Ries | |
| 5,722,326 A * | 3/1998 | Post | 104/281 |
| 5,747,426 A | 5/1998 | Abboud | |
| 5,758,911 A | 6/1998 | Gerhardt | |
| 5,783,885 A * | 7/1998 | Post | 310/90.5 |
| 5,847,480 A * | 12/1998 | Post | 310/90.5 |
| 5,910,695 A * | 6/1999 | Lotz | 310/90.5 |
| 5,953,996 A | 9/1999 | Powell et al. | |
| 5,966,986 A * | 10/1999 | Laul | 74/84 R |
| 5,992,341 A | 11/1999 | Gerhardt | |
| 6,006,518 A | 12/1999 | Geary | |
| 6,044,770 A | 4/2000 | Davey et al. | |
| 6,100,600 A | 8/2000 | Pflanz | |
| 6,104,097 A | 8/2000 | Lehoczky | |
| 6,109,863 A | 8/2000 | Milliken | |
| 6,111,332 A * | 8/2000 | Post | 310/90.5 |
| 6,147,415 A * | 11/2000 | Fukada | 290/55 |
| 6,250,230 B1 | 6/2001 | Post | |
| 6,327,994 B1 | 12/2001 | Labrador | |
| 6,357,359 B1 | 3/2002 | Davey et al. | |
| 6,371,697 B2 | 4/2002 | Huang | |
| 6,393,993 B1 * | 5/2002 | Reese | 104/130.01 |
| 6,404,088 B1 * | 6/2002 | Barada et al. | 310/90.5 |
| 6,498,402 B2 | 12/2002 | Saiz | |
| 6,511,261 B2 | 1/2003 | de Waard | |
| 6,531,788 B2 | 3/2003 | Robson | |
| 6,534,881 B1 | 3/2003 | Slavchev | |
| 6,551,053 B1 | 4/2003 | Schuetz | |
| 6,629,503 B2 | 10/2003 | Post | |
| 6,629,815 B2 | 10/2003 | Lusk | |
| 6,633,217 B2 | 10/2003 | Post | |
| 6,647,716 B2 | 11/2003 | Boyd | |
| 6,648,589 B2 | 11/2003 | Williams | |
| RE38,336 E | 12/2003 | Williams | |
| 6,664,880 B2 * | 12/2003 | Post | 335/306 |
| 6,703,720 B1 | 3/2004 | Ferraro | |
| 6,729,840 B2 | 5/2004 | Williams | |
| 6,734,576 B2 | 5/2004 | Pacheco | |
| 6,758,146 B2 * | 7/2004 | Post | 104/281 |
| 6,781,253 B2 | 8/2004 | Newman | |
| 6,791,206 B1 | 9/2004 | Woodbridge | |
| 6,806,586 B2 | 10/2004 | Wobben | |
| 6,827,022 B2 | 12/2004 | Van Den Bergh et al. | |
| 6,831,374 B2 * | 12/2004 | Seki | 290/44 |
| 6,846,167 B2 * | 1/2005 | Jaisle | 417/407 |
| 6,849,963 B2 | 2/2005 | Grinsted et al. | |
| 6,856,036 B2 | 2/2005 | Belinsky | |
| 6,899,036 B2 | 5/2005 | Lamb et al. | |
| 6,914,361 B2 * | 7/2005 | Beyer et al. | 310/90.5 |
| 6,918,350 B1 | 7/2005 | Morse | |
| 6,941,883 B2 | 9/2005 | Nguyen | |
| 6,955,049 B2 | 10/2005 | Krouse | |
| 6,982,498 B2 | 1/2006 | Tharp | |
| 6,983,701 B2 | 1/2006 | Thornton et al. | |
| 6,995,479 B2 | 2/2006 | Tharp | |
| 6,998,730 B2 | 2/2006 | Tharp | |
| 7,011,501 B2 | 3/2006 | Lindberg | |
| 7,075,191 B2 | 7/2006 | Davison | |
| 7,077,072 B2 | 7/2006 | Wingett et al. | |
| 7,096,794 B2 | 8/2006 | Post | |
| 7,146,918 B2 | 12/2006 | Meller | |
| 7,190,087 B2 | 3/2007 | Williams | |
| 7,228,812 B2 | 6/2007 | Morse | |
| 7,298,056 B2 | 11/2007 | Gizara | |
| 7,397,144 B1 * | 7/2008 | Brostmeyer et al. | 290/53 |
| 7,417,334 B2 | 8/2008 | Uchiyama | |
| 7,453,166 B2 | 11/2008 | Power, III et al. | |
| 7,462,950 B2 * | 12/2008 | Hu | 290/55 |
| 7,604,454 B2 | 10/2009 | Power, III et al. | |
| 7,633,177 B2 * | 12/2009 | Platt | 290/54 |
| 8,174,135 B1 * | 5/2012 | Roe et al. | 290/44 |
| 2002/0034437 A1 | 3/2002 | Williams | |
| 2002/0036435 A1 * | 3/2002 | Ooyama et al. | 310/90.5 |
| 2002/0158472 A1 | 10/2002 | Robson | |
| 2003/0005851 A1 | 1/2003 | Post | |
| 2003/0042812 A1 * | 3/2003 | Post | 310/90.5 |
| 2003/0042816 A1 * | 3/2003 | Post | 310/191 |
| 2003/0112105 A1 | 6/2003 | Post | |
| 2003/0201645 A1 | 10/2003 | Pacheco | |
| 2003/0217668 A1 | 11/2003 | Fiske et al. | |
| 2004/0119358 A1 | 6/2004 | Thornton et al. | |
| 2004/0123766 A1 | 7/2004 | Van Den Bergh et al. | |
| 2005/0005592 A1 * | 1/2005 | Fielder | 60/200.1 |
| 2005/0031442 A1 | 2/2005 | Williams | |
| 2005/0204948 A1 * | 9/2005 | Post | 104/281 |
| 2005/0265820 A1 | 12/2005 | Williams | |
| 2005/0269822 A1 | 12/2005 | Kinpara et al. | |
| 2005/0285404 A1 | 12/2005 | Tharp | |
| 2005/0285405 A1 | 12/2005 | Tharp | |

(56) References Cited

U.S. PATENT DOCUMENTS

| | | | |
|---|---|---|---|
| 2006/0016365 A1 | 1/2006 | Baldi et al. | |
| 2006/0214525 A1 | 9/2006 | Jansen et al. | |
| 2006/0251510 A1 | 11/2006 | Gray et al. | |
| 2007/0018460 A1 | 1/2007 | Williams | |
| 2007/0063520 A1 | 3/2007 | Ahmad | |
| 2007/0205854 A1* | 9/2007 | Kazadi | 335/306 |
| 2007/0228736 A1 | 10/2007 | Smushkovich | |
| 2007/0278796 A1 | 12/2007 | Power, III et al. | |
| 2008/0038061 A1 | 2/2008 | Morse | |
| 2008/0054741 A1* | 3/2008 | Oyama | 310/68 A |
| 2008/0088135 A1 | 4/2008 | Vidal et al. | |
| 2008/0122308 A1* | 5/2008 | Mleux | 310/90.5 |
| 2008/0143205 A1* | 6/2008 | Pulnikov et al. | 310/90.5 |
| 2008/0174117 A1* | 7/2008 | Hirabayashi | 290/48 |
| 2008/0174119 A1* | 7/2008 | Hu | 290/55 |
| 2009/0146515 A1* | 6/2009 | Popov et al. | 310/90.5 |
| 2014/0353971 A1 | 12/2014 | Davey | |

FOREIGN PATENT DOCUMENTS

| | | | |
|---|---|---|---|
| CN | 101460736 A | | 6/2009 |
| DE | 3332054 A1 | | 3/1985 |
| DE | 3638129 A1 | * | 5/1988 |
| DE | 4033078 A1 | | 4/1992 |
| DE | 19757121 A1 | | 7/1999 |
| DE | 20102029 U1 | | 6/2001 |
| EP | 1650432 A1 | | 4/2006 |
| EP | 1 885 047 A1 | | 2/2008 |
| EP | 2 112 370 A1 | | 10/2009 |
| FR | 2297333 A1 | | 8/1976 |
| GB | 2018687 A | | 10/1979 |
| GB | 2142596 A | | 1/1985 |
| JP | 56-057590 A | | 5/1981 |
| JP | 58-122287 A | | 7/1983 |
| JP | 59-206284 A | | 11/1984 |
| JP | 62-131895 A | | 6/1987 |
| JP | 62-131896 A | | 6/1987 |
| JP | 62-184995 A | | 8/1987 |
| JP | 02-229915 A | | 9/1990 |
| JP | 5-221382 A | | 8/1993 |
| JP | 5-238475 A | | 9/1993 |
| JP | 6-99888 A | | 4/1994 |
| JP | 08-210350 A | | 8/1996 |
| JP | 2003-307103 A | | 10/2003 |
| JP | 2004-023821 A | | 1/2004 |
| JP | 2005-348582 A | | 12/2005 |
| RU | 2197640 C2 | | 1/2003 |
| RU | 2247861 C1 | | 3/2005 |
| WO | 00/45050 | | 8/2000 |
| WO | 02/02934 A1 | | 1/2002 |
| WO | 2005/028857 A1 | | 3/2005 |
| WO | 2005/080789 A1 | | 9/2005 |
| WO | WO 2007/043894 A1 | | 4/2007 |
| WO | 2008021569 A2 | | 2/2008 |
| WO | 2008/127114 A1 | | 10/2008 |
| WO | WO 2008130940 A1 | * | 10/2008 |
| WO | WO 2009/007044 A2 | | 1/2009 |
| WO | WO 2009/130020 A1 | | 10/2009 |
| WO | 2011/059708 A2 | | 5/2011 |

OTHER PUBLICATIONS

First Examination Report for corresponding New Zealand Patent Application No. 599288, dated Jan. 29, 2013.
Notification of First Office Action for corresponding Chinese Patent Application No. 201080048984.0, dated Jun. 5, 2014.
Translation of Notification of First Office Action for corresponding Chinese Patent Application No. 201080048984.0, original document dated Jun. 5, 2014.
International Search Report for corresponding International Application No. PCT/US2010/054279, dated Jun. 1, 2011.
Written Opinion of the International Searching Authority for corresponding International Application No. PCT/US2010/054279, dated Jun. 1, 2011.
Official Notice of Rejection mailed Sep. 30, 2014 issued in corresponding Japanese Patent Application No. 2012-536999 (6 pages).
Translation of Offical Notice of Rejection in corresponding Japanese Patent Application No. 2012-536999, original document mailed Sep. 30, 2014.
Arnie Heller, "A New Approach for Magnetically Levitating Trains-and Rockets," Science & Technology Review, Lawrence Livermore National Laboratory, pp. 20-22, Jun. 1998.
International Search Report from related International Application No. PCT/US2007/013554, dated Feb. 1, 2008.
Written Opinion of the International Searching Authority from related International Application No. PCT/US2007/013554, dated Feb. 1, 2008.
International Search Report from related International Patent Application No. PCT/US2012/050814, dated Feb. 27, 2013.
Written Opinion from related International Patent Application No. PCT/US2012/050814, dated Feb. 27, 2013.
S. Earnshaw, "On the nature of the molecular forces which regulate the constitution of the luminiferous either," Trans. Cambridge Philosophical Soc., vol. VII , part 1, pp. 97-112, Mar. 18, 1839.
Notification of Second Office Action for corresponding Chinese Patent Application No. 201080048984.0, dated Jan. 26, 2015, with an English Translation.
Notification of Third Office Action for related Chinese Patent Application No. 201080048984.0, dated Jul. 13, 2015, with an English Translation.
Patent Examination Report No. 1 for corresponding Australian Patent Application No. 2010319904, dated Jul. 27, 2015.
Extended European Search Report for related European Application No. 12823908.4, dated Nov. 20, 2015.
Official Notice of Final Decision of Rejection for corresponding Japanese Application No. 2012-536999, dated Sep. 8, 2015.
Notification of the First Office Action for related Chinese Application No. 201280048504.X, dated Nov. 2, 2015.

* cited by examiner

# ENERGY CONVERSION SYSTEMS AND METHODS

This application claims the benefit of U.S. Provisional Application No. 61/256,009, filed Oct. 29, 2009, and U.S. Provisional Application No. 61/325,563, filed Apr. 19, 2010, which are incorporated by reference herein in their entirety.

TECHNICAL FIELD

The present teachings relate generally to energy conversion systems that convert the kinetic energy from fluid flow, such as, for example, from liquid currents, to another form of energy, such as, for example, electricity and/or hydrogen production.

INTRODUCTION

The section headings used herein are for organizational purposes only and are not to be construed as limiting the subject matter described in any way.

Electricity generation using systems that convert energy from fluid currents, for example, wind or water currents, is well known. Tidal power exploits the movement of water caused by tidal currents, or the rise and fall in sea levels due to tides. As the waters rise and then fall, a flow, or current, is generated. Additional forms of differential pressure, such as, for example, that created by dams, can also cause water to flow, and create water speeds sufficient to enable the conversion of energy associated with the water's flow to other useful forms of energy.

Tidal power, which relies on the natural movement of currents in a body of liquid (e.g., water), is classified as a renewable energy source. Unlike other renewable energy sources, such as wind and solar power, however, tidal power is reliably predictable. Water currents are a source of renewable power that is clean, reliable, and predictable years in advance, thereby facilitating integration with existing energy grids. Additionally, by virtue of the basic physical characteristics of water (including, e.g., seawater), namely, its density (which can be 832 times that of air) and its non-compressibility, this medium holds unique, "ultra-high-energy-density" potential, in comparison to other renewable energy sources, for generating renewable energy. This potential is amplified with the volume and flow rates present in many coastal locations and/or useable locations worldwide are factored in.

Tidal power, therefore, may offer an efficient, long-term source of pollution-free electricity, hydrogen production, and/or other useful forms of energy that can help reduce the world's current reliance upon petroleum, natural gas, and coal. Reduced consumption of fossil fuel resources can in turn help to decrease the output of greenhouse gases into the world's atmosphere.

Some recent tidal power schemes rely on the use of the kinetic energy of moving water to power turbine-like structures. Such systems can act like underwater windmills, and have a relatively low cost and ecological impact. In some energy conversion systems, fluid flow interacts with blades that rotate about an axis and that rotation is harnessed to thereby produce electricity or other forms of energy. While many such energy conversion systems employ blades or similar structures mounted to a central rotating shaft, other systems utilize a shaftless configuration with the blades being supported by other means. This shaftless (or open-center) configuration may offer various desirable features not readily offered by the designs that employ a central rotating shaft. Such features offered by the shaftless design may include, for example, a reduction of the overall drag on the device thus reducing the structural requirements in anchoring the device in the current; a free fluid flow through the central portion of the device thus permitting passage of fish and other sea life therethrough; a structural support of the blades that can result in lighter and stronger blades; an ability to scale the device up or down in size thus allowing greater energy collection by each device; and an ability to construct the devices using modular components thus making it easier to construct and change out those parts when maintenance is required.

Energy conversion systems can pose challenges relating to the stress and/or strain on the various components of such systems resulting from the interaction of the relatively strong forces associated with fluid flow (e.g., moving currents). For example, as a fluid current (e.g., tidal current) interacts with an energy conversion system, there is an amount of thrust that acts on the various components, which may cause displacement of one or more components, particularly components configured to move relative to stationary components. Additional challenges may arise from such energy conversion systems' reliance on relative rotational movement of components to produce energy. For example, friction and/or drag associated with rotational movement of such systems may hinder efficiency of the system. Moreover, such relative motion can, for example, cause wear of such components, which may be exacerbated when an energy conversion systems is placed underwater, for example, in a sea or other body of water containing relatively harsh, deteriorative substances (e.g., salt).

It may, therefore, be desirable to provide an energy conversion system and method that can withstand the forces associated with fluid flow interacting therewith. It also may be desirable to provide an energy conversion system and method that results in relatively low friction and/or drag effect to thereby promote overall efficiency of energy conversion. It also may be desirable to provide an energy conversion system and method that reduces wear of moving components. Further, it may be desirable to provide an energy conversion system and method that provides a support mechanism (e.g., bearing) between components that move relative to each other that also may serve as a mechanism to produce electricity.

SUMMARY

The present teachings may solve one or more of the above-mentioned problems and/or achieve one or more of the above-mentioned desirable features. Other features and/or advantages may become apparent from the description which follows.

In accordance with an exemplary embodiment, the present teachings contemplate an energy conversion system that may include a stationary structure, and a rotatable structure configured to rotate relative to the stationary structure, wherein the rotatable structure defines an axis of rotation. The system may further include at least one blade member mounted to and extending radially outward from the rotatable structure, the at least one blade member being configured to interact with fluid currents flowing in a direction substantially parallel to the axis of rotation to cause the rotatable structure to rotate about the axis of rotation, and at least one bearing mechanism disposed to provide at least one of a radial and axial bearing between the rotatable structure and the stationary structure as the rotatable structure rotates about the stationary structure. The system may be configured to convert rotation of the rotatable structure to at least one of electricity and hydrogen production.

In accordance with another exemplary embodiment, the present teachings contemplate a method of converting fluid current movement to another form of energy, the method comprising placing an energy conversion system in a fluid body, the energy conversion system including a stationary structure, a rotatable structure configured to rotate relative to the stationary structure, the rotatable structure defining an axis of rotation, and at least one magnetic bearing mechanism disposed to provide at least one of a radial and axial bearing between the rotatable structure and the stationary structure as the rotatable structure rotates about the stationary structure. The method may further include orienting the energy conversion system in the fluid body so that fluid currents in the fluid body flow in a direction substantially parallel to the axis of rotation and cause rotation of the rotatable structure and generating at least one of electricity and hydrogen by movement of the at least one magnetic bearing mechanism relative to an electrically conductive element during the rotation of the rotatable structure.

Additional objects and advantages will be set forth in part in the description which follows, and in part will be obvious from the description, or may be learned by practice of the present teachings. At least some of the objects and advantages of the present teachings may be realized and attained by means of the elements and combinations particularly pointed out in the appended claims.

It is to be understood that both the foregoing general description and the following detailed description are exemplary and explanatory only and are not restrictive of the invention, as claimed. It should be understood that the invention, in its broadest sense, could be practiced without having one or more features of these exemplary aspects and embodiments.

BRIEF DESCRIPTION OF DRAWINGS

The accompanying drawings, which are incorporated in and constitute a part of this specification, illustrate some exemplary embodiments of the present teachings and together with the description, serve to explain certain principles. In the drawings.

DESCRIPTION OF EXEMPLARY EMBODIMENTS

Figure 1:
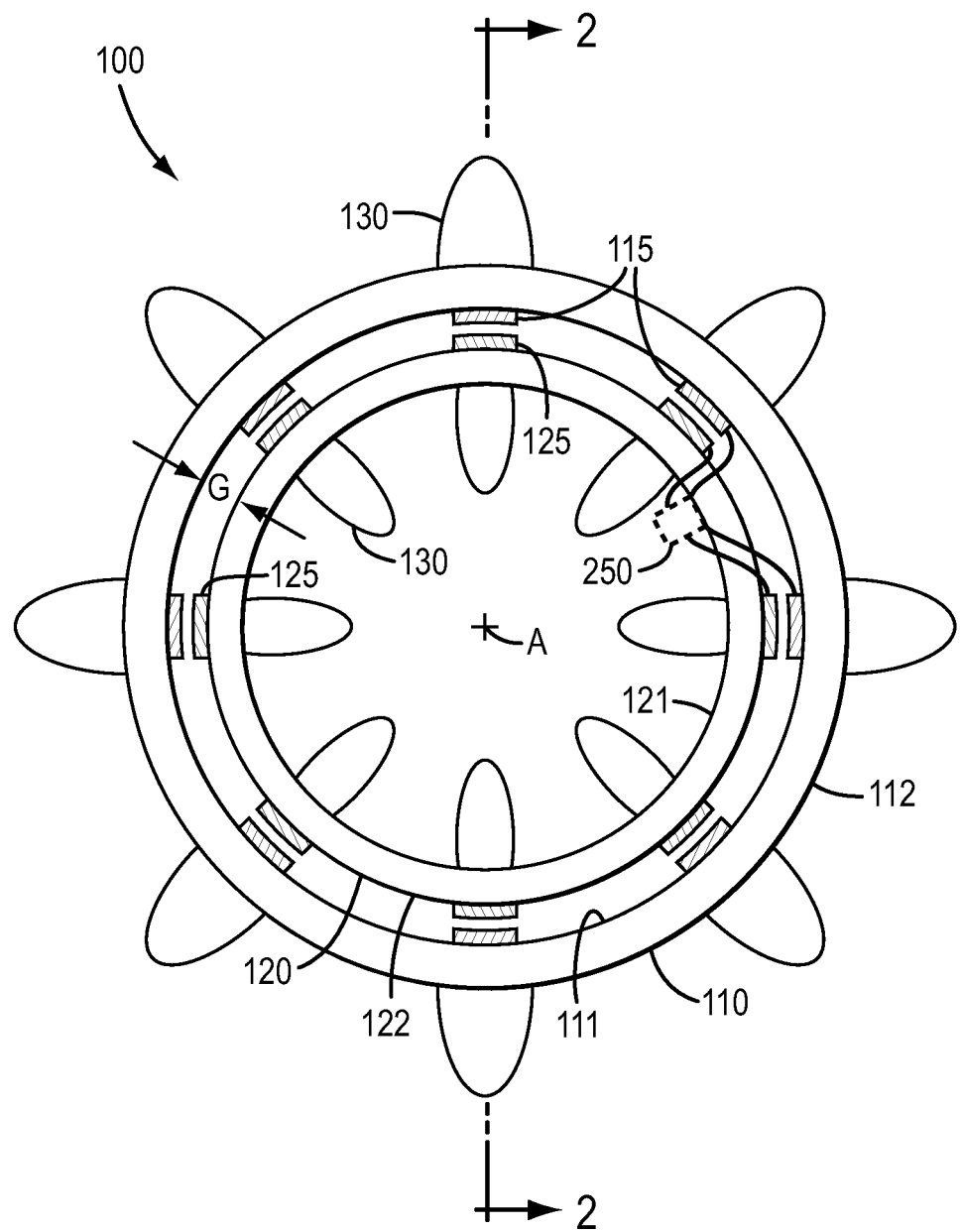
FIG. 1 is a plan view of an exemplary embodiment of an energy conversion system in accordance with the present teachings.

Reference will now be made in detail to various exemplary embodiments of the present teachings, examples of which are illustrated in the accompanying drawings. Wherever possible, the same reference numbers will be used throughout the drawings to refer to the same or like parts.

Various exemplary embodiments of the present teachings contemplate an energy conversion system configured to interact with fluid streams, such as, for example, tidal currents, that utilizes an open-center configuration and relative movement of components of the system to convert kinetic energy from fluid flow into other useful forms of energy, such as, for example, electricity and/or hydrogen production. In various exemplary embodiments, the present teachings contemplate one or more blade members supported by and extending radially outwardly and/or inwardly from a rotatable structure that is rotatably mounted relative to a stationary structure. Fluid flowing past the system may interact with the blades to cause rotational movement of the one or more blades and rotatable structure supporting the blades relative to the stationary structure. In various exemplary embodiments, as shown in the figures, the rotatable structure and the stationary structure can be closed-loop structures (e.g., having a ring or elliptical configuration). Further, either of the rotatable closed-loop or stationary closed-loop structures of the present teachings may be in the form of a unitary closed-loop structure or may comprise a plurality of modular segments (e.g., substantially arcuate-shaped segments) connected together to form an integral closed-loop structure. As would be understand by those of ordinary skill in the art, however, the embodiments shown are exemplary only and are not intended to be limiting of the present teachings and claims. Accordingly, the rotatable structure and the stationary structure may comprise various shapes and/or configurations.

Although in various exemplary embodiments shown and described herein, a plurality of blades are supported by the rotatable structure, any number of blades, including one, may be supported by the rotatable structure. Moreover, blades may extend radially outward from, radially inward toward, or both radially outward and radially inward toward a center of the open-center energy conversion system.

Open-center energy conversion systems, such as those in accordance with the present teachings, may offer the ability to scale up or down the overall size of the system as the gage, length, and path configuration of the stationary structure can vary greatly. Likewise, the strength, size, and shape of the blades also may vary significantly. This is in contrast with central shaft systems, where the size of the blades can be somewhat limited due to the stresses associated with longer blades supported by a central rotating shaft. In exemplary embodiments of the present teachings, the length and size of the blades can vary greatly since they are mounted to a rotatable structure that is disposed at a distance from the center of rotation of the device which offers increased stability compared to a central shaft. Therefore, the entire device can be scaled up or down to accommodate varying site characteristics and other requirements and/or to achieve desired results.

Support and movement of the rotatable structure relative to and along the stationary structure may be accomplished by one or more bearing mechanisms. In various exemplary embodiments of the present teachings, one or more bearing mechanisms may be provided to substantially maintain the relative position, for example, in an axial direction and/or a radial direction, of the rotatable structure and the stationary structure. Bearing mechanisms in accordance with the present teachings may be configured to provide relatively low friction between the moving (e.g., rotating) and stationary structures to promote efficiency. Moreover, bearing mechanisms in accordance with the present teachings may be configured to withstand a relatively harsh environment, such as, for example, underwater environments, by reducing the number of moving components and/or wear.

In various embodiments of the present teachings, for example, one or more magnetic bearing mechanisms may be provided to substantially maintain the relative position, in an axial direction, of the rotatable structure and the stationary structure. To provide an axial restoring force between the rotatable structure and the stationary structure (i.e., to offset axial flow thrust forces), magnetic bearing mechanisms in various exemplary embodiments in accordance with the present teaching may comprise a plurality of magnets arranged in a Halbach type array. In various additional exemplary embodiments of the present teachings, the magnetic bearing mechanisms may also serve as a mechanism to produce electricity, for example in conjunction with electrical conductor mechanisms.

As would be understood by those of ordinary skill in the art, as used herein, the term "Halbach type array" refers to a rotating pattern of permanent magnets, which augments the magnetic field on one side of the array, while cancelling the magnetic field on the other side of the array (i.e., creating a "one-sided flux"). Non-limiting, exemplary Halbach type arrays may include, for example, 90 degree Halbach arrays (i.e., arrays with a 90 degree rotation pattern) and 45 degree Halbach arrays (i.e., arrays with a 45 degree rotation pattern). The present teachings contemplate, however, using any type of Halbach array known to those of ordinary skill in the art.

Figure 2:
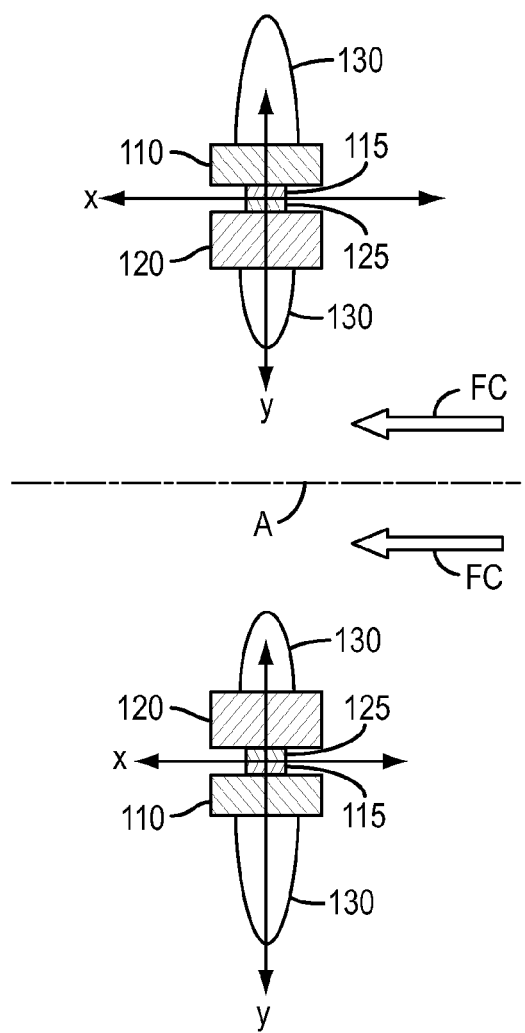
FIG. 2 is a cross-sectional view taken through line 2-2 of the energy conversion system of FIG. 1.

With reference now to FIGS. 1 and 2, a schematic plan view and cross-sectional view (taken through line 2-2 of the energy recovery system of FIG. 1) of an exemplary embodiment of an energy conversion system 100 having an open center configuration is shown. The energy conversion system 100 includes a rotatable structure 110 to which one or more blade members 130 (a plurality being shown in FIG. 1) are mounted. The rotatable closed-loop structure 110 has an inner surface 111 and an outer surface 112 and is rotatably mounted relative to (e.g., around the outer periphery thereof in the exemplary embodiment of FIG. 1) a stationary closed-loop structure 120 having an inner surface 121 and an outer surface 122. The blade members 130 are configured and positioned relative to the rotatable structure 110 such that fluid currents may interact with the blade members 130 to cause the rotatable structure 110 with the blade members 130 carried thereby to rotate in a manner with which those ordinarily skilled in the art are familiar. For example, the blade members 130 may be hydrofoils configured to interact with fluid currents (designated as FC in FIG. 2) moving in a direction substantially perpendicular to a plane of rotation of the blade members 130 and the rotatable structure 110 (and substantially parallel to an axis A of rotation of the blade members 130 and rotatable structure 110). In other words, in the orientation of the system 100 in FIG. 1, the blade members 130 may be configured to interact with fluid currents FC having a component moving in a direction substantially perpendicular to the plane of the drawing sheet.

The rotational movement caused by interaction of fluid currents with the blade members 130 may be converted to another form of energy, such as, for example, electricity and/or hydrogen production. Such conversion of the rotational movement to another form of energy may occur via numerous techniques those having skill in the art would be familiar with, some of which are described in further detail below. Reference also is made to U.S. Pat. No. 7,453,166, incorporated herein by reference in its entirety.

To rotatably mount the rotatable structure 110 relative to the stationary structure 120, the energy conversion system of FIG. 1 may include one or more sets of bearing mechanisms 115, 125 (a plurality of sets being depicted in the exemplary embodiment of FIGS. 1 and 2). Each set may comprise at least one bearing mechanism 115 associated respectively with the rotatable structure 110 and at least one bearing mechanism 125 associated with the stationary structure 120. The bearing mechanisms 115 and 125, as will be explained in further detail below may be configured to cooperate with each other; as such, the bearing mechanism 115 and the bearing mechanism 125 may comprise differing structures that are configured to cooperate with one another to form a bearing that permits the rotatable structure 110 to rotate relative to the stationary structure 120 in a substantially stable position (e.g., radial and/or axial position).

In various exemplary embodiments in accordance with the present teachings, the bearing mechanisms 115 and 125 may be configured as a magnetic bearing mechanism. That is, the bearing mechanisms 115 and 125 may establish a magnetic field sufficient to levitate (e.g., float) the rotatable structure 110 relative to the stationary structure 120 so that the rotatable structure 110 can rotate relative to the stationary structure 120. The magnetic field created between the sets of bearing mechanisms 115 and 125 may be sufficient to maintain a spacing (e.g., radial spacing) between the rotatable structure 110 and the stationary structure 120. More specifically, the magnetic field may be sufficient to maintain a spacing (i.e., gap) G between opposing surfaces of the structures 110 and 120 (in other words, the interface), for example, in FIG. 1 between the outer surface 122 of the stationary structure 120 and the inner surface 111 of the rotatable structure 110.

As explained in more detail below, with reference to FIG. 11, the magnetic bearing mechanism comprising the bearing mechanisms 115 and 125 may further be configured to substantially maintain a relative axial positioning of the rotatable structure 110 and the stationary structure 120. For example, the magnetic field between the bearing mechanisms 115 and 125 may be sufficient to substantially prevent movement of either the rotatable structure 110 and/or the stationary structure 120 in the axial direction as a result of the force associated with the fluid current FC (e.g., the thrust of the fluid current) acting thereon. That is, as explained above, when the energy conversion system 100 is positioned relative to a fluid current FC moving substantially parallel to the axis A (e.g., substantially perpendicular to the plane of the sheet of FIG. 1), the magnetic field established between the bearing mechanisms 115 and 125 may generate a force sufficient to substantially prevent movement of the rotatable structure 110 or the stationary structure 120 as a result of the force of the current.

In various exemplary embodiments in accordance with the present teachings, the bearing mechanisms 115 and 125 may comprise permanent magnets that are configured to repel each other to substantially maintain the spacing G between the rotatable structure 110 and the stationary structure 120. In the case of bearing mechanisms 115 and 125 comprising permanent magnets, the magnetic field (and thus the repelling force) may be established even when the rotatable structure 110 and the stationary structure 120 are not moving relative to each other.

In various other exemplary embodiments, the bearing mechanisms 115 and 125 may be cooperating structures configured to establish a dynamic magnetic field, and thereby achieve magnetic levitation. That is, the bearing mechanisms 115 and 125 may be configured to establish a magnetic field therebetween by virtue of the relative movement of the rotatable structure 110 and the stationary structure 120. By way of example, one of the bearing mechanisms 115 and 125 may comprise an array of magnets and the other of the bearing mechanisms 115 and 125 may comprise one or more conductors, (e.g., a conductive coil or a linear conductive member). In one exemplary embodiment, the bearing mechanisms 115 mounted on the rotatable structure 110 may comprise an array of magnets and the bearing mechanisms 125 mounted to the stationary structure 120 may comprise a conductive coil. However, in an alternative embodiment, the bearing mechanisms 115 mounted on the rotatable structure 110 may comprise a conductive coil and the bearing mechanisms 125 mounted on the stationary structure 120 may comprise a magnetic array. In various exemplary embodiments, the array of magnets may be a Halbach array.

The bearing mechanisms 115 and 125 may comprise structures configured to achieve magnetic levitation by any mechanisms known to those skilled in the art of magnetic levitation technology and those described above are exemplary only. Those having skill in the art would understand how to modify the structures of 115 and 125 to achieve magnetic levitation of the rotatable structure 110 relative to the stationary structure 120, and would understand that the structures 115 and 125 shown are schematic representations only. The number, shape, spacing, size, magnetic field strength, and other properties of the bearing mechanisms 115 and 125 may be selected based on various factors such as the size and weight of the rotatable and stationary structures 110, 120, the required levitation and bearing forces, and other factors based on the desired application.

In various exemplary embodiments wherein the bearing mechanisms 115 and 125 comprise a magnet and an electrical conductor, one or more of the sets of bearing mechanisms 115 and 125 also may be configured to generate electricity upon relative motion of the bearing mechanisms 115 and 125 in a manner known to those ordinarily skilled in the art. For example, if a bearing mechanism 115 is configured as an array of magnets and a bearing mechanism 125 is configured as a conductive coil, motion of those bearing mechanisms relative to one another due to rotation of the rotatable structure 110 relative to the stationary structure 120 may generate a voltage in the conductive loop which can be drawn off through the use of electrical leads (not shown) for electricity generation. In a case wherein the conductors are mounted on the rotatable structure, it may be necessary to use a slip ring, sliding connectors, or other type of rotary electrical interface (not shown) to make the electrical connection to the conductive coils. Those ordinarily skilled in the art have familiarity with the use of slip rings and other rotary electrical interface devices to establish electrical connections with rotating electrical components.

Figure 3:
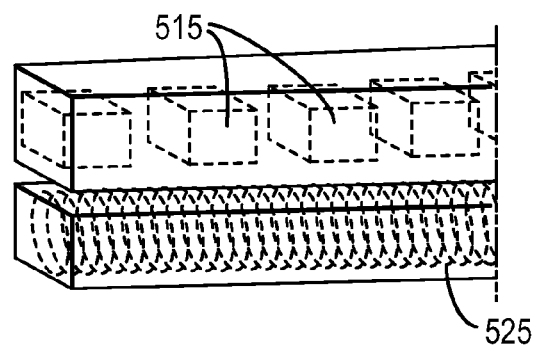
FIG. 3 is a partial perspective view of an exemplary embodiment of an array of magnets with a conductive coil for use with exemplary embodiments of the present teachings.

FIG. 3 illustrates an exemplary embodiment of a set of bearing mechanisms in which one of the set bearing mechanisms comprises an array of magnets 515 and the other of the set of bearing mechanisms comprises an electrically conductive coil 525.

In accordance with various other exemplary embodiments, the bearing mechanisms 115 and 125 of FIG. 1 may be configured as fluid bearing mechanisms. That is, one or more sets of bearing mechanisms 115 and 125 may support the load of the rotatable structure 110 as it rotates about the stationary structure 120 on a layer of liquid or gas. The layer of liquid or gas between the bearing mechanisms 115 and 125 may be sufficient to levitate (e.g., float) the rotatable structure 110 relative to the stationary structure 120 so that the rotatable structure 110 can rotate relative to the stationary structure 120 and maintain a spacing between opposing surfaces of the rotatable structure 110 and stationary structure 120. For example, in the embodiment of FIG. 1, the fluid bearing mechanisms 115 and 125 may be configured to maintain a spacing G between the outer surface 122 of the stationary structure 120 and the inner surface 111 of the rotatable structure 110.

The fluid source for the fluid bearing mechanisms may be any fluid. However, in various exemplary embodiments, the fluid in which the system is submerged (e.g., water in a river, ocean, lake, etc.) may be used as the fluid source. By using the fluid in which the system is submerged, sealing of the bearing mechanisms may not be necessary because the fluid may leave the bearing mechanism and be recycled to the body of fluid in which the system is submerged without detrimental effects on the body of water. In various exemplary embodiments, filtering of the fluid supplied to the fluid bearing mechanisms may be needed if the body of fluid in which the system is submerged contains material that may corrode or otherwise deteriorate the fluid bearing mechanisms. In various exemplary embodiments, fluid sources other than the fluid in which the system is submerged may be used. In such cases, the fluid may be delivered to the submerged system through fluid delivery devices (e.g., pumps, valves, pipes, etc.) and a mechanism for recirculating the fluid or otherwise releasing it to an appropriate environment once it has exited the fluid bearing mechanisms may be desirable.

In various exemplary embodiments, the bearing mechanisms 115 and 125 may be configured as hydrostatic bearings and one or more pumps (e.g., as shown in dashes at reference numeral 250 in FIG. 1) may be utilized to pump the fluid used in the bearings. Each bearing mechanism 115 and 125 may be associated with its own pump, or a plurality of bearing mechanisms 115 and 125 may share a common pump. In various exemplary embodiments, the bearing mechanisms may be associated with more than one pump, for example, with one or more of the associated pumps being dedicated to a particular bearing mechanism or shared with plural bearing mechanisms. When more than one pump is associated with a bearing mechanism, one of the pumps may serve as a back-up pump in the event of failure of another pump. Overall, those having ordinary skill in the art would understand various arrangements and configurations of pumps utilized to pump fluid into the bearing mechanisms 115/125.

In various other exemplary embodiments, the bearing mechanisms 115 and 125 may be configured as hydrodynamic bearings and the rotating motion of the rotatable structure 110 may cause suction of the fluid onto the bearings and over the bearing surfaces thereof. For example, the surface tension and viscosity of the fluid and the relative motion of the rotatable and stationary structures 110 and 120 may cause a thin film of fluid that maintains the axial and radial positioning of the rotatable structure 110 relative to the stationary structure 120 (e.g., in the embodiment of FIG. 1, suspends the rotatable structure 110 relative to the stationary structure 120). Those ordinarily skilled in the art would be familiar with various configurations of fluid bearing mechanisms that may be utilized for the bearing mechanisms 115 and 125.

Although the exemplary embodiment of FIGS. 1 and 2 includes a plurality of discrete bearing mechanisms 115 and 125 positioned at substantially regularly-spaced angular intervals about an axis of rotation of the system, those having ordinary skill in the art will appreciate that one or both bearing mechanisms 115 and 125 may be a single integral annular element extending substantially continuously along the respective surfaces 111 and 122. Alternatively, a series of bearing mechanisms 115 or 125 may be positioned end-to-end so as to form a continuous annular element that extends substantially continuously along the respective surfaces 111 and 122. The number, size, and configuration of the bearing mechanisms 115 and 125 depicted in FIG. 1 are exemplary only and those ordinarily skilled in the art would recognize that numerous other configurations and arrangements of the bearing mechanisms 115 and 125 could be utilized without departing from the scope of the present teachings.

In yet other exemplary embodiments, it may be possible to place one or more bearing mechanisms on only one of the opposing surfaces 111 or 122. For example, it may be possible to place one or more fluid bearing mechanisms on only one of the opposing surfaces 111 or 122. Moreover, it should be appreciated that the bearing mechanisms in accordance with various exemplary embodiments of the present teachings can provide a bearing along the interface of the opposing surfaces 111 and 122 so as to provide a rotary bearing (as depicted by the arrow x in FIG. 2), across the interface of the opposing surfaces 111 and 122 so as to provide a radial bearing (as depicted by the arrow y in FIG. 2), or a combination thereof. Moreover, although in FIGS. 1 and 2, there is a single set of bearing elements 115 and 125 depicted, each set could comprise a plurality of bearing elements and the bearing elements in each set may be selected from differing types of bearings, including, for example, magnetic, fluid, and/or roller bearings.

Figure 4:
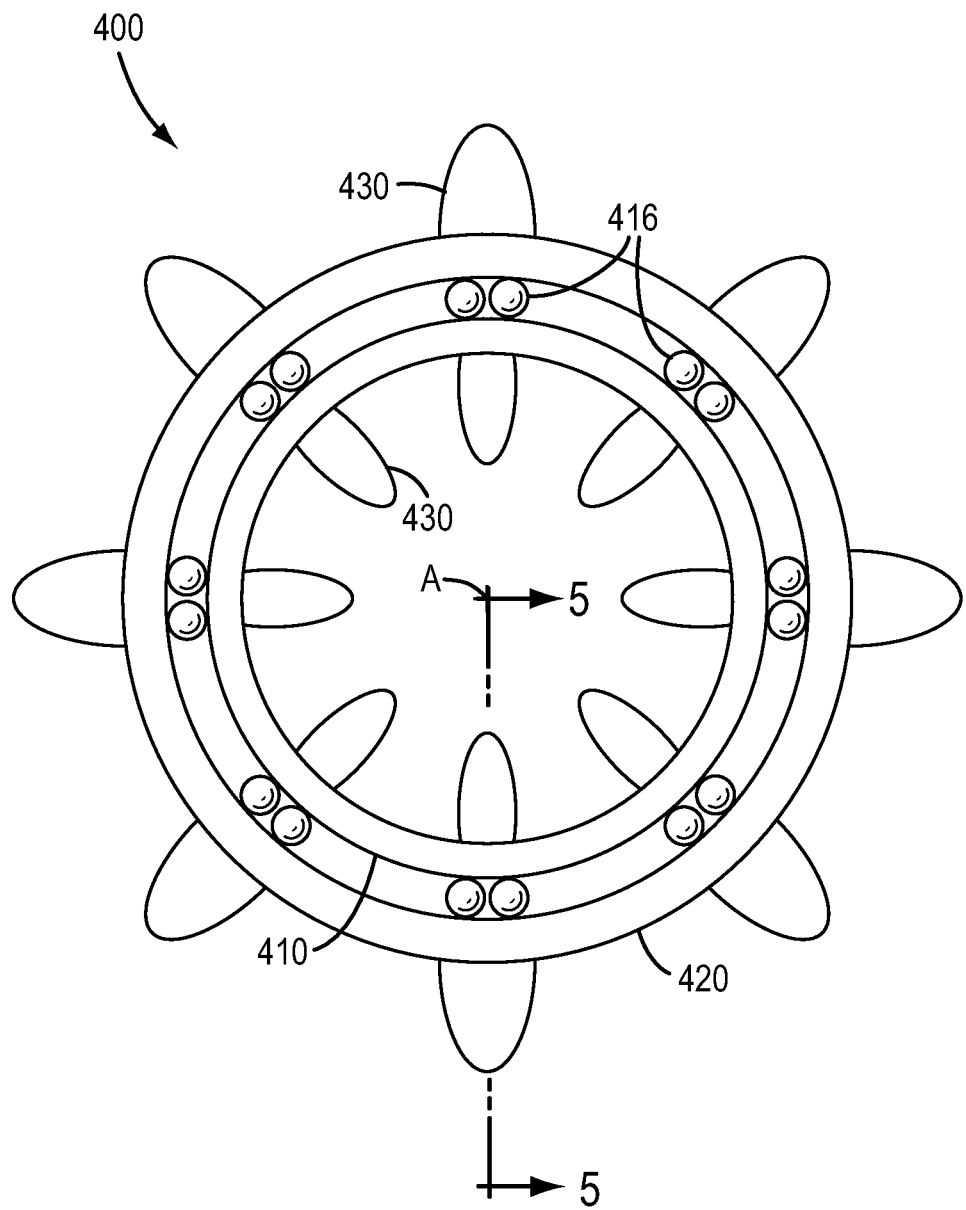
FIG. 4 is a plan view of an additional exemplary embodiment of an energy conversion system in accordance with the present teachings.
Figure 5:
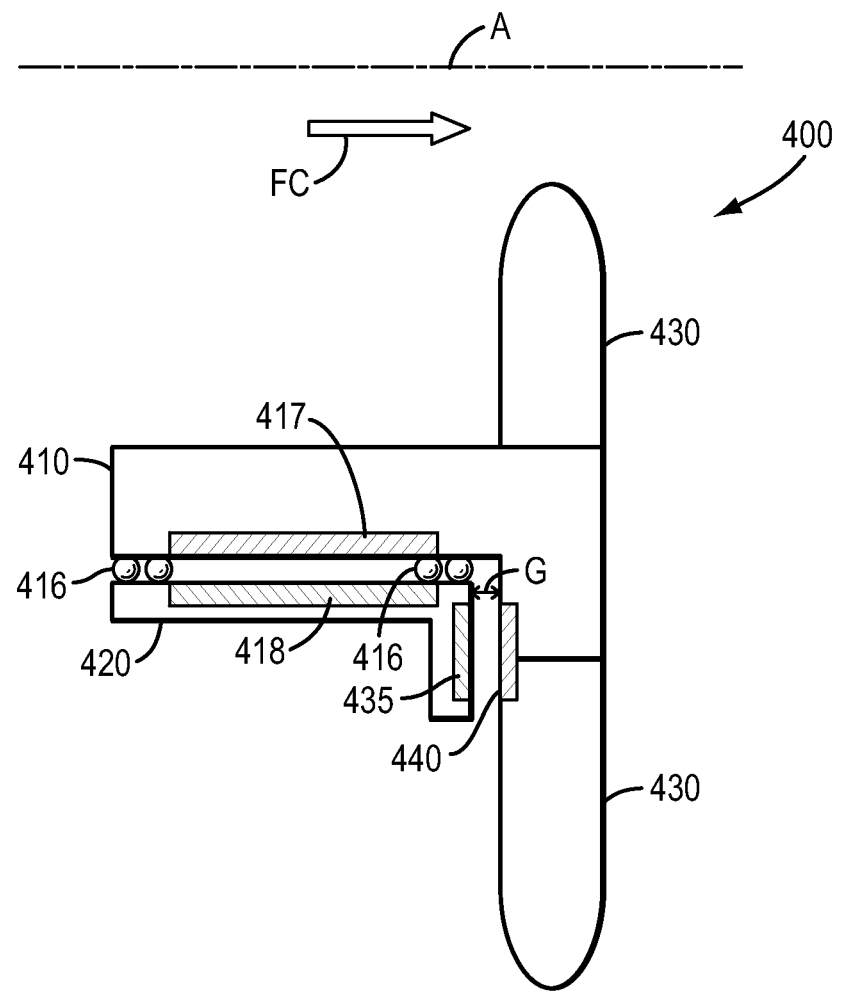
FIG. 5 is a partial cross-sectional view of the energy conversion system of FIG. 4 taken through line 5-5 in FIG. 4.

In accordance with various additional embodiments, for example, the bearing mechanisms may be configured as passive mechanical bearings, such as for example, conventional sealed roller bearing mechanisms as shown in FIGS. 4 and 5. With reference now to FIGS. 4 and 5, a schematic plan view and cross-sectional view (taken through line 5-5 of the energy conversion system of FIG. 4) of an exemplary embodiment of an energy conversion system 400 having an open center configuration is shown. The energy conversion system 400 includes a rotatable structure 410 to which one or more blade members 430 (a plurality being shown in FIG. 4) are mounted. The rotatable structure 410 is rotatably mounted relative to (e.g., within the periphery thereof in the exemplary embodiment of FIG. 4) a stationary structure 420. The blade members 430 are configured and positioned relative to the rotatable structure 410 such that fluid currents may interact with the blade members 430 to cause the rotatable structure 410 with the blade members 430 carried thereby to rotate in a manner with which those ordinarily skilled in the art are familiar. For example, as above, the blade members 430 may be hydrofoils configured to interact with fluid currents (designated as FC in FIG. 5) moving in a direction substantially perpendicular to a plane of rotation of the blade members 430 and the rotatable structure 410 (and substantially parallel to an axis A of rotation of the blade members 430 and rotatable structure 410). In other words, in the orientation of the system 400 in FIG. 4, the blade members 430 may be configured to interact with fluid currents FC having a component moving in a direction substantially perpendicular to the plane of the drawing sheet.

The rotational movement caused by interaction of fluid currents with the blade members 430 may be converted to another form of energy, such as, for example, electricity and/or hydrogen production utilizing, for example, a generator magnet 417 and lamination stack/stator winding 418 (FIG. 5). Such conversion of the rotational movement to another form of energy may occur via numerous techniques those having skill in the art would be familiar with.

Figure 9:
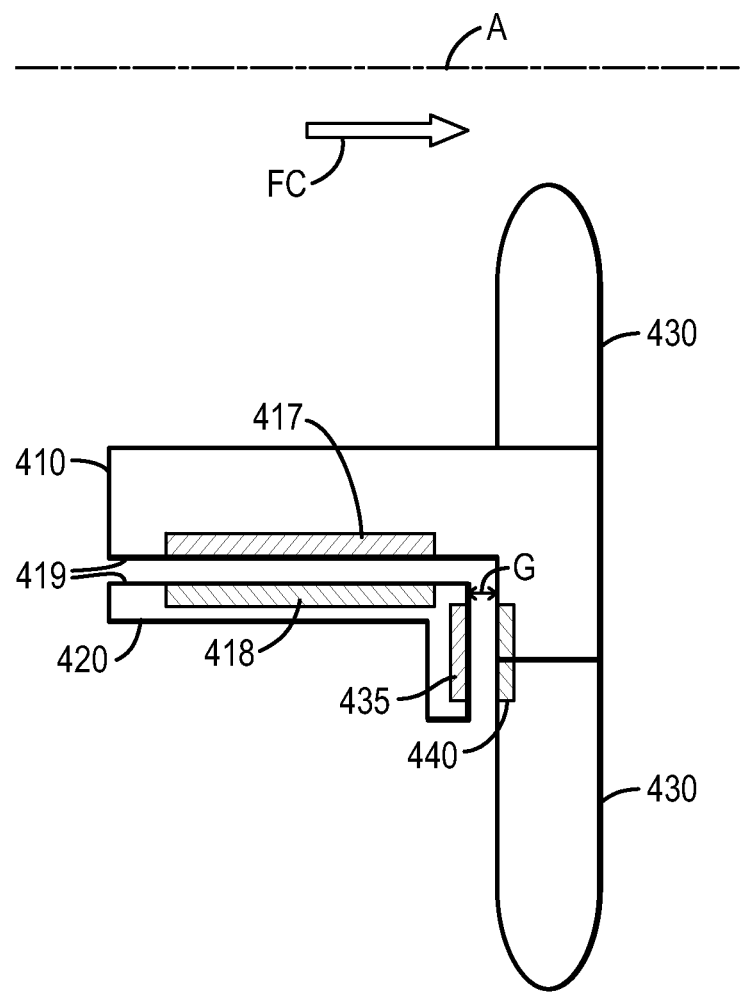
FIGS. 9 through 12 are partial cross-sectional views of additional exemplary embodiments of an energy conversion system in accordance with the present teachings.

The energy conversion system 400 of FIG. 4 may include one or more sets of passive mechanical bearings, such as for example, conventional sealed roller bearings 416 (a plurality of sets being depicted in the exemplary embodiment of FIGS. 4 and 5). The bearings 416 may be configured to permit the rotatable structure 410 to rotate relative to the stationary structure 420 in a substantially stable radial position (e.g., to provide a passive radial restoring support for the structures). In various additional exemplary embodiments, the bearings 416 may be eliminated in favor of low-friction (e.g., ceramic, Teflon, and/or various thermoplastic polymer) surfaces 419 as shown in FIG. 9; alternatively, a combination of roller bearings and low-friction surfaces may be used.

As illustrated in FIG. 5, in various exemplary embodiments in accordance with the present teachings, magnetic bearing mechanisms 435 and 440 may be configured to permit the rotatable structure 410 to rotate relative to the stationary structure 420 in a substantially stable axial position (e.g., to provide an axial restoring support for the structures). For example, the magnetic field between the bearing mechanisms 435 and 440 may be sufficient to substantially retard movement of either the rotatable structure 410 and/or the stationary structure 420 in the axial direction as a result of the force associated with the fluid current FC (e.g., the thrust of the fluid current) acting thereon. That is, as explained above, when the energy conversion system 400 is positioned relative to a fluid current FC moving substantially parallel to the axis A (e.g., substantially perpendicular to the plane of the sheet of FIG. 4), the magnetic field established between the bearing mechanisms 435 and 440 may generate a force sufficient to substantially retard movement of the rotatable structure 410 or the stationary structure 420 in an axial direction as result of the force of the current.

Figure 6:
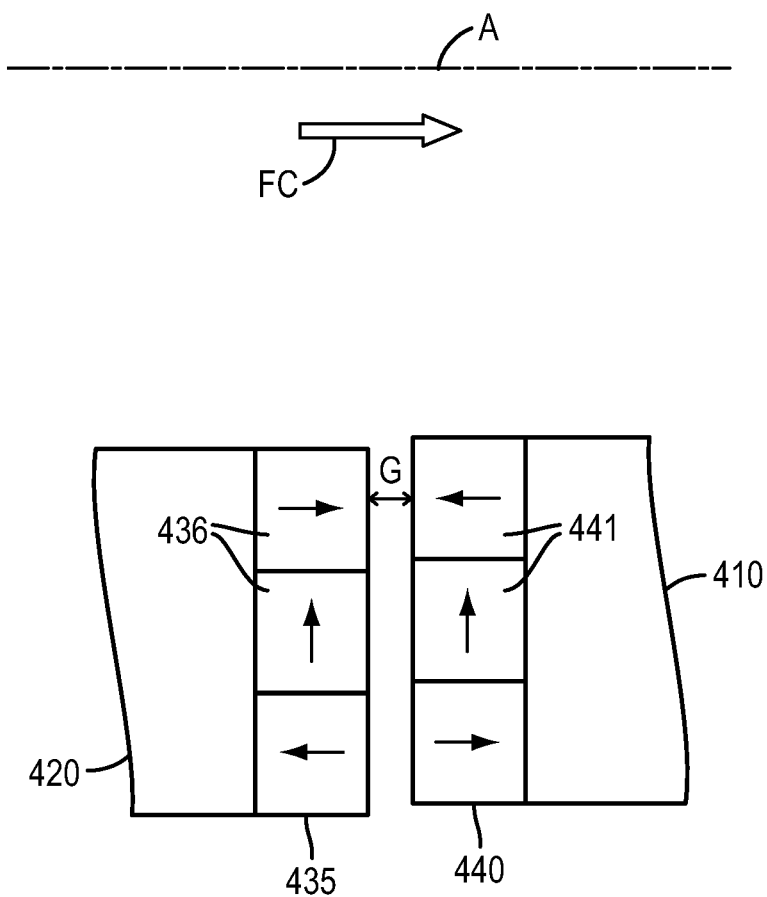
FIG. 6 is an enlarged view of the magnetic bearing mechanism of FIG. 5.

In various exemplary embodiments in accordance with the present teachings, as shown in FIG. 6, the magnetic bearing mechanisms 435 and 440 may comprise a plurality of magnets 436 and 441 respectively. As illustrated in FIG. 6, the magnets 436 and 441 may be substantially arranged in a Halbach type array (i.e., a rotating pattern of permanent magnets, wherein the arrows demonstrate the orientation of each magnet's magnetic field). As would be understood by those ordinarily skilled in the art, as arranged, the magnets 436 and 441 are configured to repel each other to substantially maintain the spacing (i.e., gap) G between the rotatable structure 410 and the stationary structure 420. As would be further understood by those of ordinary skill in the art, in the case of the magnetic bearing mechanisms 435 and 440 comprising permanent magnets, the magnetic field (and thus the repelling force) may be established even when the rotatable structure 410 and the stationary structure 420 are not translating or rotating relative to each other.

Figure 7:
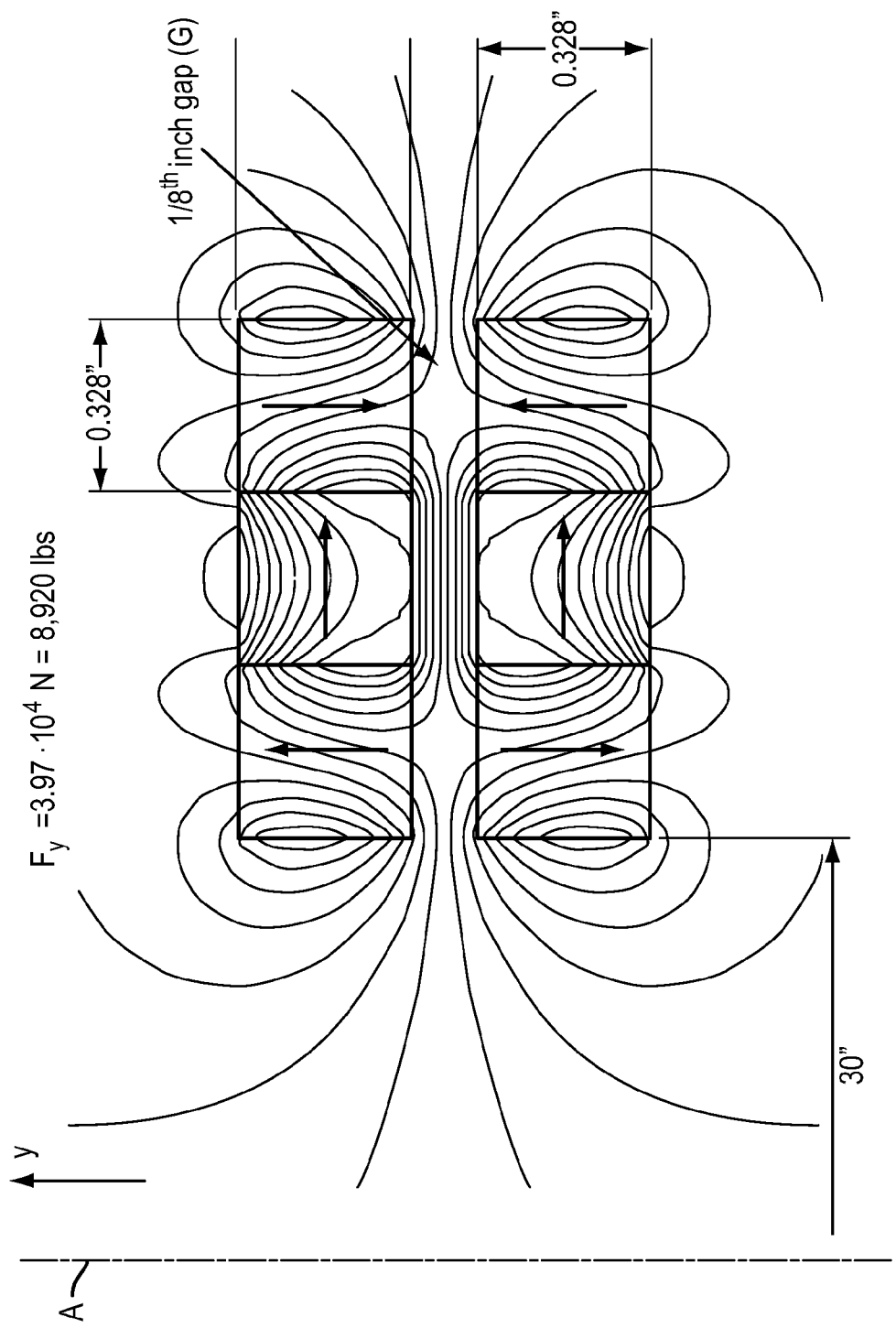
FIG. 7 is a magnetization field plot for an exemplary magnetic bearing mechanism having a configuration like that in FIG. 6.

FIG. 7, for example, illustrates a magnetization field plot for an exemplary embodiment of the magnetic bearings (i.e., the permanent magnetic arrays) of FIG. 6. As illustrated in FIG. 7, arrays with the dimensions shown (i.e., using 0.328 inch by 0.328 inch magnets in a magnet ring with an inner radius of 30 inches from a rotation axis A, and a 0.125 inch spacing G between arrays) may provide about 9,000 pounds of restoring force (i.e., a restoring force adequate for an energy conversion system with a 5 foot diameter) using Niobium Iron Boron ($N_dF_eB$) magnets rated at 50 MGO (i.e., using the MEGA GAUSS OERSTED measurement of magnet energy strength). The magnetic field density strength demonstrated by the magnetic bearings is noted in Tesla's in the legend.

Figure 8:
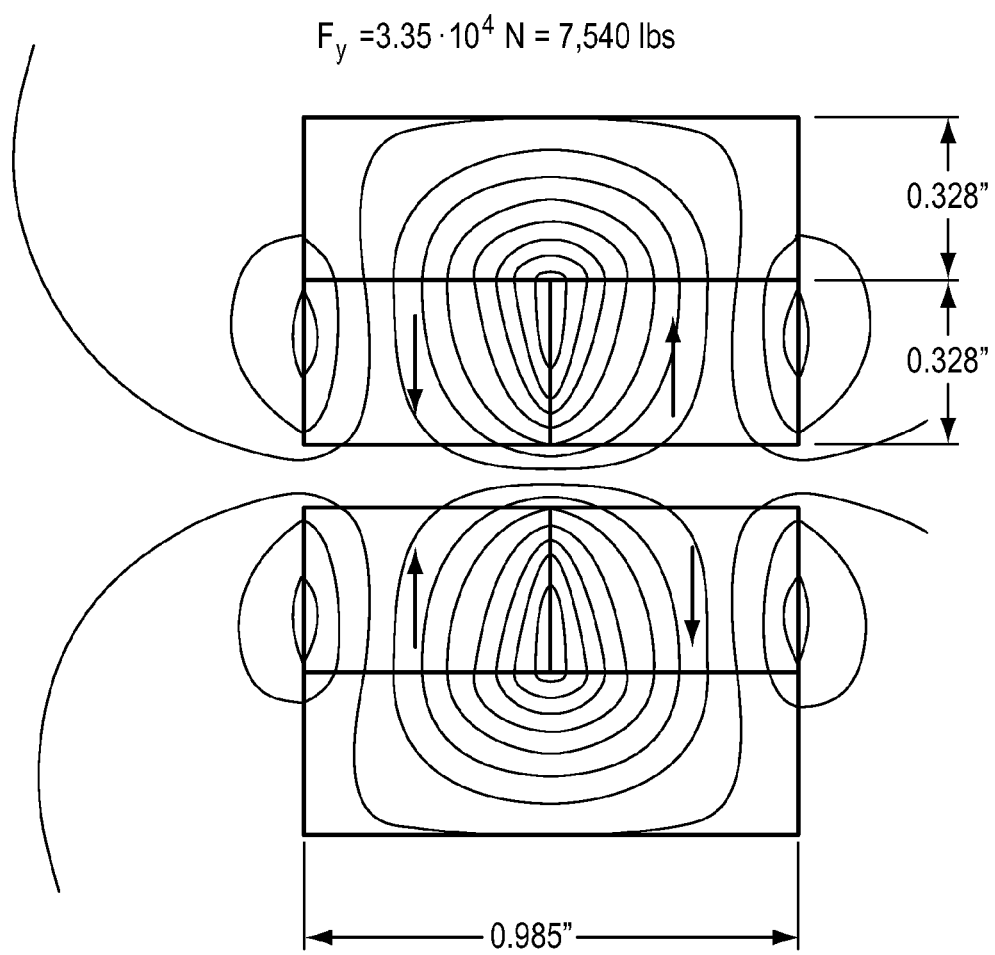
FIG. 8 is a magnetization field plot for a comparative magnetic bearing mechanism.

In comparison, FIG. 8 illustrates the magnetization field plot for a comparative magnetic bearing mechanism, which provides passive repulsion by directly aligning magnets with opposing magnetic fields (i.e., the arrows demonstrate the orientation of each magnet's magnetic field). As illustrated in FIG. 8, when magnets with similar dimensions and properties as show in FIG. 7, (i.e., 0.328 inch by 0.493 inch, 50 MGO $N_dF_eB$ magnets) are arranged in such a configuration (i.e., opposing 0.985 inch magnet arrays with a 0.125 inch spacing G between arrays), the bearing mechanism provides only about 7,540 pounds of restoring force. Consequently, the magnetic bearing mechanisms of the present teachings, as illustrated, for example, in FIG. 7, demonstrate enhanced restorative capabilities, with the ability to support larger energy conversion devices, in comparison with the magnetic bearing mechanism of FIG. 8.

Figure 10:
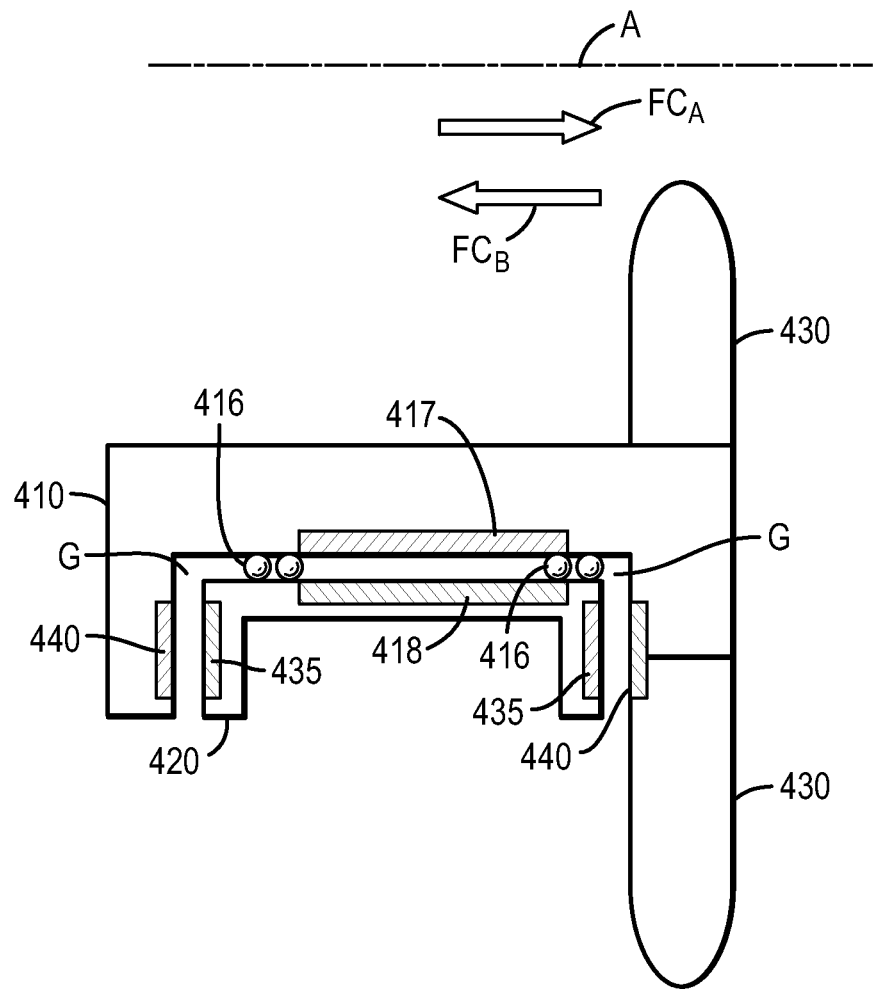

As would be understood by those ordinarily skilled in the art, the exemplary energy conversion device of FIG. 4 may also be modified to account for bidirectional current flow. In other words, in the orientation of the system in FIG. 10, the blade members 430 may be configured to interact with fluid currents $FC_A$ and/or fluid currents $FC_B$, each having a component moving in a direction substantially perpendicular to the plane of the drawing sheet. As shown in FIG. 10, to counteract the thrust of the fluid current $FC_B$ (i.e., to provide an axial restoring force sufficient to substantially prevent movement of the rotatable structure 410 or the stationary structure 420 as a result of the axial force component of the current $FC_B$), a second set of magnetic bearings 435 and 440 may be placed on the opposite side of the energy conversion system (i.e. on the opposite side of the rotatable structure 410 and the stationary structure 420 from the blade member 430). In this manner, the stationary structure 420 can be centered within a gap G by the two sets of bearings 435 and 440, regardless of flow direction.

The bearing mechanisms 435 and 440 may comprise various Halbach type arrays configured to achieve magnetic repulsion as would be understood by those ordinarily skilled in art and those described above are exemplary only. Those having skill in the art would understand how to modify the structures of 435 and 440 to permit the rotatable structure 410 to rotate relative to the stationary structure 420 in a substantially stable axial position (i.e., provide an adequate axial restoring force), and would understand that the structures 435 and 440 shown are schematic representations only. Those ordinarily skilled in the art would understand, however, that the configuration exemplified by the bearing mechanisms 435 and 440 may have the specific benefit that no eddy current losses are commensurate with the structures' rotation. The number, shape, spacing, size, magnetic field strength, and other properties of the bearing mechanisms 435 and 440 may be selected based on various factors such as the size and weight of the rotatable and stationary structures 410, 420, the required restoring and bearing forces, and other factors based on the desired application. Furthermore, the magnets may be hermetically sealed to prevent oxidation to the magnet material when placed in a fluid environment (e.g., when placed in water).

Figure 11:
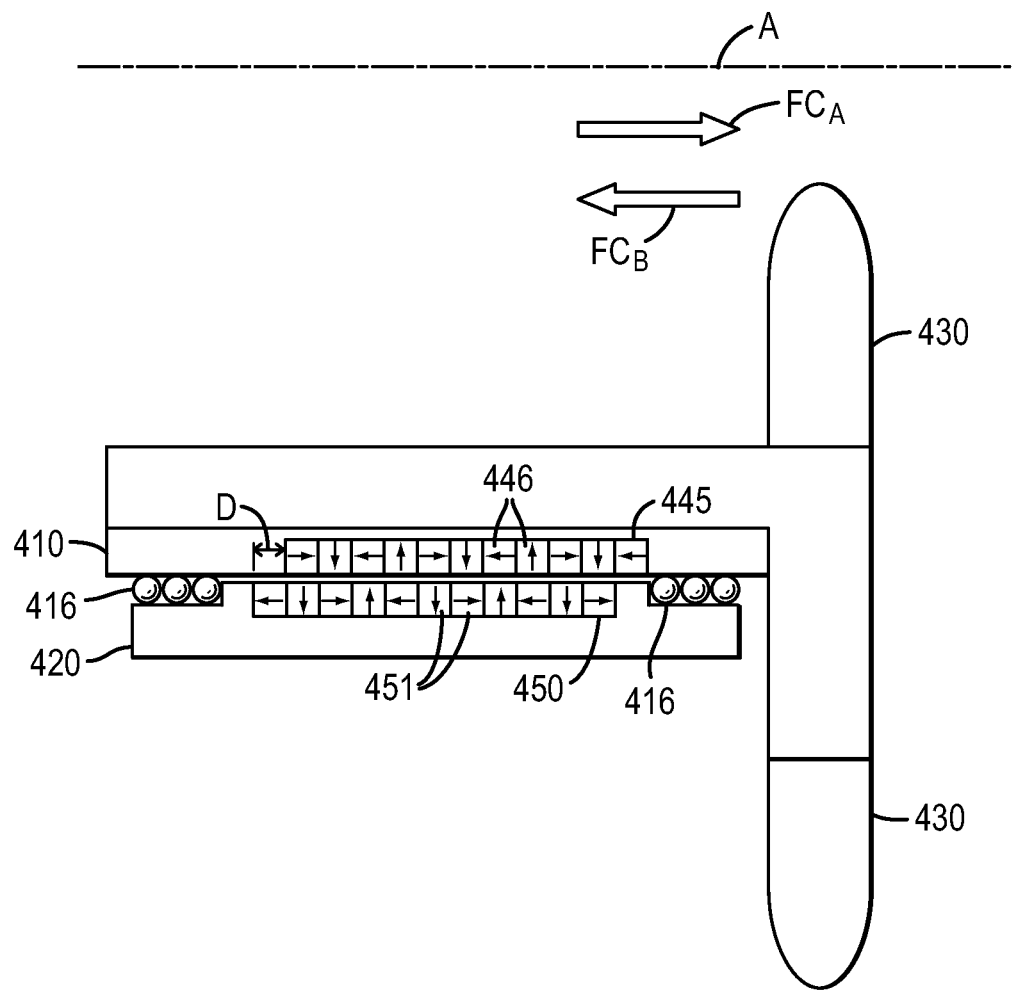

As shown in FIG. 11, in various additional exemplary embodiments in accordance with the present teachings, magnetic bearing mechanisms 445 and 450 may be configured to permit the rotatable structure 410 to rotate relative to the stationary structure 420 in a substantially stable axial position (e.g., to provide an axial restoring support for the structures). For example, the magnetic field between the bearing mechanisms 445 and 450 may be sufficient to substantially retard movement of either the rotatable structure 410 and/or the stationary structure 420 in the axial direction as a result of the force associated with the fluid current (e.g., the thrust of the fluid current) acting thereon.

In various exemplary embodiments, as shown in FIG. 11, magnetic bearing mechanisms 445 and 450 may comprise a plurality of radial magnets 446 and 451 respectively. As illustrated in FIG. 11, the magnets 446 and 451 may be substantially arranged in a Halbach type array. As would be understood by those ordinarily skilled in the art, when the magnet array (i.e., magnets 446) on the rotatable structure 410 is displaced by a displacement D with respect to the magnet array (i.e., magnets 451) on the stationary structure 420, radial air gap fields provide an axial restoring force. In other words, displacement of the magnets 446 with respect to the magnets 451 creates a restoring force as the magnets attempt to align themselves (i.e., the alignment force counteracts the thrust of the fluid current).

As would be understood by those ordinarily skilled in the art, due to their configuration and central location within the energy conversion system, the magnetic bearing mechanisms 445 and 450 are inherently bidirectional and may therefore accommodate flow in either direction. In other words, in the orientation of the system in FIG. 11, the blade members 430 may be configured to interact with fluid currents $FC_A$ and/or fluid currents $FC_B$, each having a component moving in a direction substantially perpendicular to the plane of the drawing sheet. Furthermore, as above, those of ordinary skill would also understand that the magnetic bearing mechanisms 445 and 450 may comprise various Halbach type arrays, and those having skill in the art would understand how to modify and offset (i.e., displace the structures with respect to each other) the structures of 445 and 450 to permit the rotatable structure 410 to rotate relative to the stationary structure 420 in a substantially stable axial position (i.e., provide an adequate axial restoring force), and would understand that the structures 445 and 450 shown are schematic representations only. The number, shape, spacing, size, magnetic field strength, displacement and other properties of the bearing mechanisms 445 and 450 may be selected based on various factors such as the size and weight of the rotatable and stationary structures 410, 420, the required restoring and bearing forces, and other factors based on the desired application. Furthermore, the magnets may be hermetically sealed to prevent oxidation to the magnet material when placed in a fluid environment (e.g., when placed in water).

Figure 12:
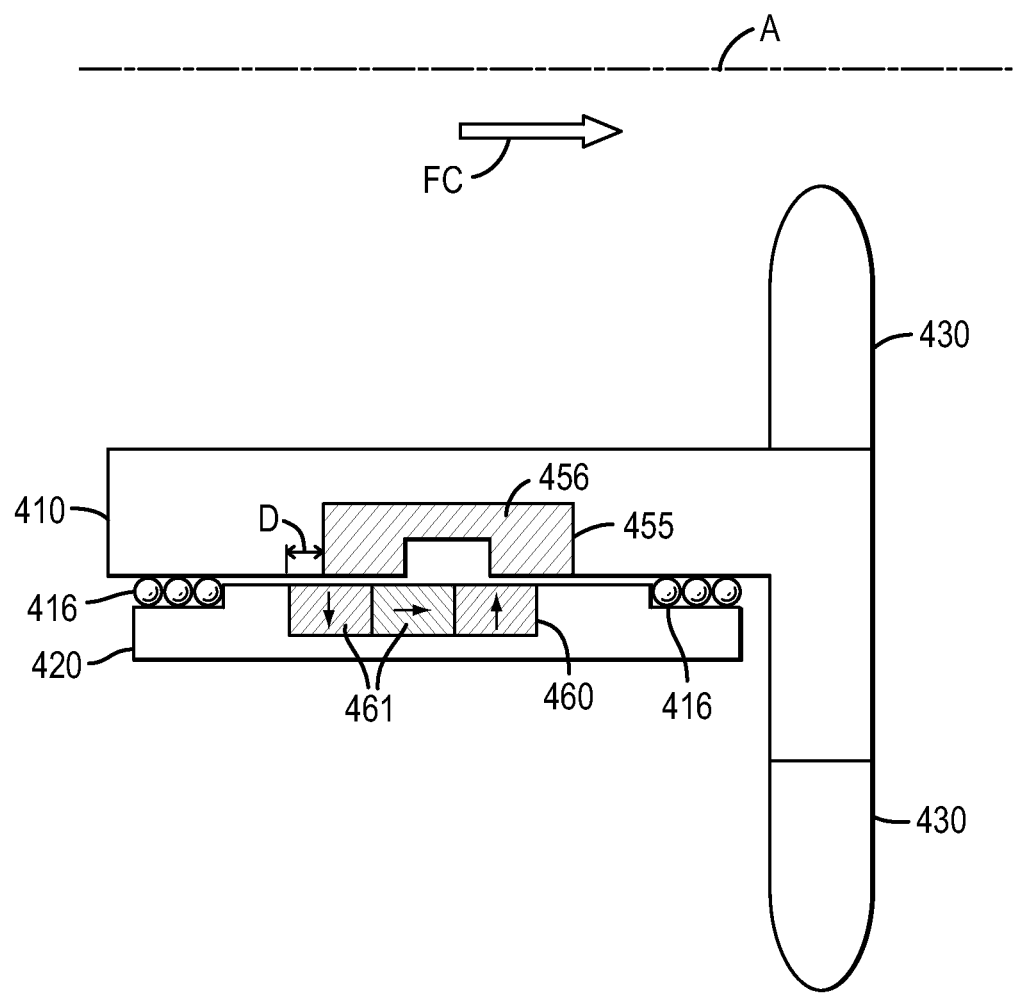
Figure 13:
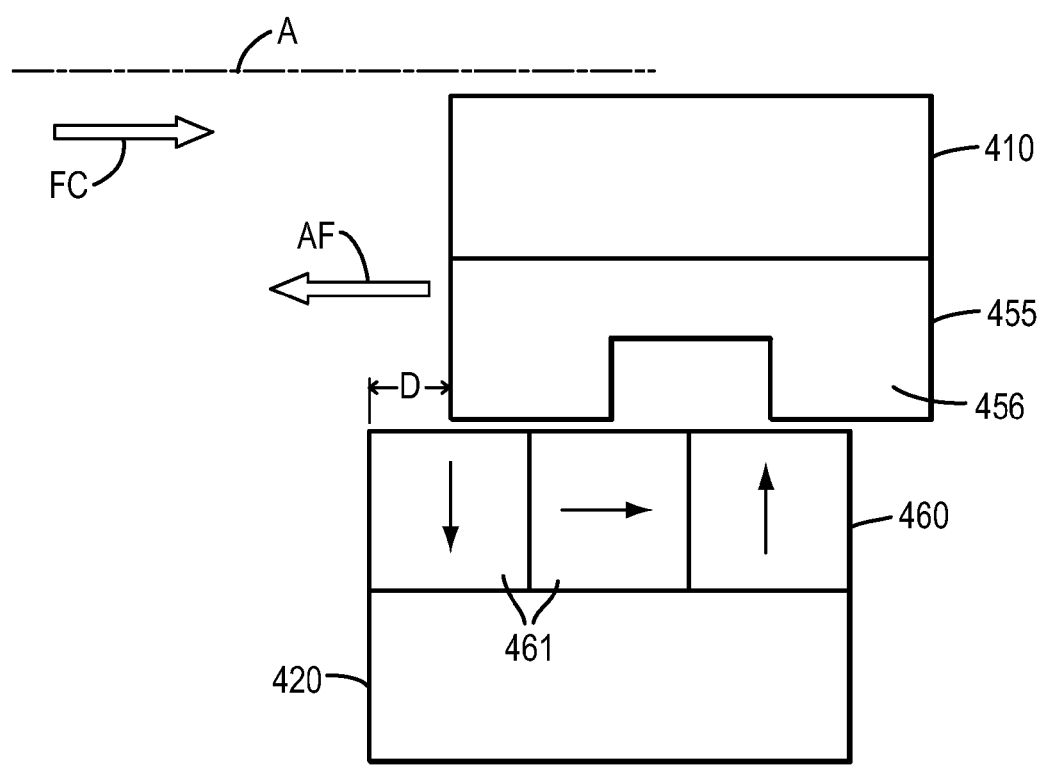
FIG. 13 is an enlarged view of the magnetic bearing mechanism of FIG. 12.

As shown in FIGS. 12 and 13, in various additional exemplary embodiments, magnetic bearing mechanisms 455 and 460 may comprise a C-core 456, such as, for example, a steel C-core or steel yoke, and a plurality of radial magnets 461 respectively. As illustrated in FIG. 13, the magnets 461 may be substantially arranged in a Halbach type array. As above, when the bearing mechanism 455 (i.e., C-core 456) on the rotatable structure 410 is displaced by a displacement D with respect to the bearing mechanism 460 (i.e., magnets 461) on the stationary structure 420, radial air gap fields provide an axial restoring force. In other words, displacement of the steel C-core 456 with respect to the magnets 461 creates a restoring force as the magnets attempt to align with the steel C-core (i.e., the alignment force AF counteracts the thrust of the fluid current FC).

Figure 14:
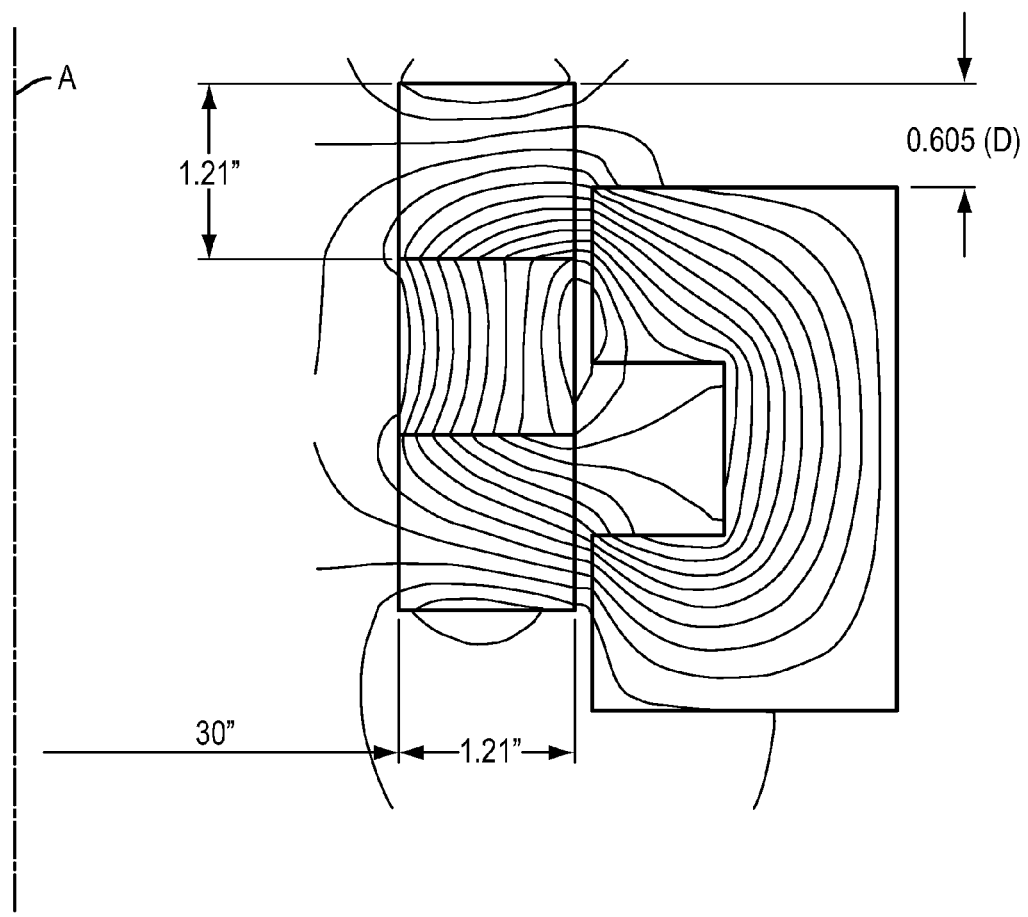
FIG. 14 is a magnetization field plot for an exemplary magnetic bearing mechanism having a configuration like that in FIG. 13.
Figure 15:
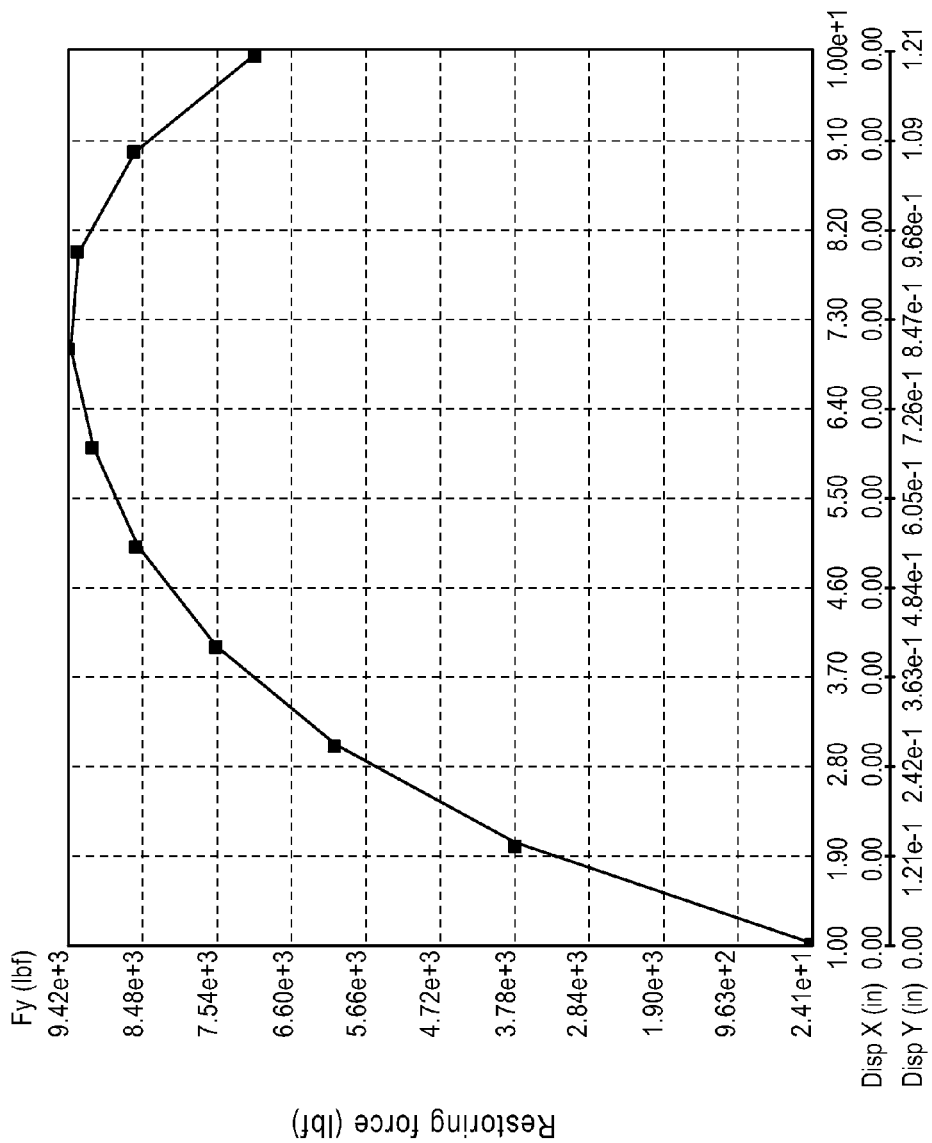
FIG. 15 is a graph of restoring force versus vertical displacement for the magnetic bearing mechanism of FIG. 13.

As above, as would be understood by those of ordinary skill in the art, in the case of the magnetic bearing mechanisms 455 and 460 comprising permanent magnets 461, the magnetic field (and thus the aligning force) may be established even when the rotatable structure 410 and the stationary structure 420 are not rotating relative to each other. FIG. 14, for example, illustrates the magnetization field plot for the magnetic bearings (i.e., the permanent magnetic array and steel-C core) of FIG. 13. As illustrated in FIGS. 14 and 15, an array with the dimensions shown (i.e., using 1.21 inch by 1.21 inch magnets in a magnet ring with an inner radius of 30 inches from a rotation axis A), with a displacement D of approximately 0.605 inches with respect to the steel C-core, may also provide about 9,000 pounds of restoring force using 50 MGO $N_dF_eB$ magnets. The magnetic field density strength demonstrated by the magnetic bearings is noted in Tesla's in the legend.

As above, those of ordinary skill would also understand that the magnetic bearing mechanisms 455 and 460 may comprise various C-core configurations and Halbach type arrays, and those having skill in the art would understand how to modify and offset (i.e., displace the structures with respect to each other) the structures of 455 and 460 to permit the rotatable structure 410 to rotate relative to the stationary structure 420 in a substantially stable axial position (i.e., provide an adequate axial restoring force), and would understand that the structures 455 and 460 shown are schematic representations only. The number, shape, spacing, size, magnetic field strength, displacement and other properties of the bearing mechanisms 455 and 460 may be selected based on various factors such as the size and weight of the rotatable and stationary structures 410, 420, the required restoring and bearing forces, and other factors based on the desired application. Furthermore, the magnets may be hermetically sealed to prevent oxidation to the magnet material when placed in a fluid environment (e.g., when placed in water).

Figure 16:
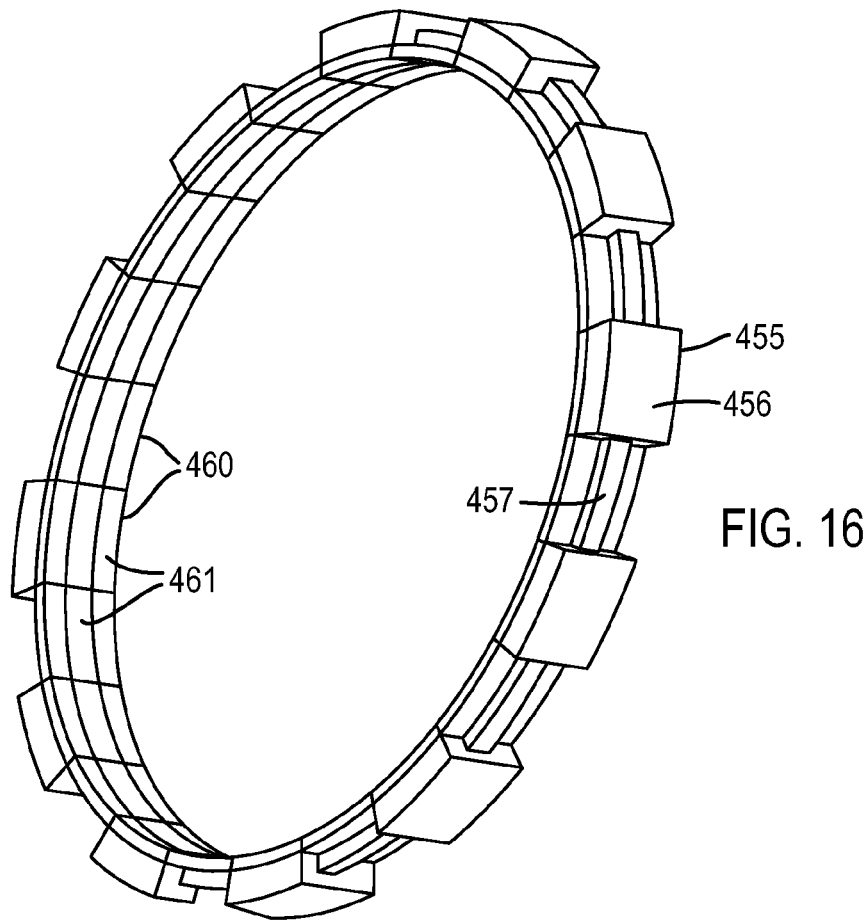
FIG. 16 is a partial perspective view of an exemplary embodiment of a configuration of magnetic bearing mechanisms in accordance with the present teachings.
Figure 17:
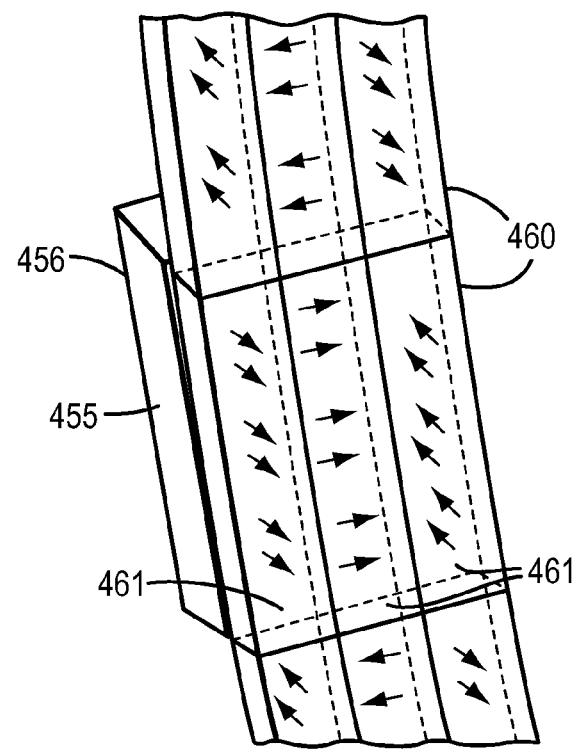
FIG. 17 is an enlarged view of a magnetic bearing mechanism of FIG. 16 with the magnetization orientation shown.

In various exemplary embodiments wherein the magnetic bearing mechanisms 455 and 460 comprise an electrical conductor, such as, for example, a steel C-core (i.e., steel yoke) 456 and magnets 461, one or more of the sets of bearing mechanisms 455 and 460 also may be configured to generate electricity upon relative motion of the bearing mechanisms 455 and 460 in a manner known to those ordinarily skilled in the art. For example, as shown in FIGS. 16 and 17, if the steel yoke 456 is extruded intermittently, the structure will be suitable for electromechanical energy conversion with a copper coil 457 as the stator assembly, for example with the copper coil 457 being mounted to the stationary structure. As would be understood by those of ordinary skill in the art, in this configuration, the magnetic steel yokes 456 may provide an alternating flux linkage on the coil 457 due to the magnetization orientation shown in FIG. 17.

Various exemplary embodiments additionally consider various methods of mitigating the commensurate cogging that can sometimes be associated with the intermittent steel yokes 456. In various embodiments, for example, a second duplicate set (i.e., of magnets 461 and steel yoke 456) can be used with a 90 degree offset. While, in various additional embodiments, the poles of the steel yoke 456 at the air gap (i.e., between the intermittent yokes) can be flared out to shadow portions of the neighboring poles (i.e., the neighboring magnets). In other words, the sides of the steel yokes 456 can be stretched so they begin to shadow the neighboring magnets.

The exemplary embodiments of FIGS. 1-17 are non-limiting and those having ordinary skill in the art will appreciate that modifications may be made to the arrangements and configurations depicted without departing from the scope of the present teachings.

Figure 18:
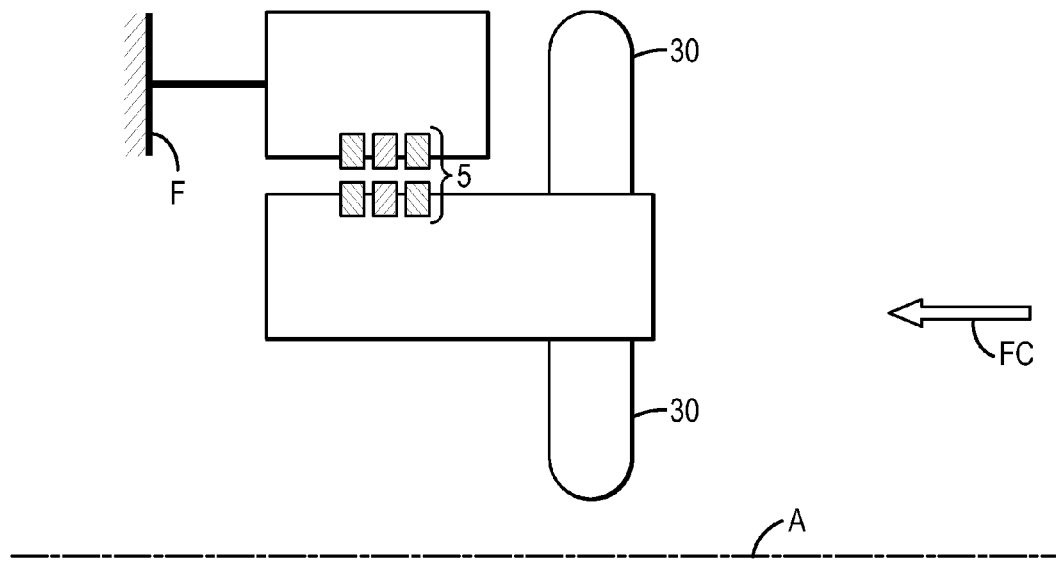
FIGS. 18-73 are schematic partial cross-sectional views of various exemplary embodiments of rotatable structure, stationary structure, and bearing mechanism arrangements in accordance with the present teachings.
Figure 19:
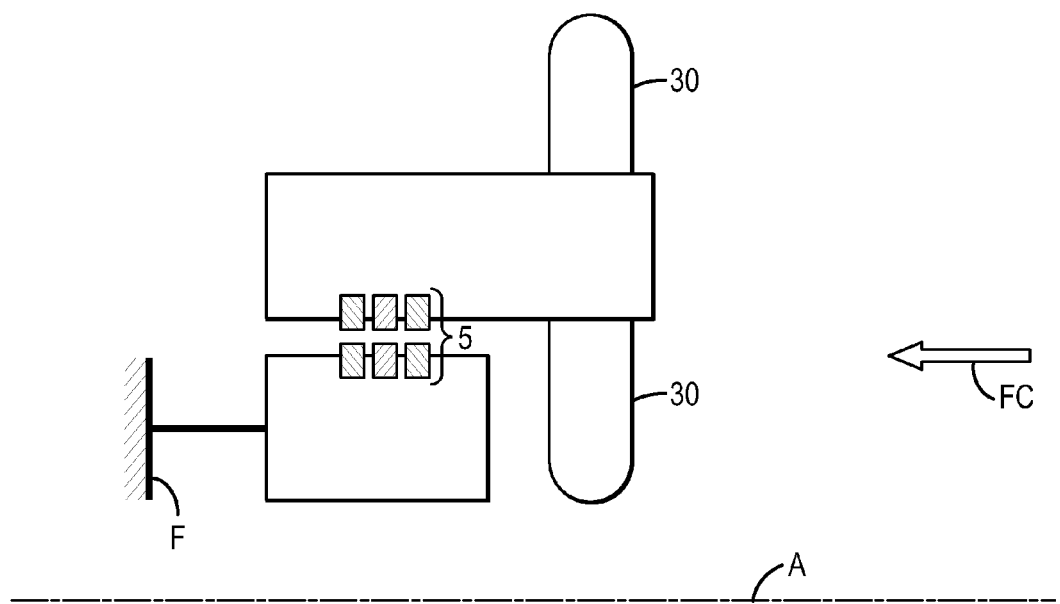
Figure 20:
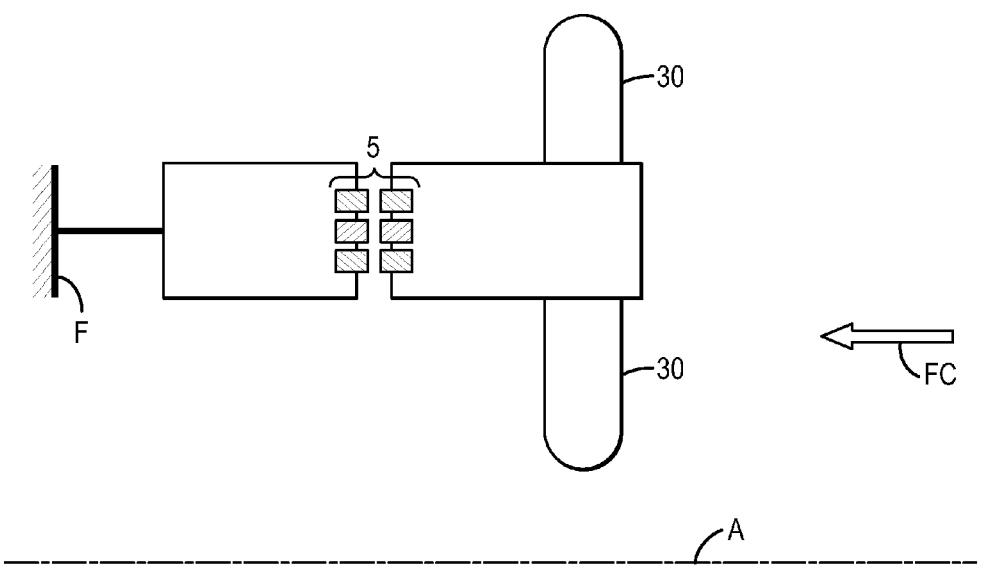
Figure 21:
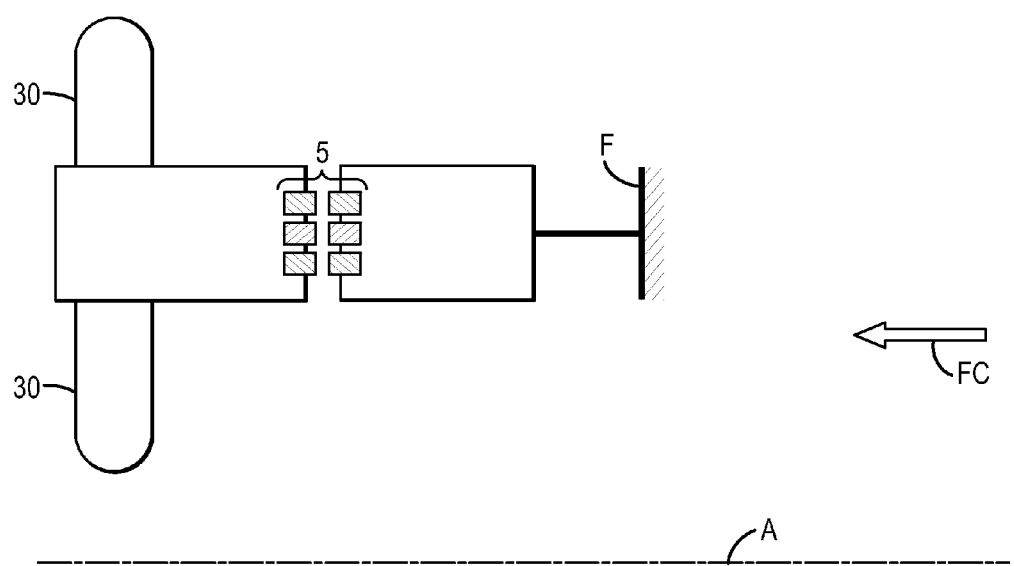
Figure 22:
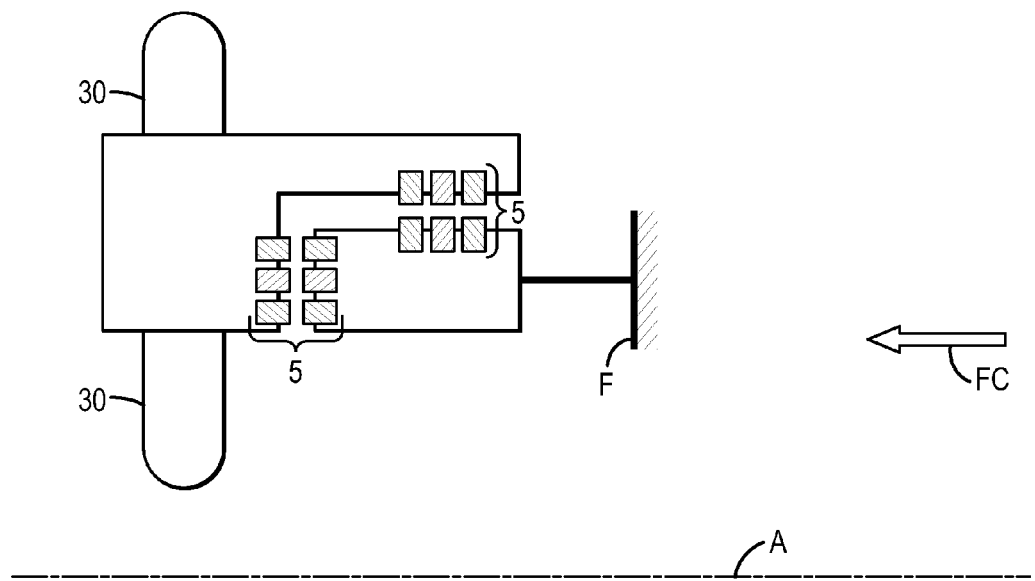
Figure 23:
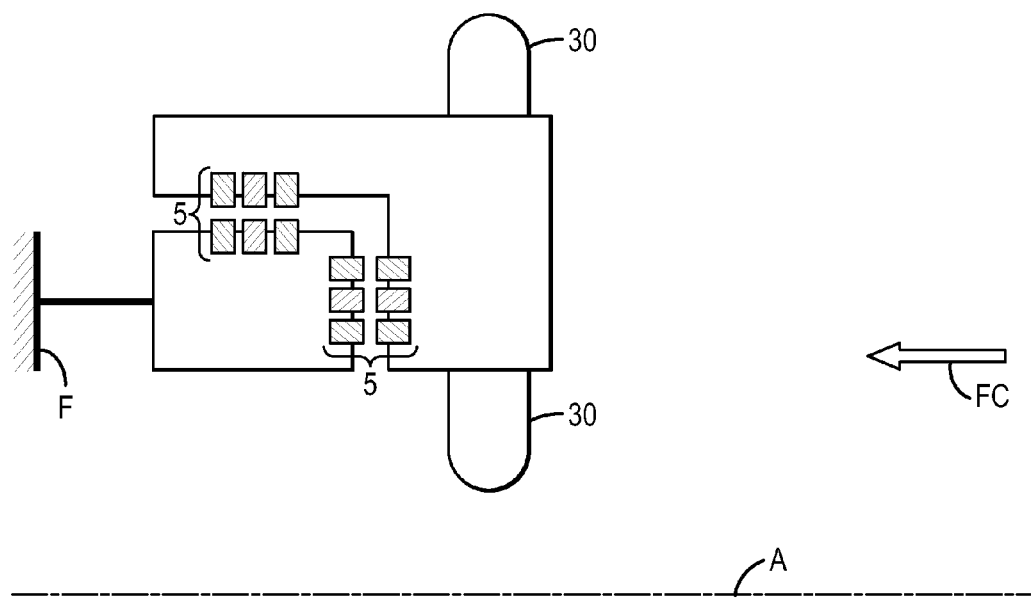
Figure 24:
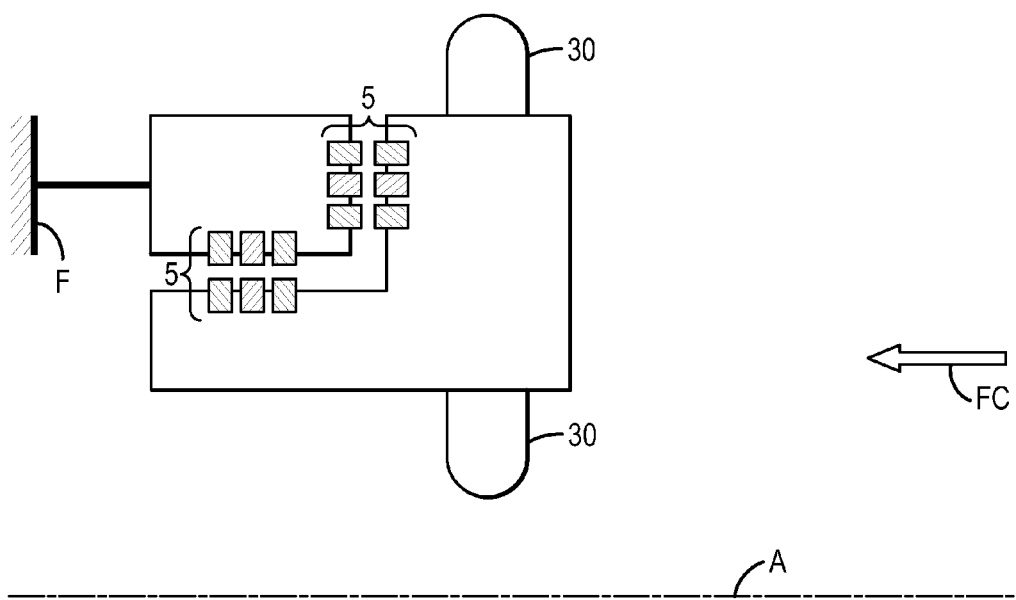
Figure 25:
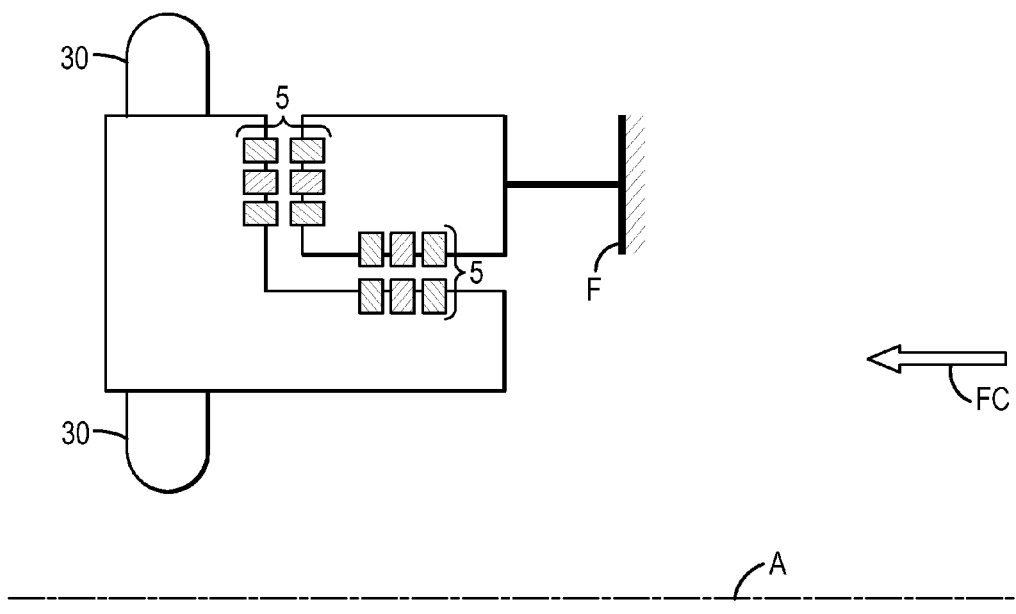
Figure 26:
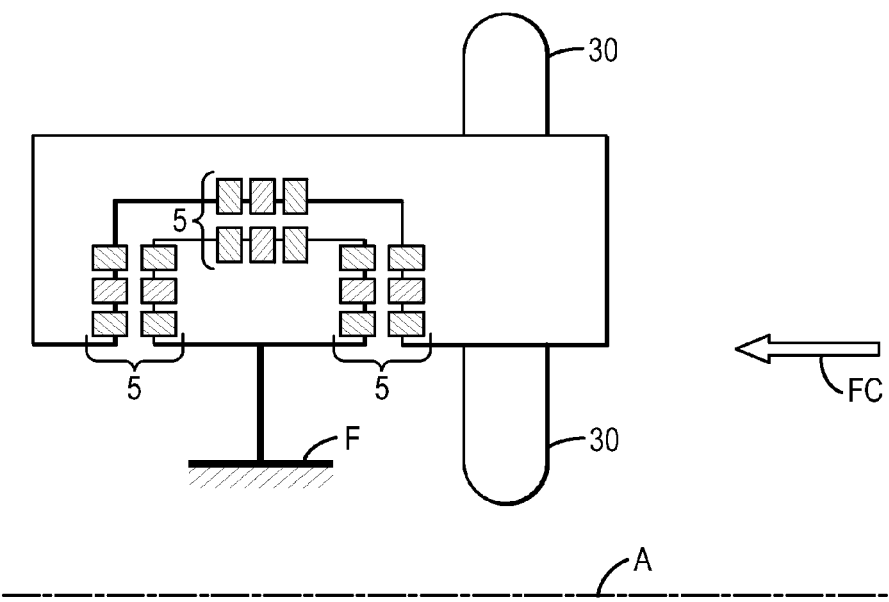
Figure 27:
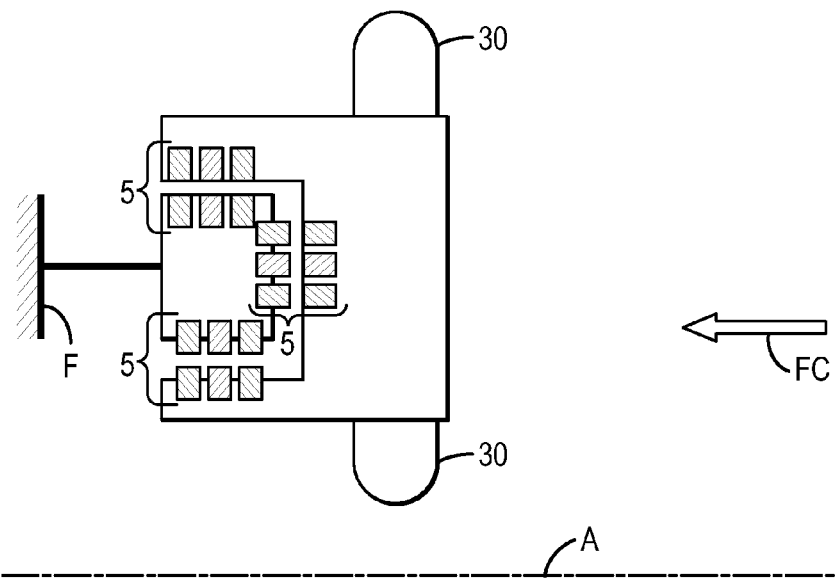
Figure 28:
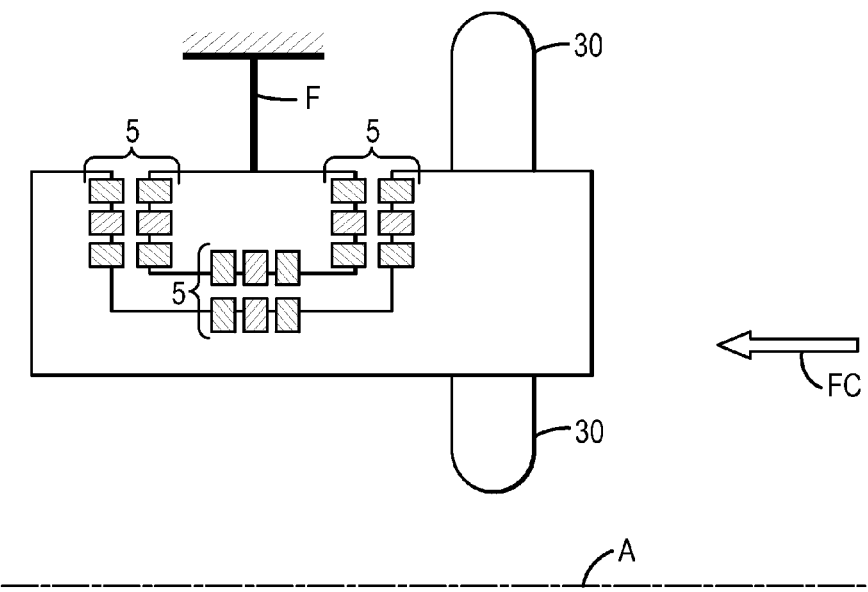
Figure 29:
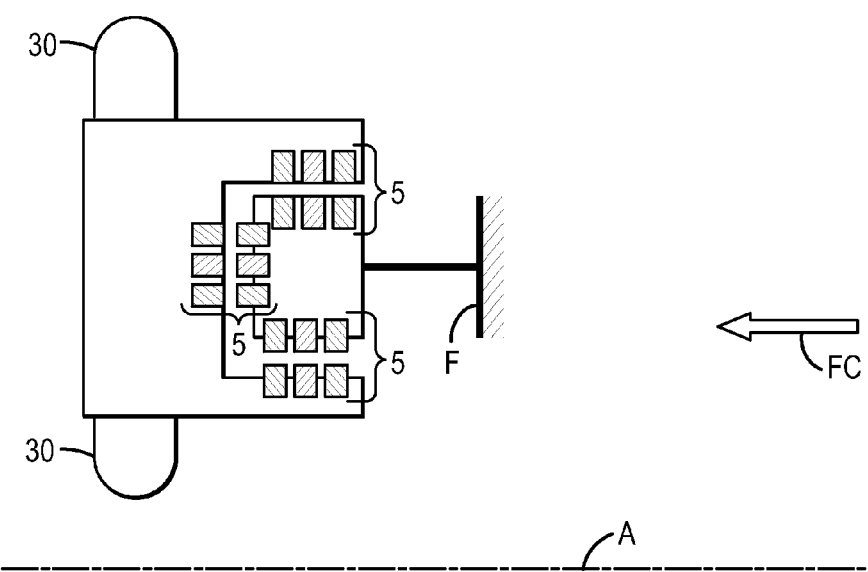
Figure 30:
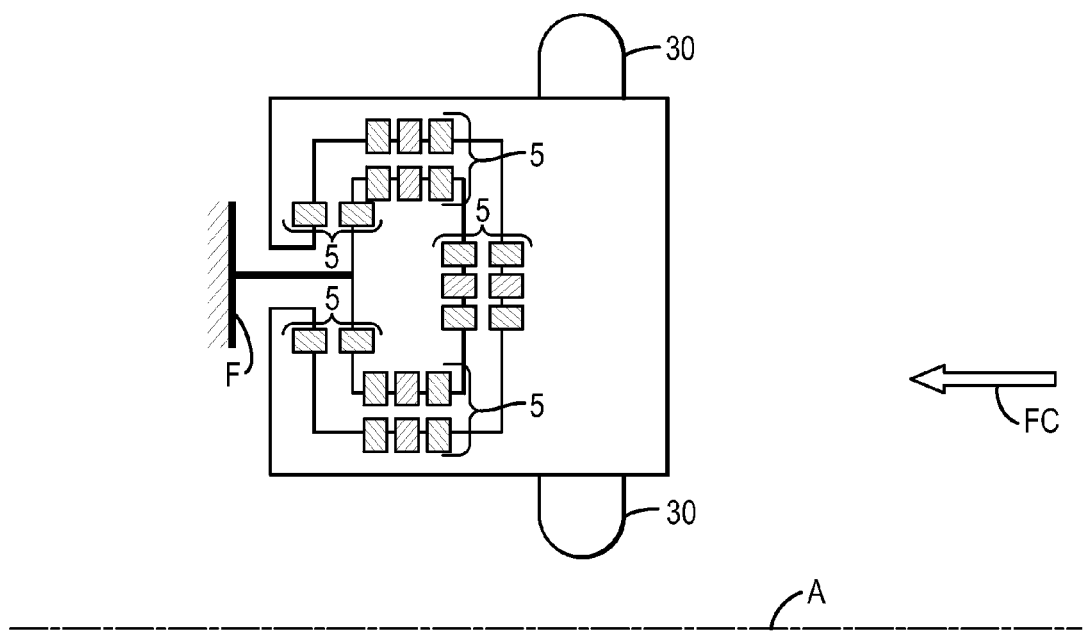
Figure 31:
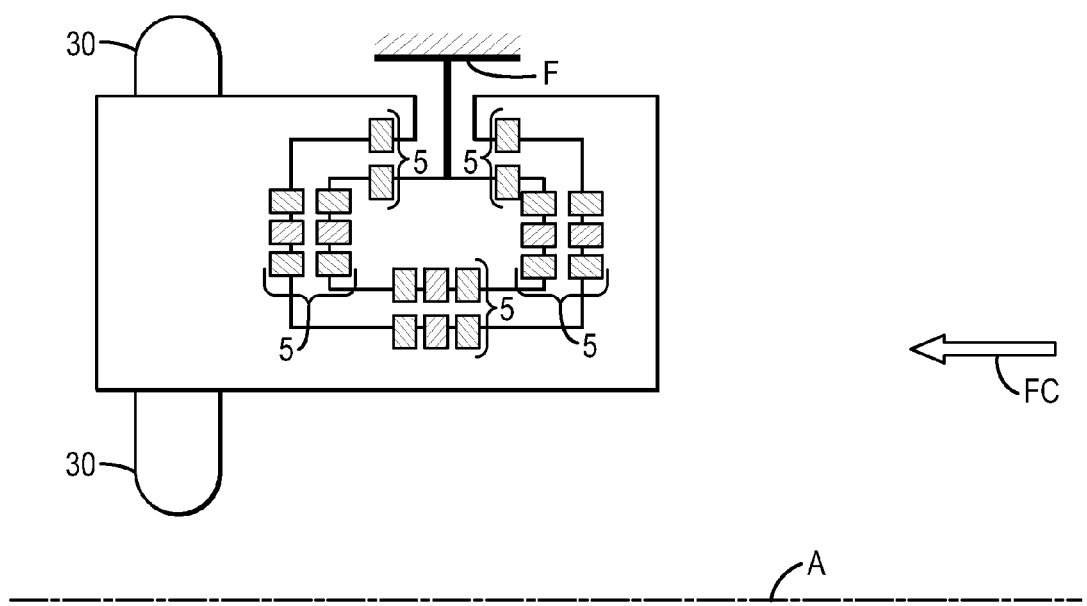
Figure 32:
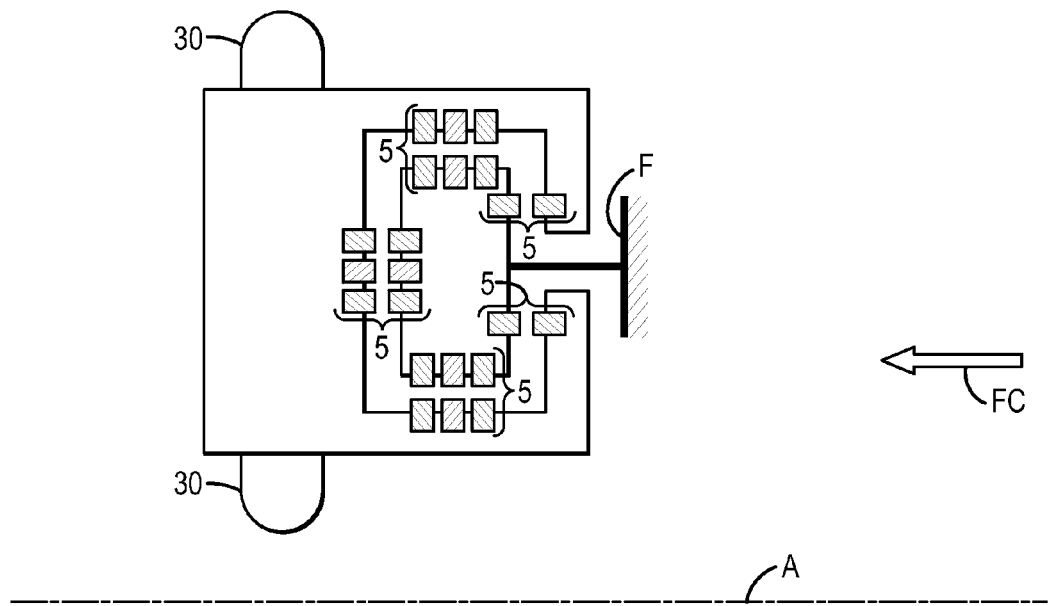
Figure 33:
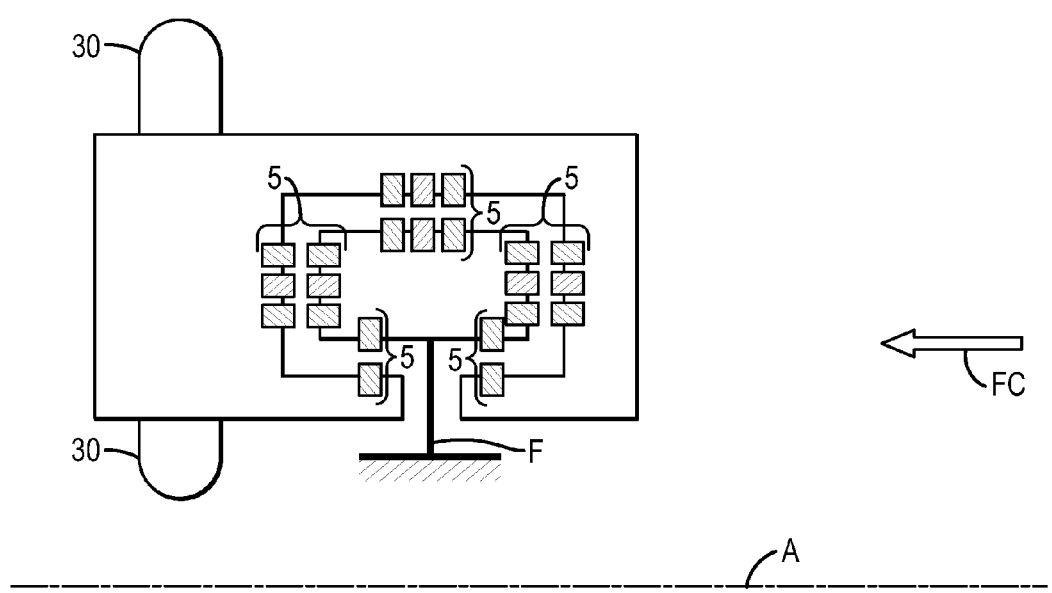
Figure 34:
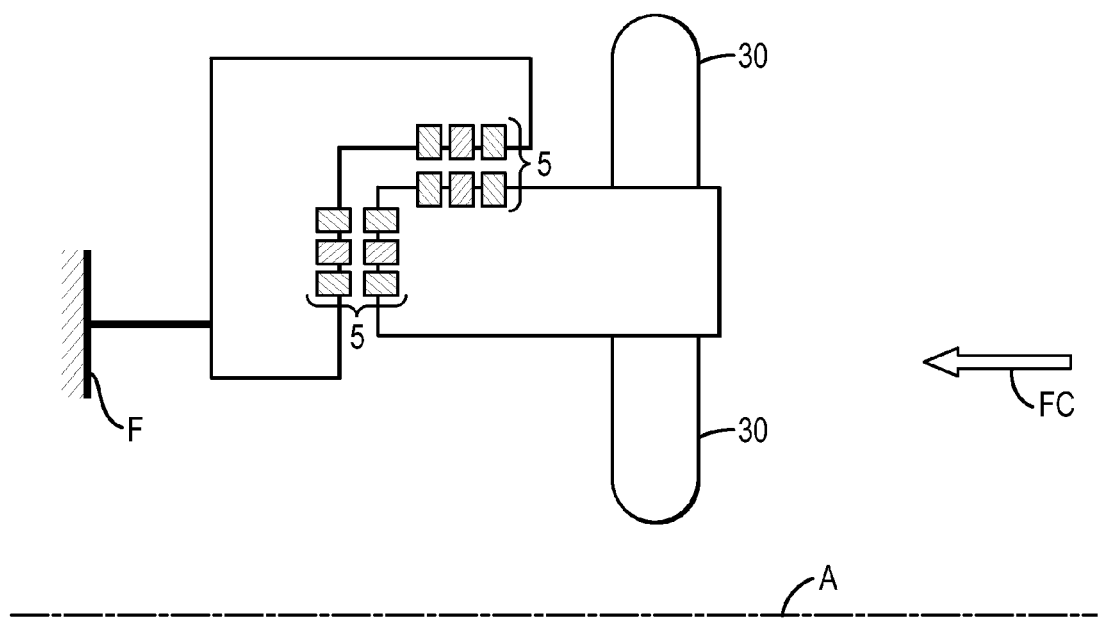
Figure 35:
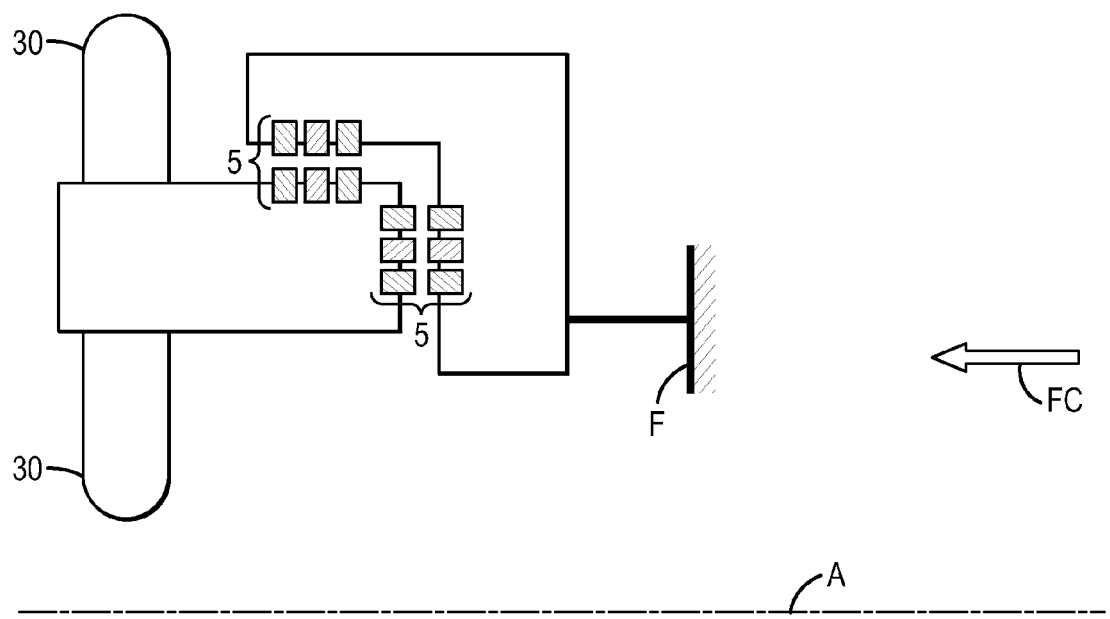
Figure 36:
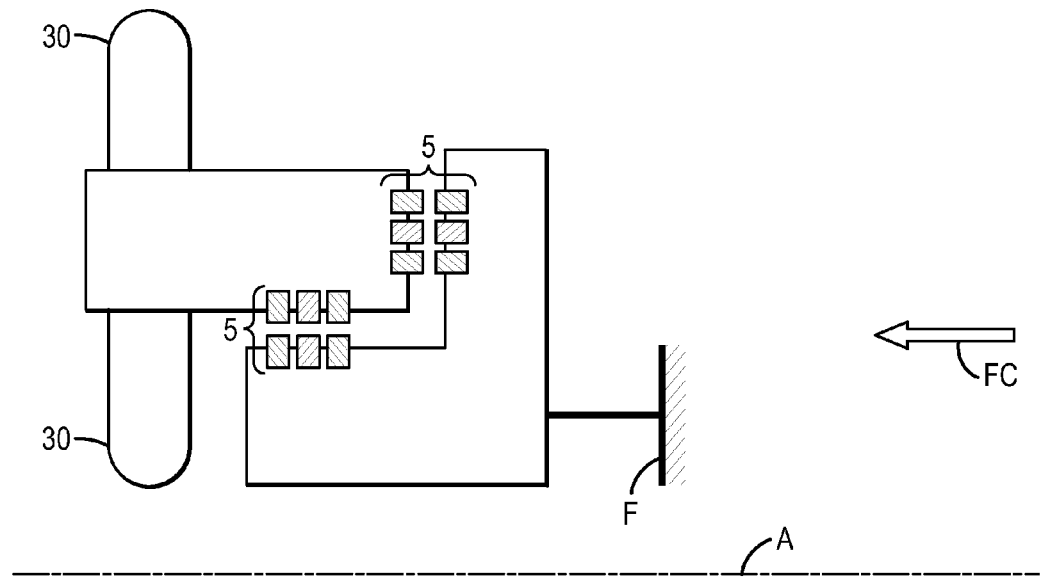
Figure 37:
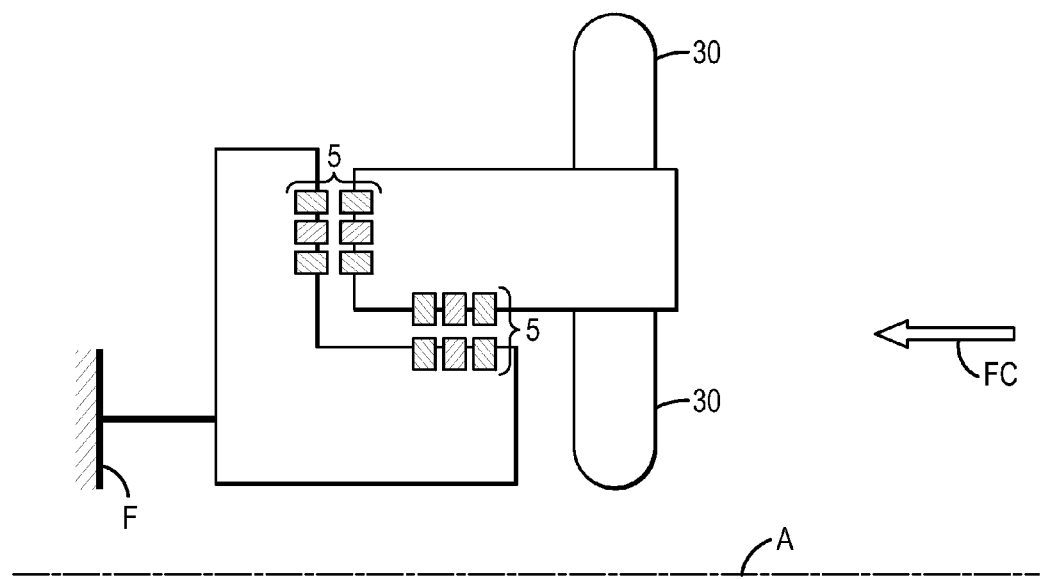
Figure 38:
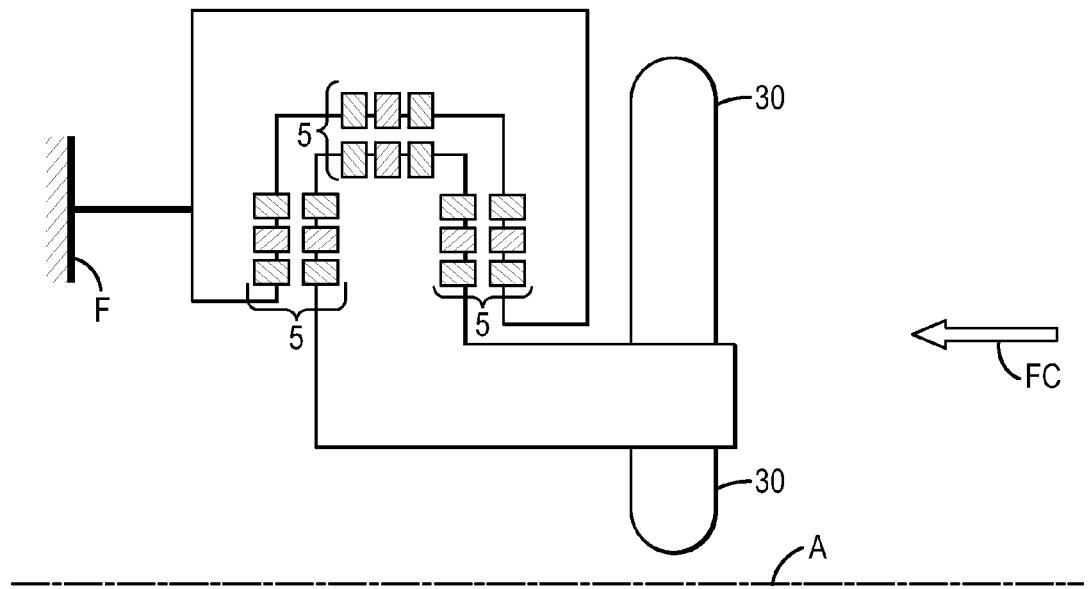
Figure 39:
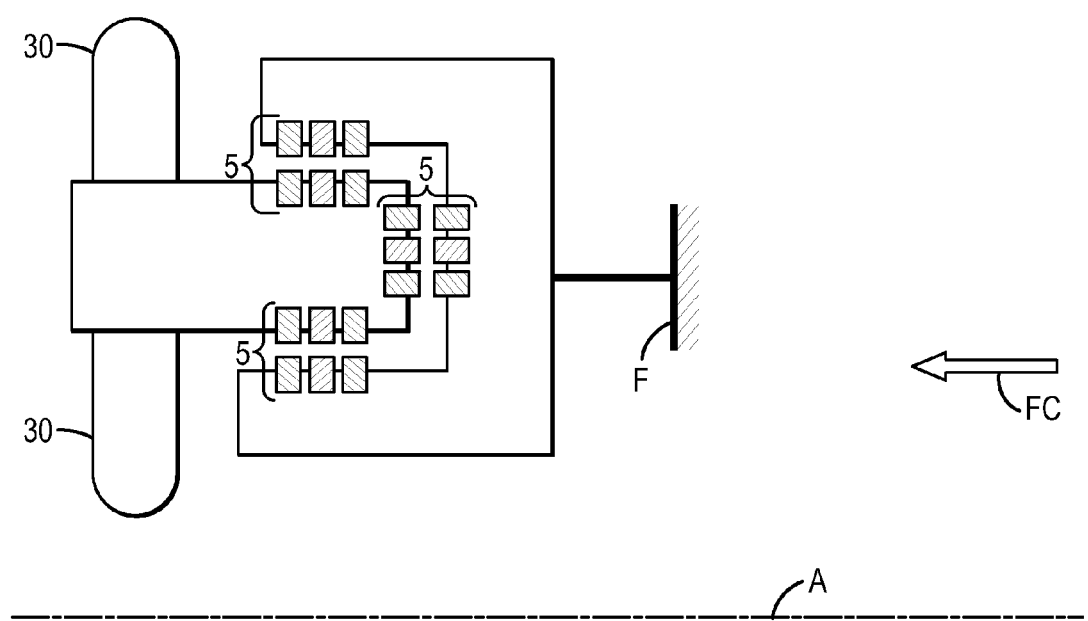
Figure 40:
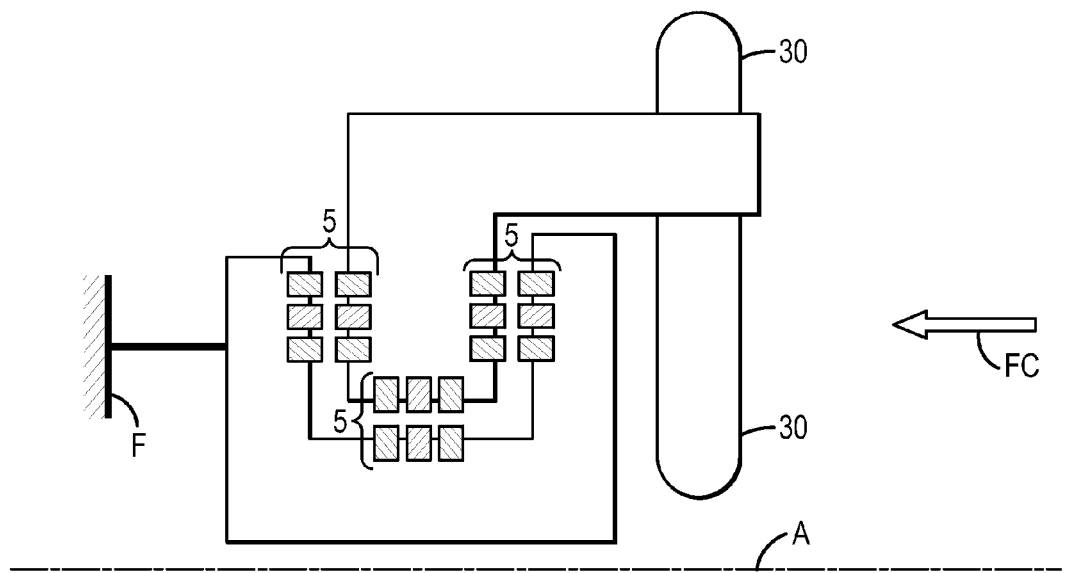
Figure 41:
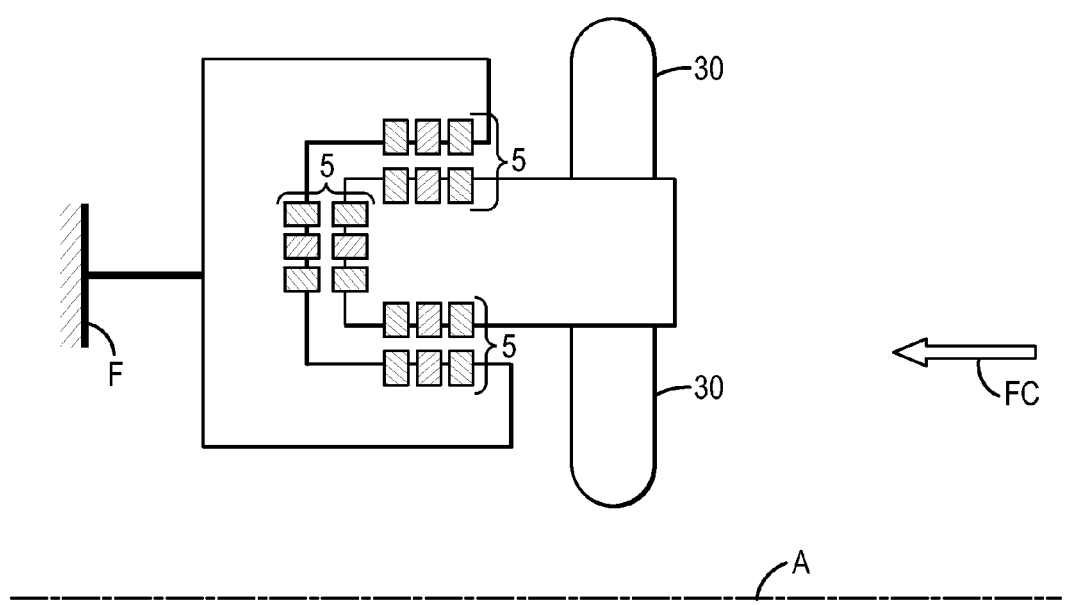
Figure 42:
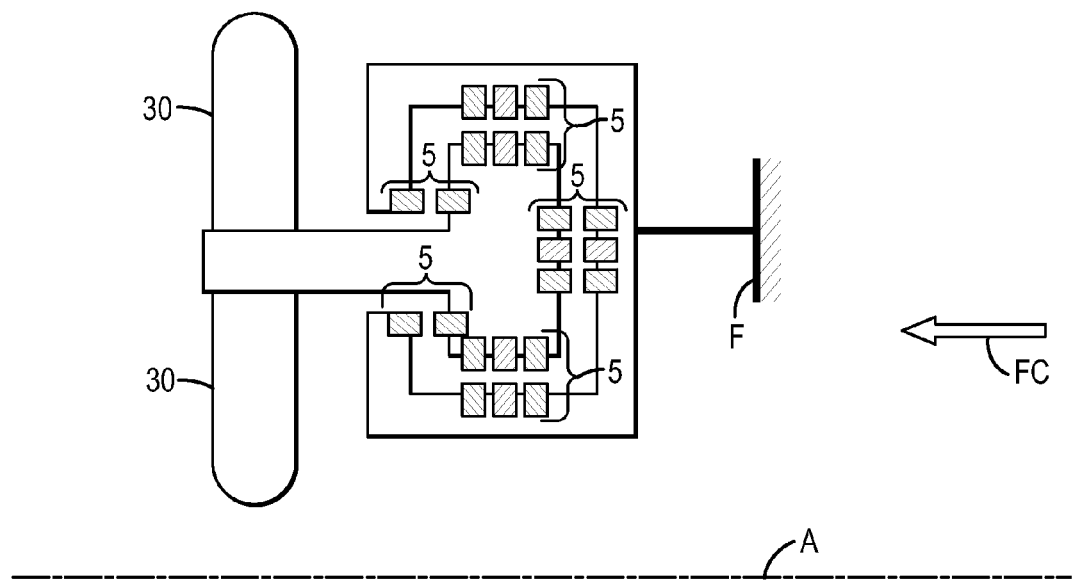
Figure 43:
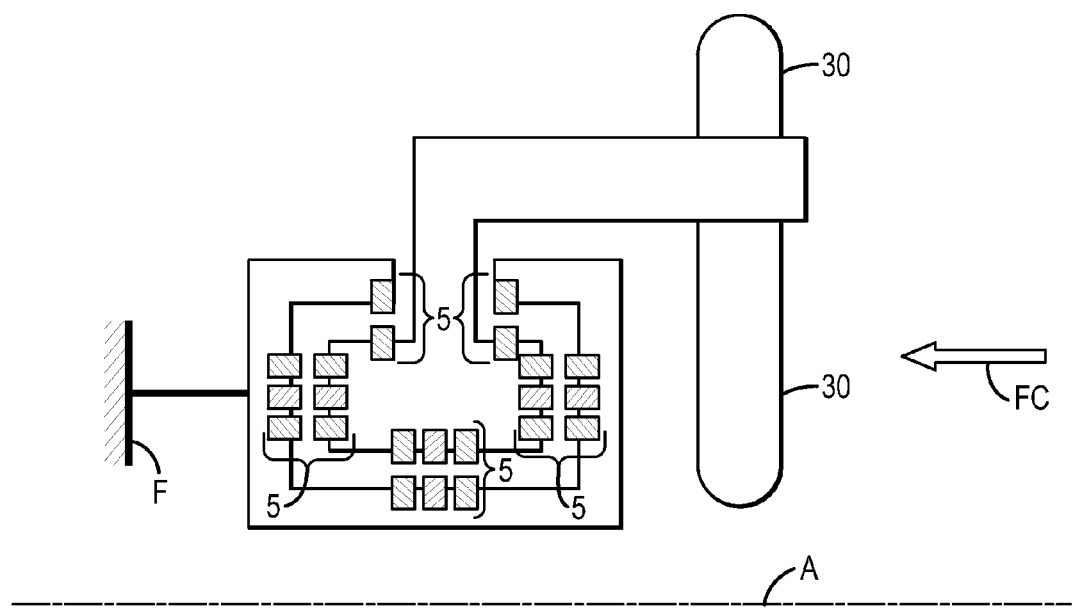
Figure 44:
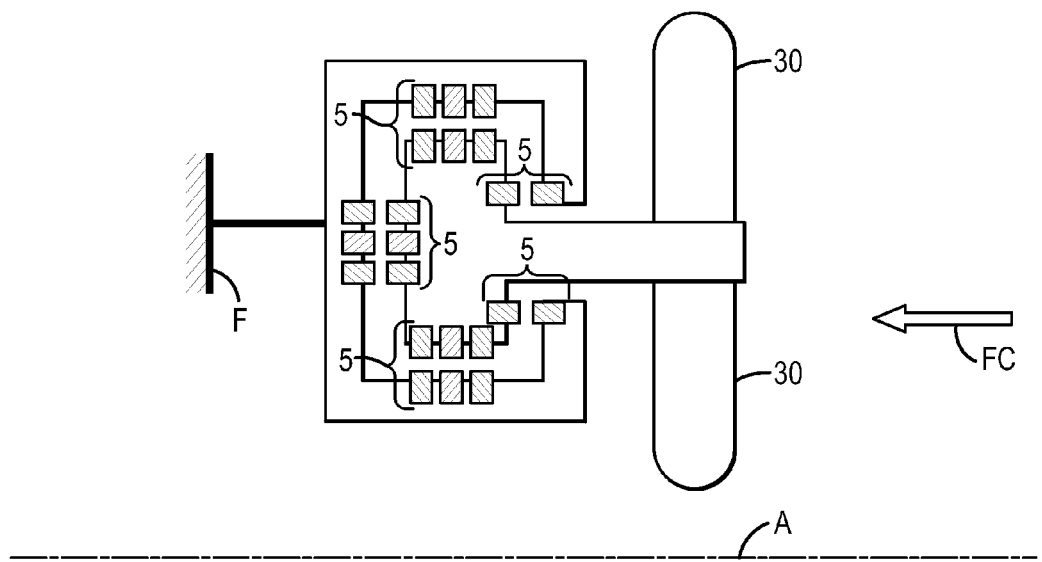
Figure 45:
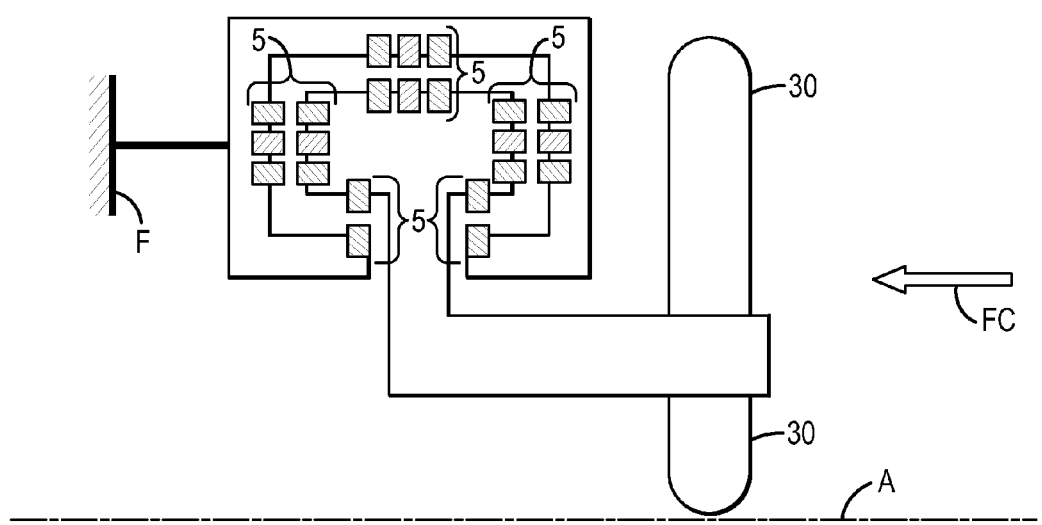
Figure 46:
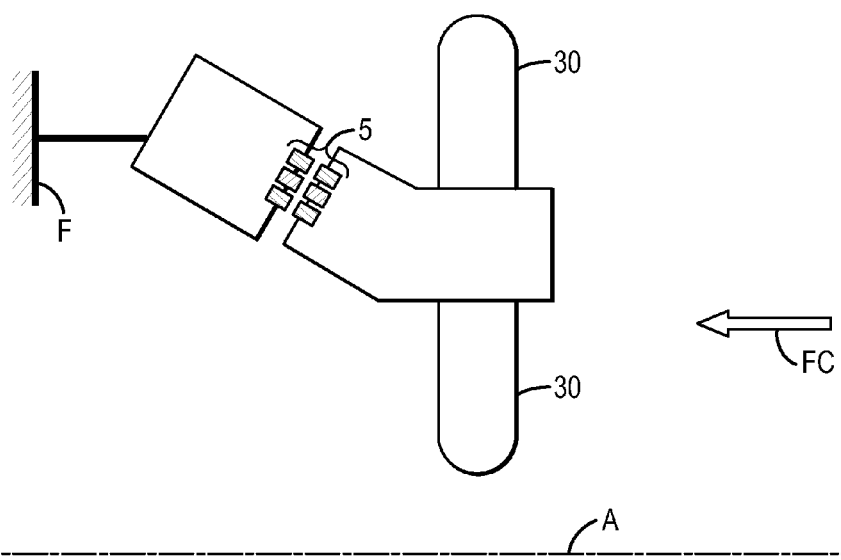
Figure 47:
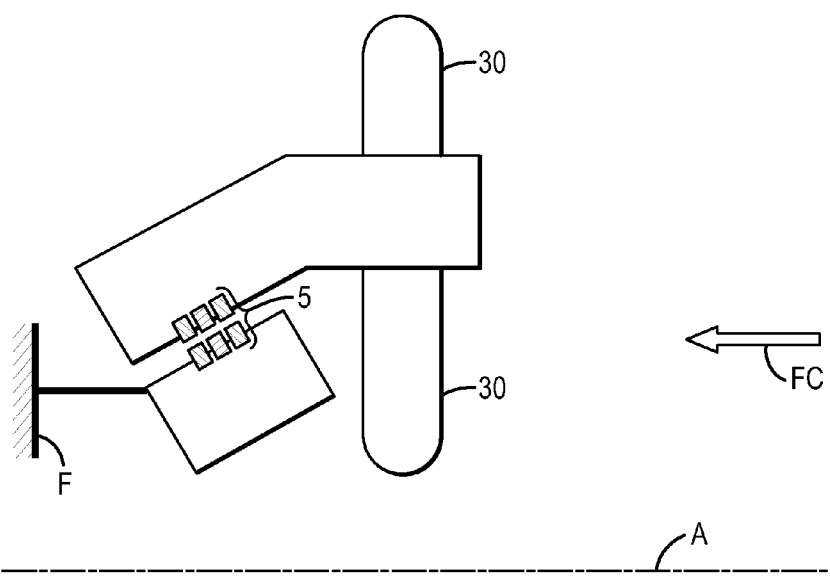
Figure 48:
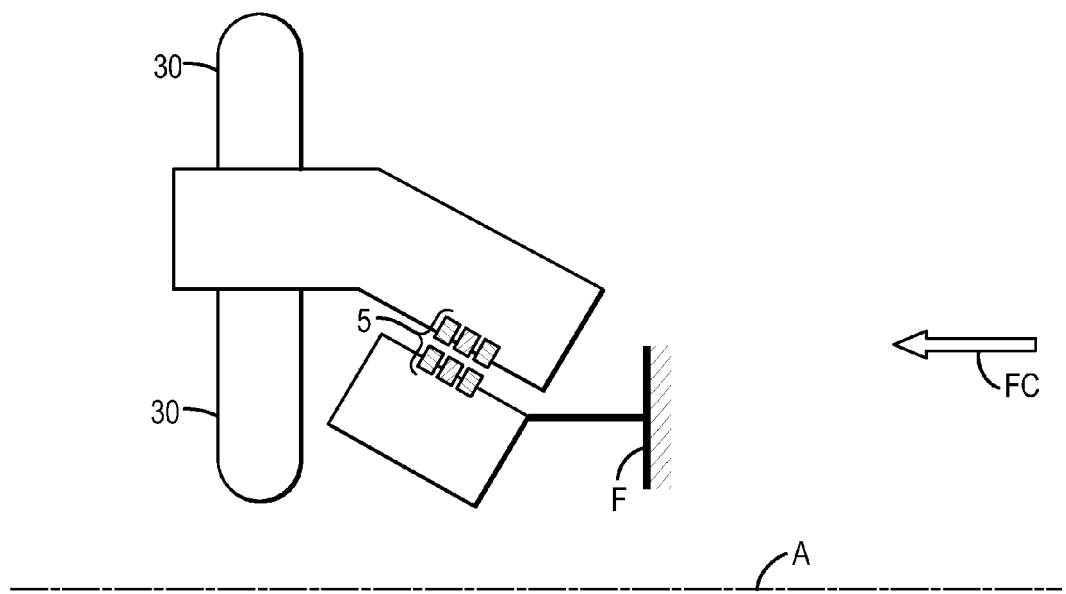
Figure 49:
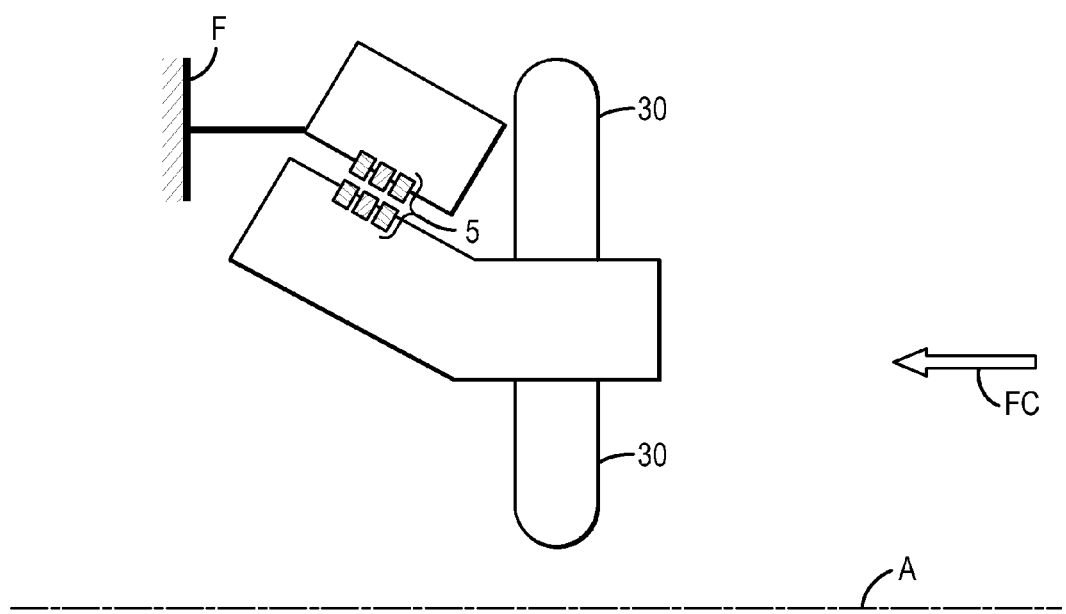
Figure 50:
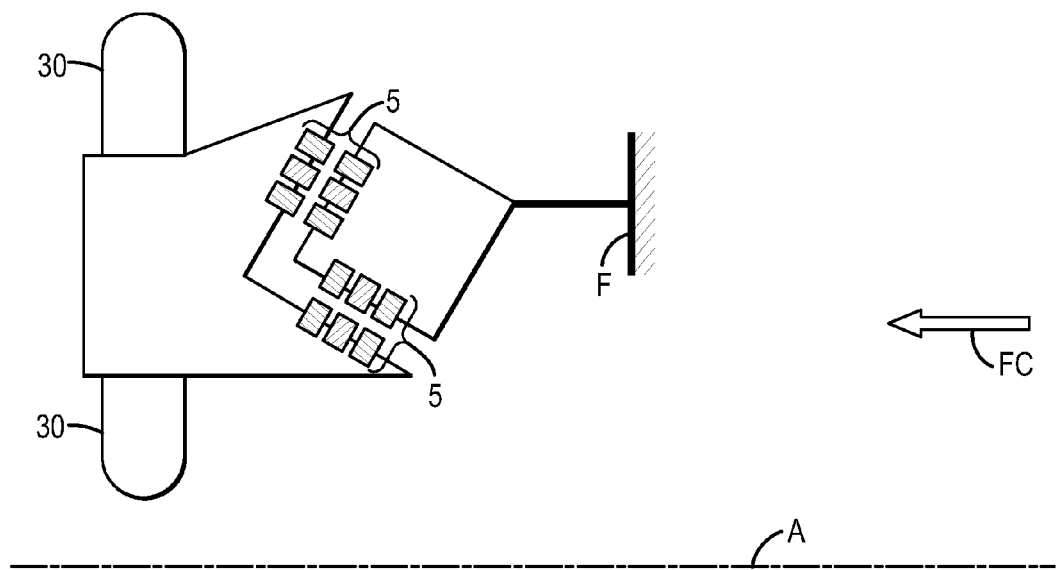
Figure 51:
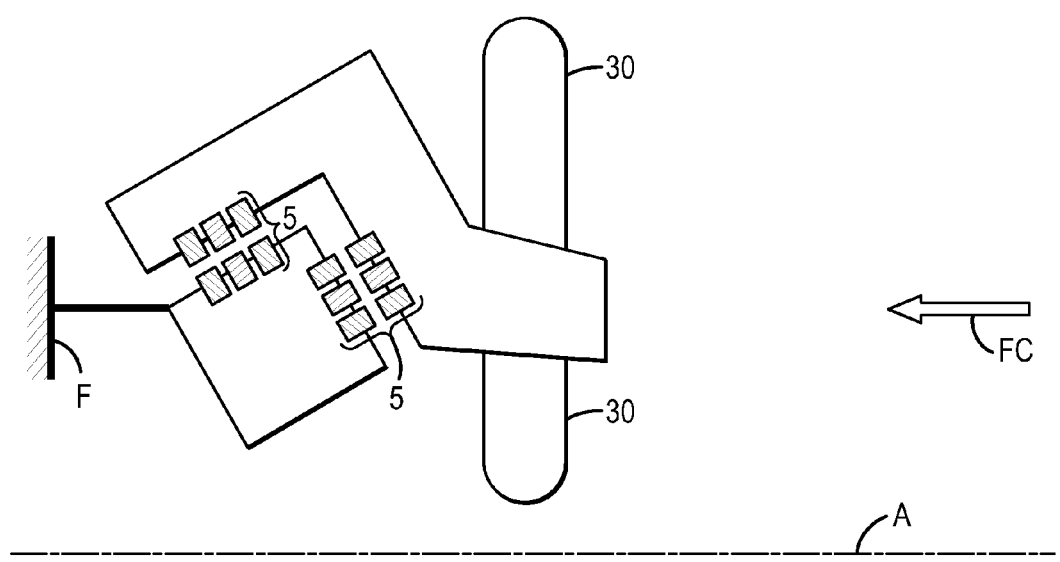
Figure 52:
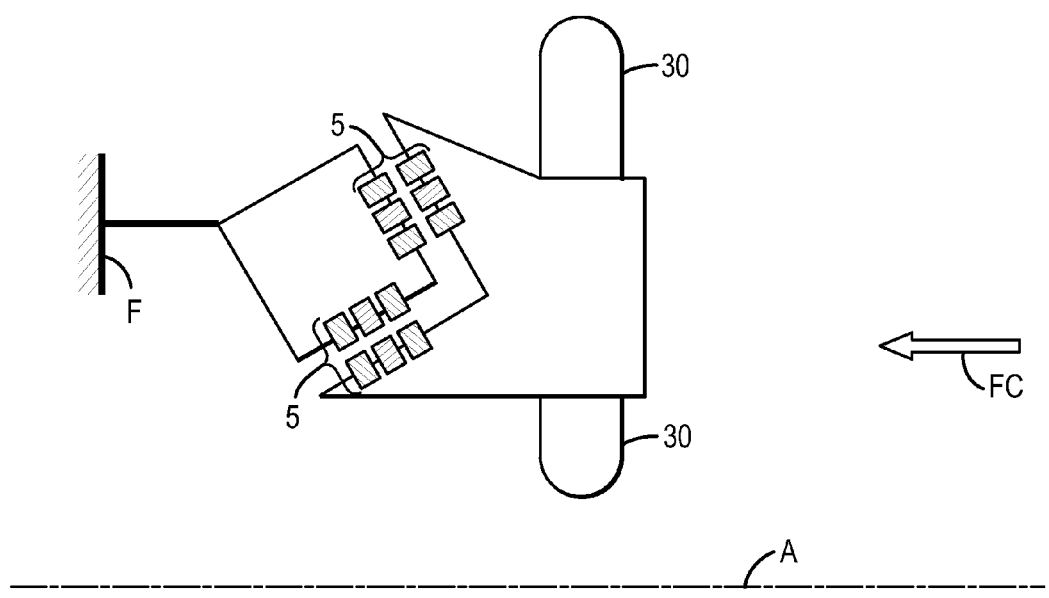
Figure 53:
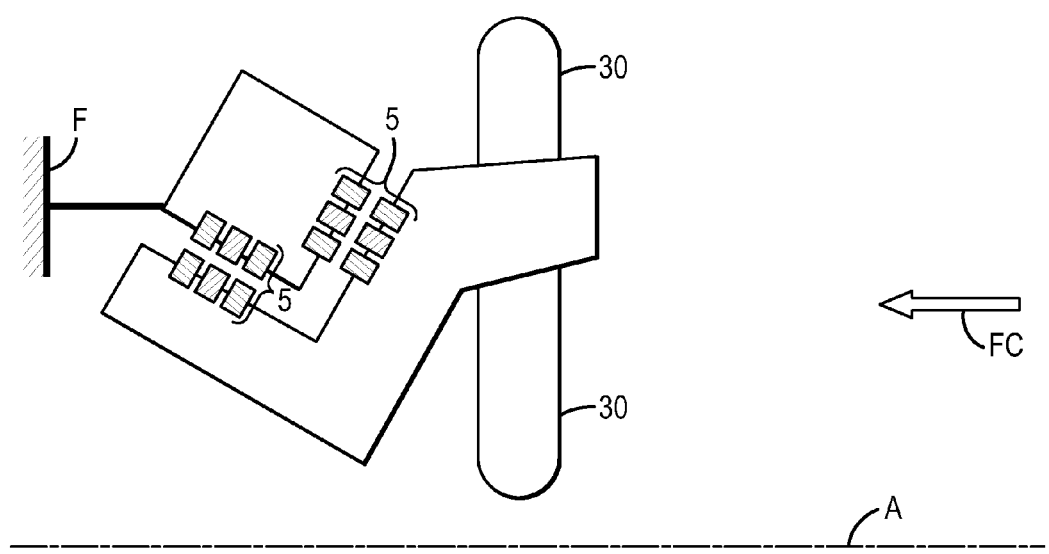
Figure 54:
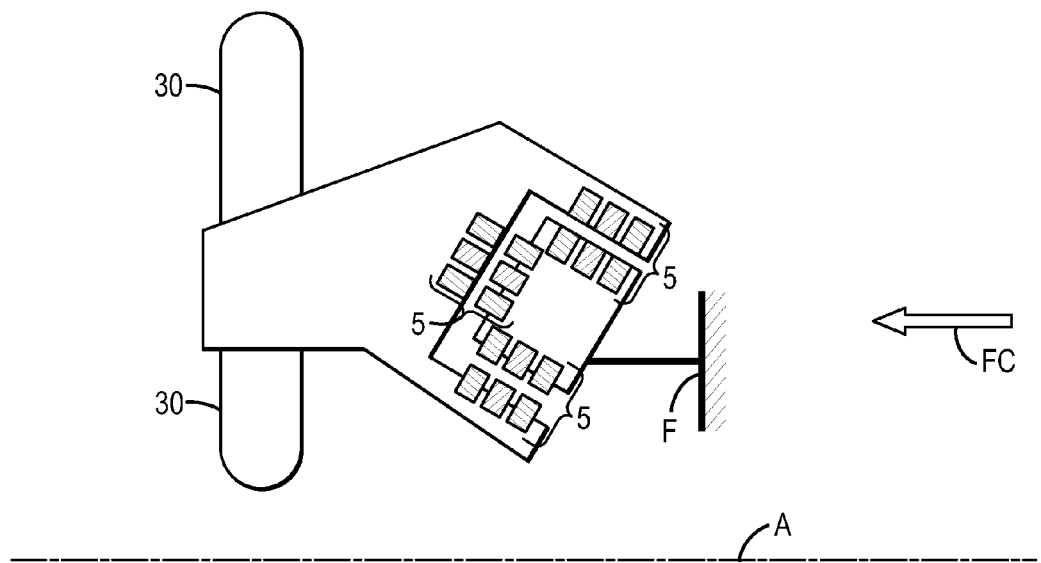
Figure 55:
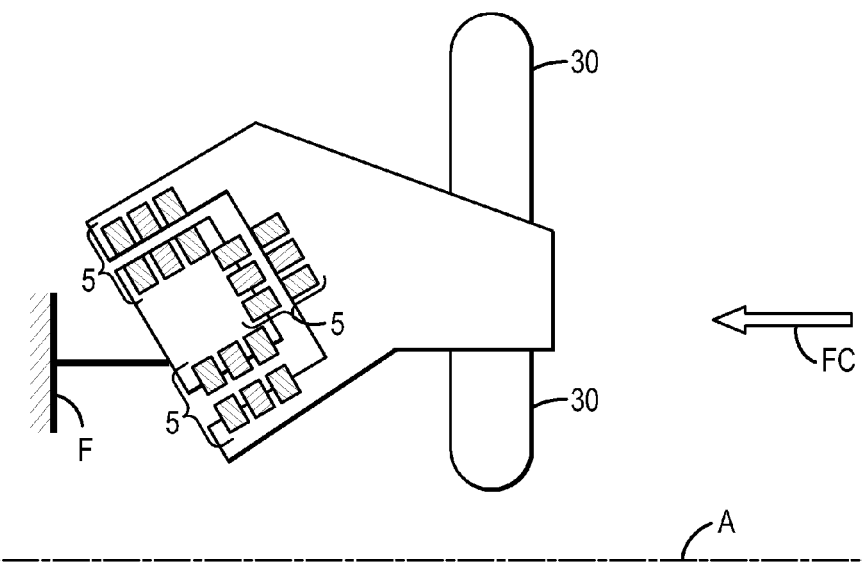
Figure 56:
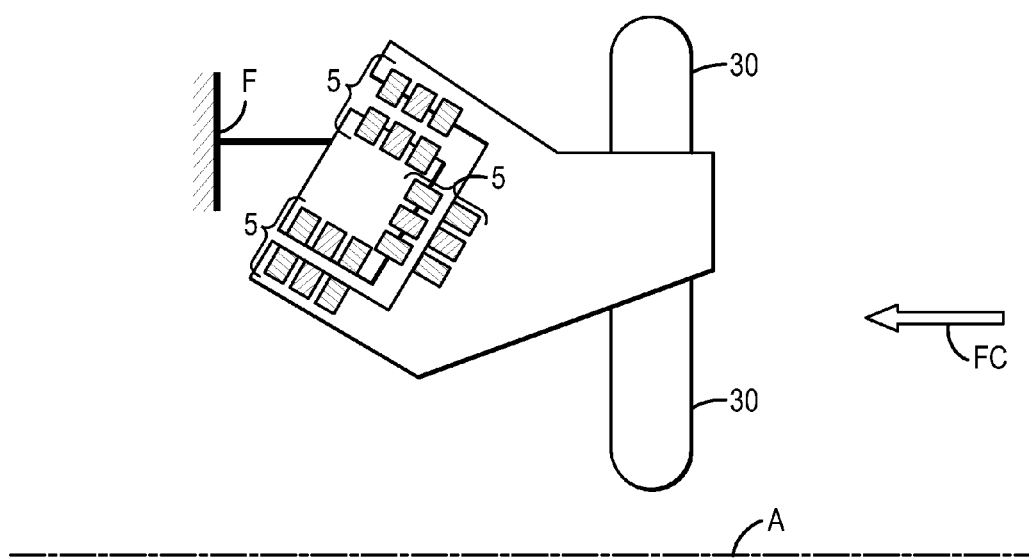
Figure 57:
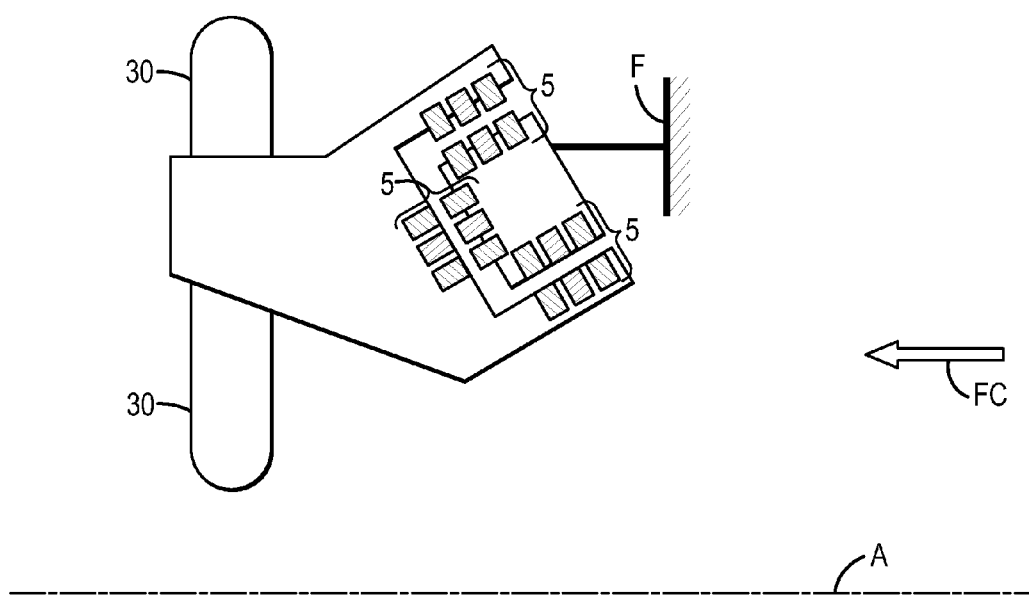
Figure 58:
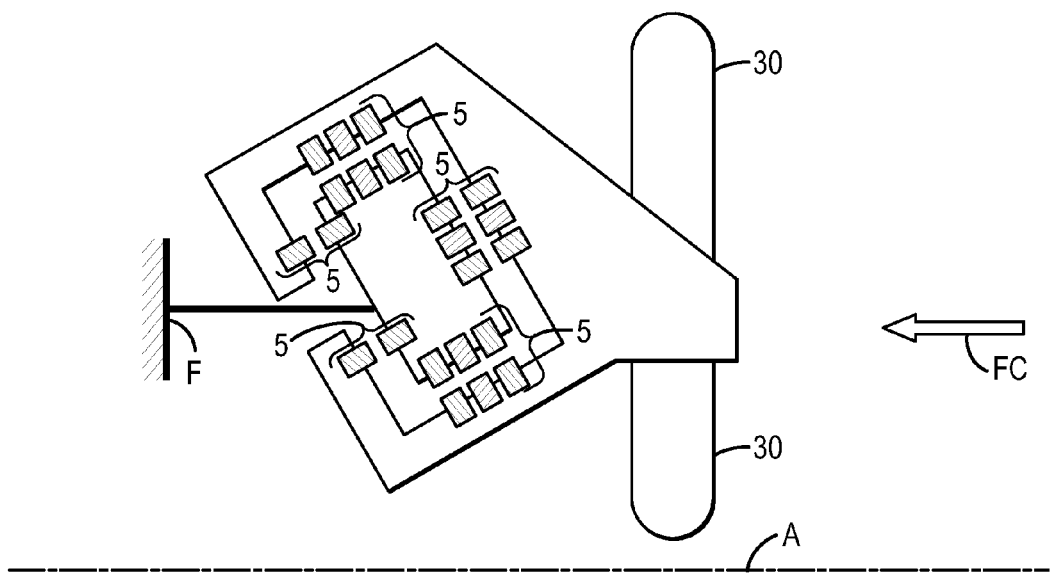
Figure 59:
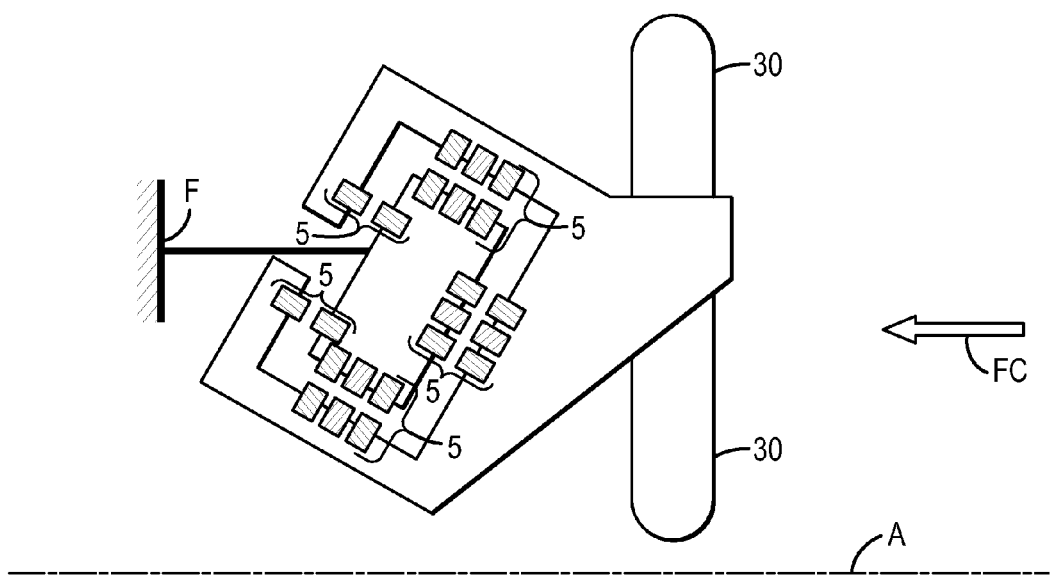
Figure 60:
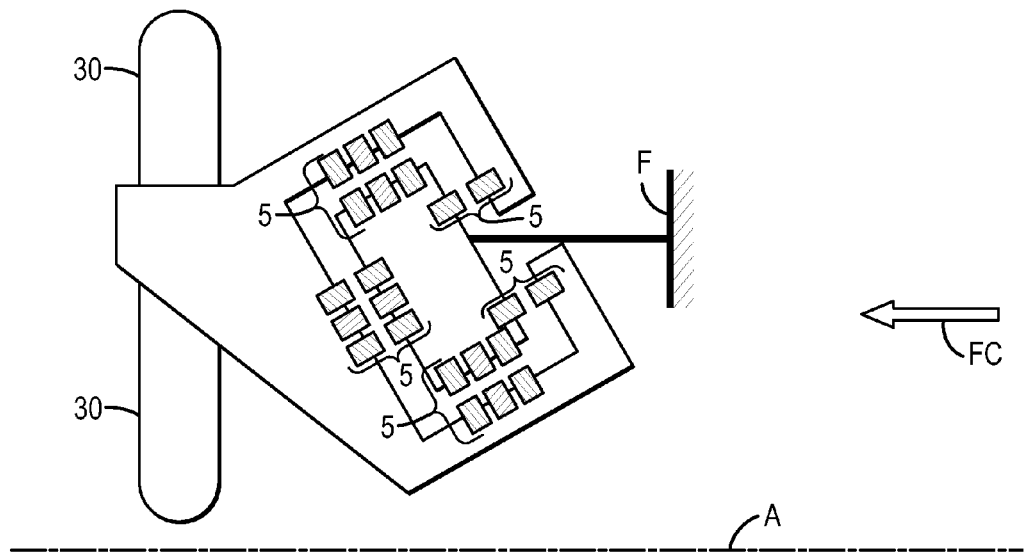
Figure 61:
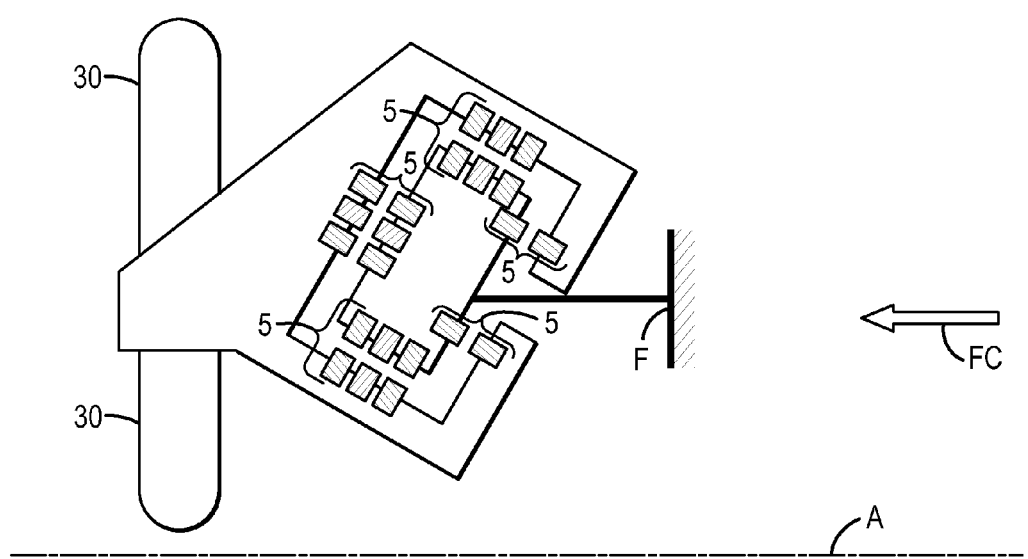
Figure 62:
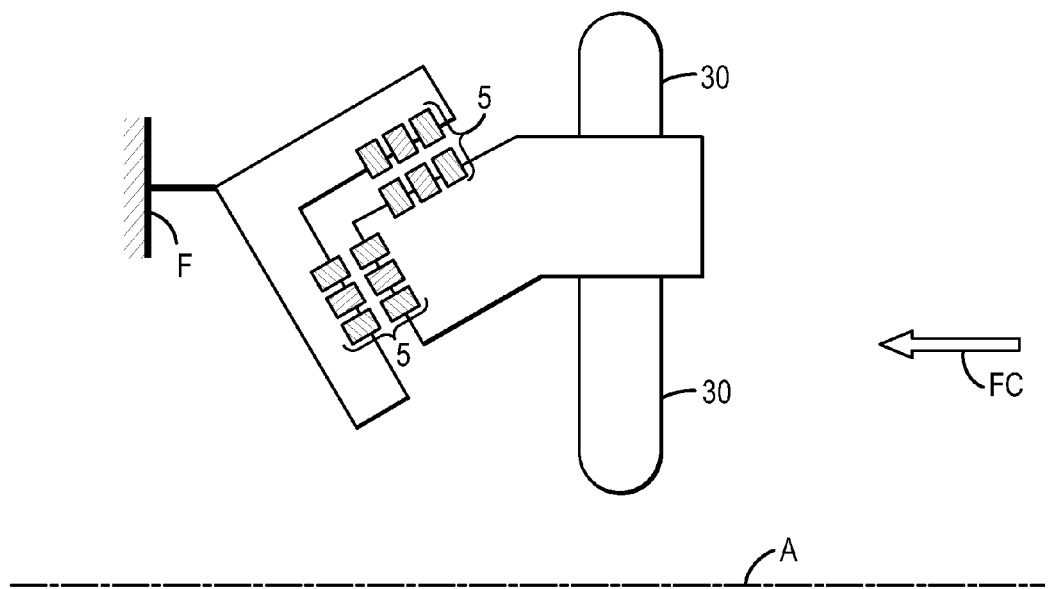
Figure 63:
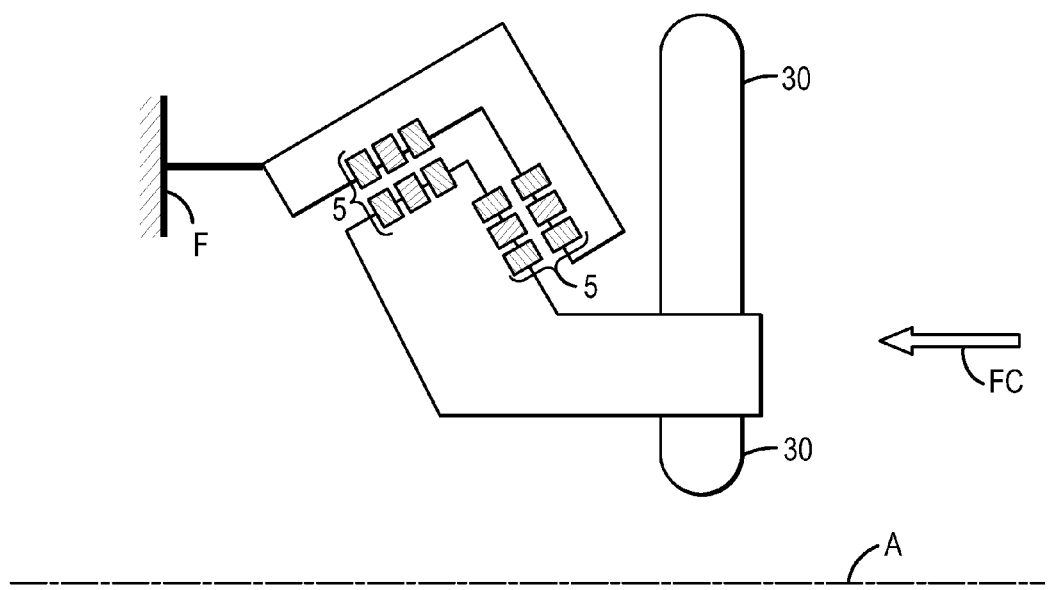
Figure 64:
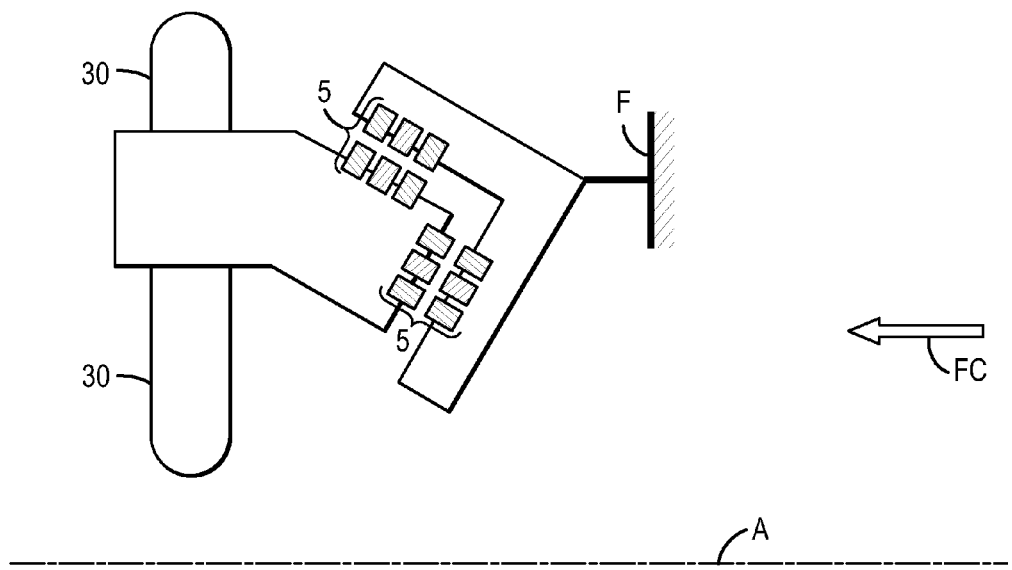
Figure 65:
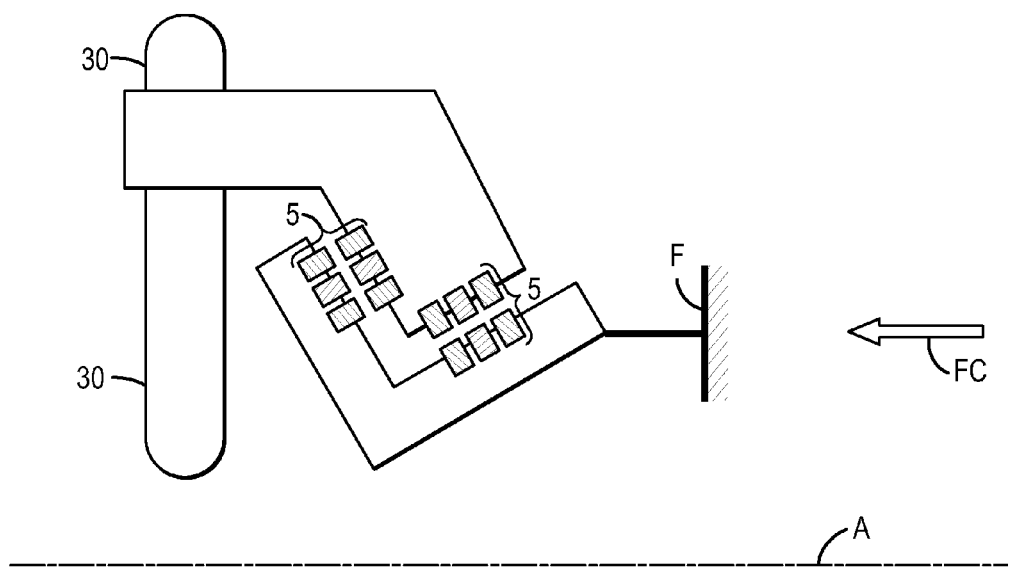
Figure 66:
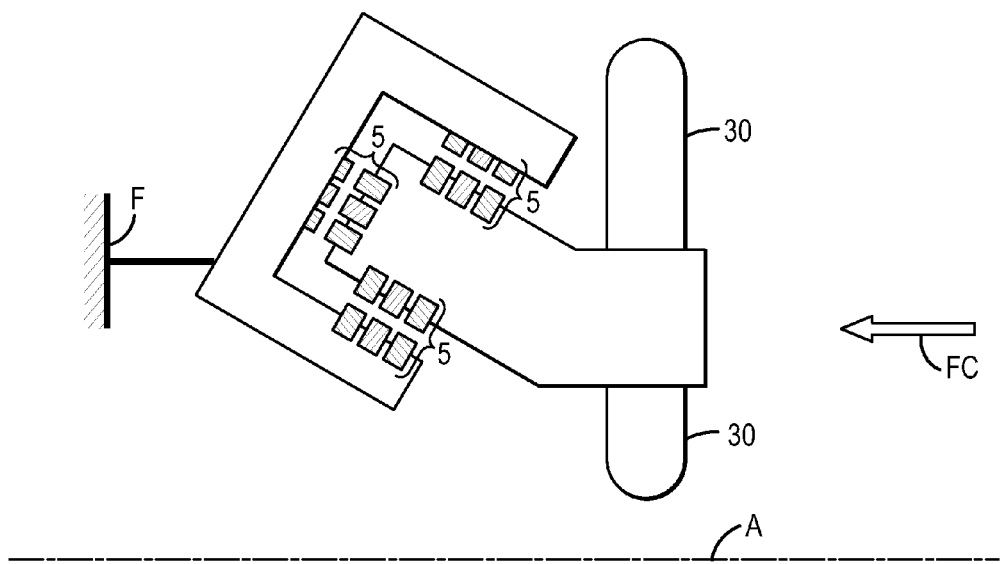
Figure 67:
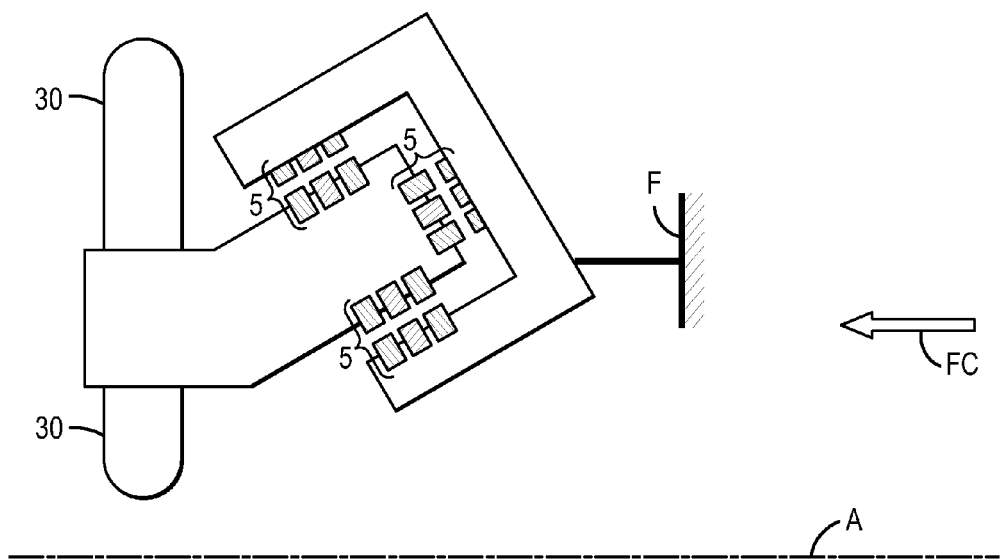
Figure 68:
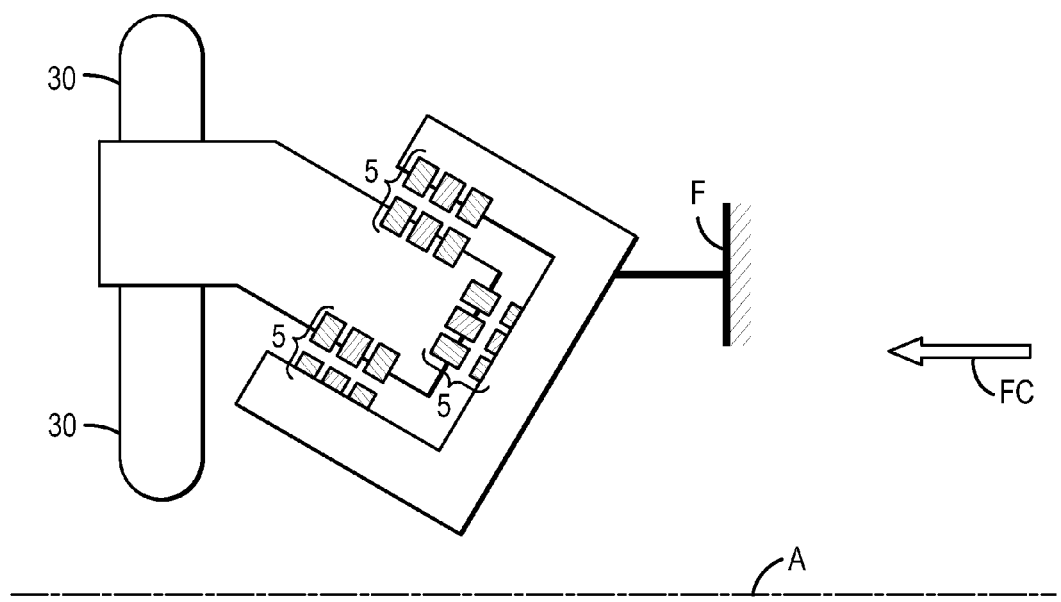
Figure 69:
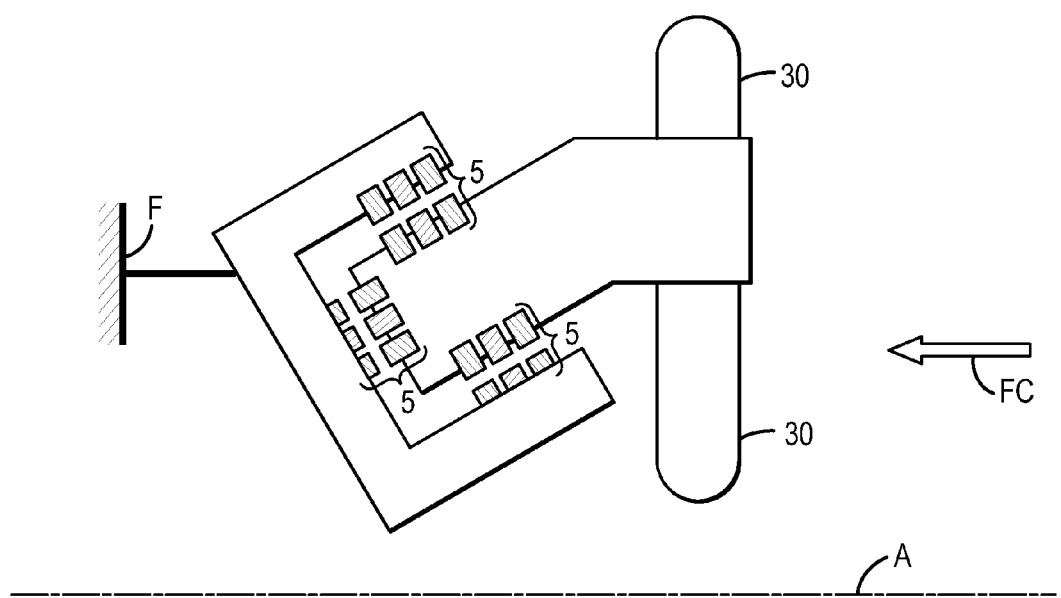
Figure 70:
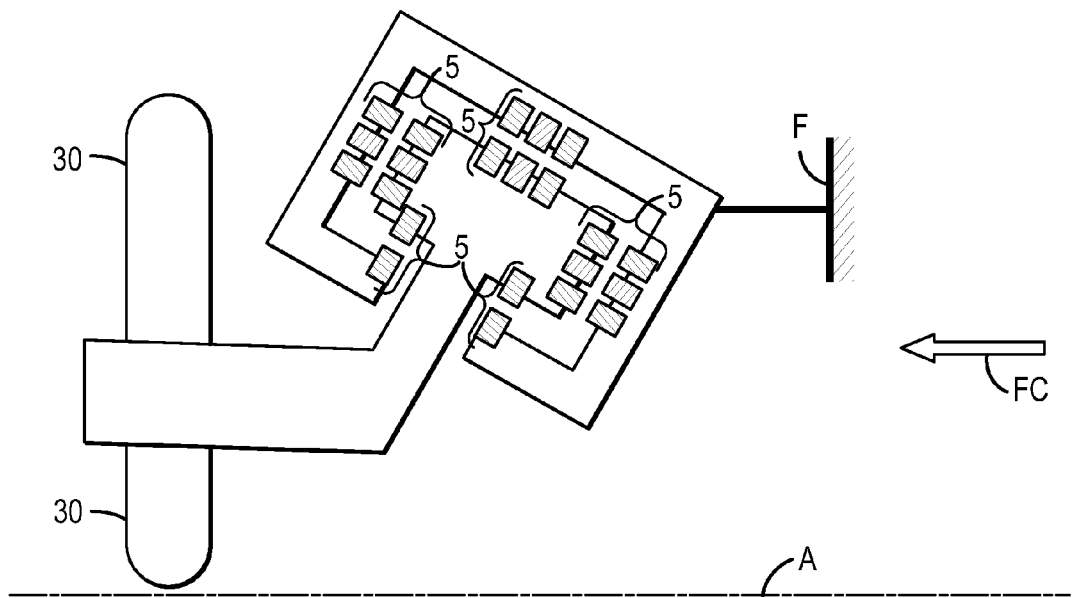
Figure 71:
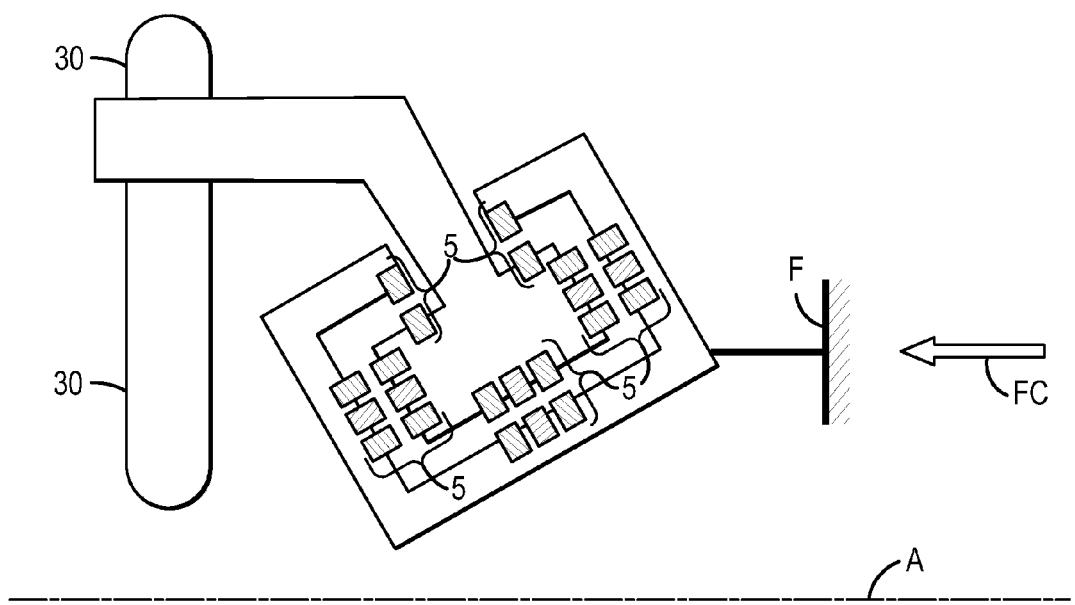
Figure 72:
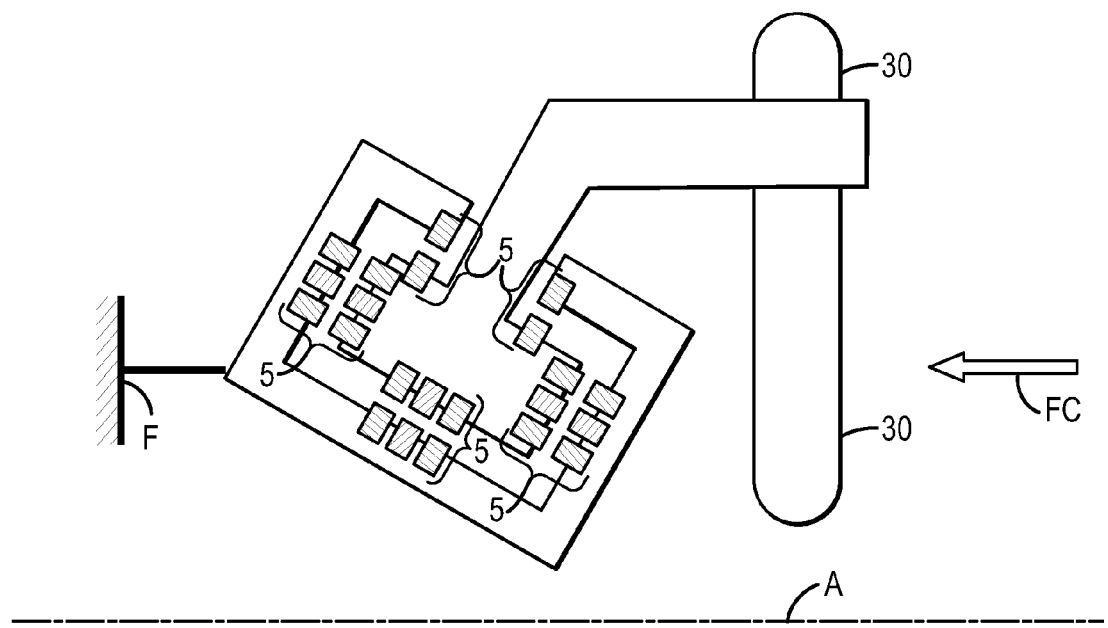
Figure 73:
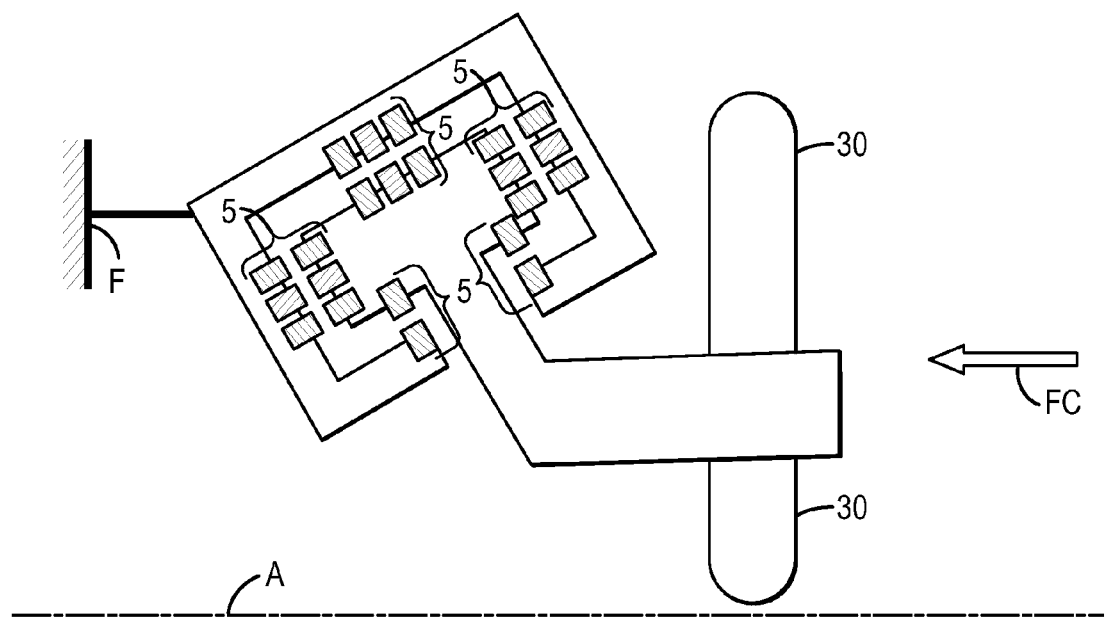

With reference now to FIGS. 18-73, for example, partial cross-sectional views of various additional exemplary configurations of a rotatable structure and a stationary structure with bearing mechanisms that may be utilized in various exemplary energy conversion systems in accordance with the present teachings are illustrated. The partial cross-sectional view shown in each of FIGS. 18-73 is a cross-section of the structures taken in a radial plane through the structures at a ninety degree (90°) azimuth angle (i.e. the same cross-section as that of FIG. 2), with only the upper part of the system depicted. In each of FIGS. 18-73, the axis of rotation of the system is labeled A, and the direction of the fluid current (or component of the fluid current) interacting with the system to cause rotation is indicated as FC. Although the arrow FC in each of FIGS. 18-73 is shown in only one direction, the fluid current can be in the opposite direction as well and still permit the energy conversion system to operate. Thus, the energy conversion systems are configured to operate in both directions of fluid flow, with the direction of rotation of the rotatable structure being altered depending on the direction of the fluid current.

For ease of illustration and description, the stationary structure in each of the embodiments of FIGS. 18-73 is the structure that is connected to the fixed mount identified as F in the figures, and the rotatable structure is the structure that has the blades 30 mounted thereto. Cooperating sets of bearing mechanisms are labeled collectively as 5 for simplicity. Further, each set 5 of bearing mechanisms in FIGS. 18-73 is depicted as an array of plural cooperating bearing elements. Such a configuration is exemplary only and nonlimiting and as discussed above, the bearing mechanisms can have a variety of arrangements, configurations, and numbers. The number of sets of bearing mechanisms also may vary from one to more than one, depending on a variety of factors, including, for example, the size of the structures, the weight of the structures, the shape of the bearing mechanisms, and a variety of other factors those having ordinary skill in the art would appreciate. The arrangement of the sets of bearing mechanisms also may vary based on such factors.

In the views of FIGS. 18-73, the rotatable structure and the stationary structure are in a position relative to each other such that bearing mechanisms associated with each, if having a configuration of discrete, separated structures that do not form a continuous annular structure around the respective loops, are substantially aligned. It will be appreciated that if any of the bearing mechanisms associated with each structure are configured in number and/or arrangement such that a continuous annular structure is formed, the bearing mechanisms are always aligned with each other in the cross-sectional view of FIGS. 18-73.

The various exemplary embodiments depicted in FIGS. 18-73 show numerous configurations for energy conversion systems in accordance with the present teachings, with variations in the number of bearing interfaces between the rotatable and stationary structures, the alignment of the interfaces and the fluid current, the configuration of the interfaces, etc. For example, the embodiments of FIGS. 18-45 depict energy conversion systems in which the direction of the fluid current FC is substantially aligned or substantially perpendicular to the various bearing interfaces (with each bearing interface being represented by each set 5 of bearing mechanisms), whereas the embodiments of FIGS. 46-73 depict energy conversion systems in which the direction of the fluid current FC and the various bearing interfaces are neither aligned nor perpendicular, but instead are at an angle other than perpendicular to the fluid current FC direction. Further, the energy conversion system embodiments of FIGS. 18-21 and 46-49 have one bearing interface, the embodiments of FIGS. 22-25, 34-37, 50-53, and 62-65 have two bearing interfaces, the embodiments of FIGS. 26-29, 38-41, 54-57, and 66-69 have three bearing interfaces, and the embodiments of FIGS. 30-33, 42-45, 58-61, and 70-73 have four bearing interfaces.

In various exemplary embodiments in which one of the structures has a cross-section that wraps around at least a portion of the cross-section of the other structure (such as, e.g., in embodiments having two or more bearing interfaces), the arrangement of the sets 5 of bearing mechanisms may provide differing bearing force directions (e.g., in both radial and axial directions) that may provide greater stability to maintain the spacing between the structures.

The exemplary embodiments of FIGS. 18-73 are non-limiting and those having ordinary skill in the art will appreciate that modifications may be made to the arrangements and configurations depicted without departing from the scope of the present teachings.

In various exemplary embodiments, one or more of the sets of cooperating bearing mechanisms may be replaced with a magnet/conductive coil pair configured to generate electricity by movement of the rotatable structure relative to the stationary structure. Thus, for example, in the exemplary embodiments of FIGS. 18-73, at least one of the sets 5 of bearing mechanisms depicted may be replaced by an electricity generation mechanism in the form of a magnet/conductive coil pair; alternatively or in addition, one or more of the bearing mechanisms in each array forming the sets 5 may be a magnet/conductive coil pair. This is true regardless of the type of the remaining bearing mechanisms (e.g., whether those sets comprise magnetic bearing mechanisms and/or fluid bearing mechanisms) that are utilized. In the case where one or more sets of bearing mechanisms are configured to achieve magnetic levitation, such sets of bearing mechanisms may be configured to achieve both magnetic levitation and electricity generation.

Further, in a manner similar to that described above, one or more sets of bearing mechanisms 115 and 125 depicted in FIG. 1 may be replaced with or may include a magnet/conductive coil pair configured to generate electricity upon relative motion thereof resulting from the relative motion of the rotatable structure 110 and the stationary structure 120. Various other mechanisms also may be used to convert to electricity or other useful forms of energy the rotational motion of the rotatable structures relative to the stationary structures in accordance with various exemplary embodiments of the present teachings. Such mechanisms may include, but are not limited to, the use of hydraulic pumps, rotating drive shafts, etc. Reference is made to U.S. Pat. No. 7,453,166, incorporated by reference herein, for examples of various techniques that may be used to convert the rotational movement of a structure to other useful forms of energy. Ordinarily skilled artisans would understand how to modify the various techniques disclosed in U.S. Pat. No. 7,453,166 to adapt those techniques for use with the energy conversion systems in accordance with the present teachings.

In various exemplary embodiments, in addition to bearing mechanisms configured to achieve magnetic levitation and/or as fluid bearing mechanisms, the present teachings contemplate the use of additional bearing mechanisms, including but not limited to, for example, rollers, low-friction pads (e.g., Teflon pads), etc. Such bearing mechanisms may be used to provide constraint (or additional constraint) in one or both of the radial direction and the axial direction of the energy conversion systems to stabilize the relative position and/or movement of the rotational structure and the stationary structure.

As shown with reference to FIGS. 4-17, for example, in at least one exemplary embodiment, roller bearing mechanisms may be used to provide a radial bearing for the system and magnetic bearing mechanisms (e.g., magnetic levitation bearing mechanisms) may be used to provide an axial bearing for the system. In various additional exemplary embodiments, magnetic bearing mechanisms may be used to provide a radial bearing for the system and roller bearing mechanisms may be used to provide an axial bearing for the system. In various further embodiments, when using dynamic magnetic bearing mechanisms and/or hydrodynamic bearing mechanisms, additional bearing mechanisms (e.g., roller bearing mechanisms) may be utilized until the rotatable structure reaches a speed sufficient for the dynamic magnetic bearing mechanisms and/or the hydrodynamic bearing mechanisms to take effect and bear the applicable load of the system. Of course various combinations of bearing mechanism types may be used and arranged depending on the desired application and those of ordinary skill in the art would understand how to select the same to achieve a desired effect.

In various exemplary embodiments, energy conversion systems of the present teachings include blade members that extend both radially outwardly and radially inwardly from the rotatable structure respectively away from and toward a center of the rotatable structure. However, energy conversion systems may include blade members that extend only radially outwardly or only radially inwardly. In embodiments wherein the blade members extend both radially outwardly and radially inwardly, the blade members may comprise integral structures or separate structures mounted to the rotatable structure. In various exemplary embodiments, the blade member extending radially outwardly and the blade member extending radially inwardly may be asymmetrical about the rotatable structure. For example, a length of the blade member extending radially outwardly may be longer than a length of the blade member extending radially inwardly; alternatively, the blade members extending radially outward and the radial inward may be symmetrical about the rotatable structure. The length of blade members extending radially inwardly may be chosen such that those blade members minimize interference with the fluid flowing through the center of the energy conversion system.

In various exemplary embodiments, the blade members may be fixed or adjustable relative to the rotatable structure. For example, for adjustable blade members, the blade members may be rotatable about their longitudinal axis so as to adjust an angle of the blade member surface relative to the fluid flow. Reference is made to U.S. Pat. No. 7,453,166, incorporated by reference herein, for further details relating to adjustable blade members.

Those having ordinary skill in the art will recognize that various modifications may be made to the configuration and methodology of the exemplary embodiments disclosed herein without departing from the scope of the present teachings. By way of example only, the cross-sectional shape and relative sizes of the rotatable structures and the stationary structures may be modified and a variety of cross-sectional configurations may be utilized, including, for example, circular or oval cross-sectional shapes.

Additionally, although many of the exemplary embodiments shown and described above include sets of cooperating bearing mechanisms with one element in the set being positioned on the stationary structure and the other being positioned on the rotatable structure, in alternative embodiments, one or more bearing elements may be associated only with one of the structures. For example, magnetic elements may be mounted to the stationary structure and the rotatable structure may be made of a ferrous material (or vice versa) such that the attraction force between the magnetic elements and the ferrous material could be sufficient to center and support the structures relative to each other. Likewise, for hydrostatic or hydrodynamic bearing mechanisms, bearing elements with a fluidized pressure source may be provided on only one of the structures and be sufficient to support and center the other structure during relative rotation of the structures. Those having ordinary skill in the art would understand how to modify the exemplary embodiments depicted in the figures such that the bearing mechanisms associated with only one of the stationary or the rotatable structures.

Moreover, although the orientation of the energy conversion systems in the various exemplary embodiments described herein is generally within a substantially vertical plane, those ordinarily skilled in the art will appreciate that modifications may be made to operate energy conversion systems in accordance with the present teachings in any orientation.

Those having ordinary skill in the art also will appreciate that various features disclosed with respect to one exemplary embodiment herein may be used in combination with other exemplary embodiments with appropriate modifications, even if such combinations are not explicitly disclosed herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the systems and methods of the present teachings without departing from the scope the present teachings and appended claims. Other embodiments of the disclosure will be apparent to those skilled in the art from consideration of the specification and practice of the teachings disclosed herein. It is intended that the specification and examples be considered as exemplary only.

What is claimed is:

1. An energy conversion system comprising:
    a stationary structure;
    a rotatable structure configured to rotate relative to the stationary structure, the rotatable structure defining an axis of rotation;
    at least one blade member mounted to and extending radially outward from the rotatable structure, the at least one blade member being configured to interact with fluid currents flowing in a direction substantially parallel to the axis of rotation to cause the rotatable structure to rotate about the axis of rotation; and
    at least one magnetic bearing mechanism disposed to provide a magnetic axial restoring force between the rotatable structure and the stationary structure as the rotatable structure rotates about the stationary structure, the at least one magnetic bearing mechanism comprising a first magnetic bearing mechanism component disposed on the rotatable structure and a second magnetic bearing mechanism component disposed on the stationary structure,
    wherein axial displacement of the first and second magnetic bearing mechanism components with respect to each other, during rotation of the rotatable structure relative to the stationary structure, generates a magnetic field between the magnetic bearing mechanism components, the magnetic field providing the magnetic axial restoring force to counteract the flow of the fluid currents,
    wherein the system is configured to convert rotation of the rotatable structure to at least one of electricity and hydrogen production.

2. The energy conversion system of claim 1, further comprising at least one additional bearing mechanism chosen from at least one of hydraulic bearing mechanisms and roller bearing mechanisms.

3. The energy conversion system of claim 1, wherein the first magnetic bearing mechanism component comprises an electrical conductor and the second magnetic bearing mechanism component comprises a magnet array.

4. The energy conversion system of claim 1, wherein each of the first and second magnetic bearing mechanism components comprises a plurality of magnets substantially arranged in a Halbach type array.

5. The energy conversion system of claim 1, wherein the displacement of the first and second magnetic bearing mechanism components creates radial air gap fields to generate an alignment force between the first and second magnetic bearing mechanism components.

6. A method of converting fluid current movement to another form of energy, the method comprising:
    placing an energy conversion system in a fluid body, the energy conversion system comprising:
        a stationary structure;
        a rotatable structure configured to rotate relative to the stationary structure, the rotatable structure defining an axis of rotation; and
        at least one magnetic bearing mechanism comprising a first magnetic bearing mechanism component disposed on the rotatable structure and a second magnetic bearing mechanism component disposed on the stationary structure;
    orienting the energy conversion system in the fluid body so that fluid currents in the fluid body flow in a direction substantially parallel to the axis of rotation and cause rotation of the rotatable structure, wherein, during rotation of the rotatable structure, axial displacement of the first magnetic bearing mechanism component with respect to the second magnetic bearing mechanism component generates a magnetic field between the magnetic bearing mechanism components, the magnetic field providing a magnetic axial restoring force between the rotatable structure and the stationary structure to counteract the flow of the fluid currents.

7. The method of claim 6, wherein magnetic bearing mechanism components comprises a plurality of magnets arranged in a Halbach type array.

8. The method of claim 6, wherein the displacement of the first and second magnetic bearing mechanism components creates radial air gap fields to generate an alignment force between the first and second magnetic bearing mechanism components.

9. The method of claim 6, wherein the energy conversion system further comprises at least one blade member mounted to and extending radially outward from the rotatable structure, and wherein the fluid currents interact with the at least one blade member to cause rotation of the rotatable structure.

10. The method of claim 6, wherein placing the energy conversion system in the fluid body comprises placing the energy conversion system in a river, ocean, or lake.

11. The system of claim 1, wherein the at least one blade member is configured to interact with tidal currents.

12. The system of claim 1, wherein the at least one blade member is configured to interact with currents in a river, ocean, or lake.

13. The system of claim 1, wherein the energy conversion system is an open-center conversion system.

14. The system of claim 1, wherein the rotatable structure is rotatably mounted around an outer periphery of the stationary structure.

15. The method of claim 6, wherein the first magnetic bearing mechanism component comprises an electrical conductor and the second magnetic bearing mechanism component comprises a plurality of magnets arranged in a Halbach type array.

16. The method of claim 15, wherein the electrical conductor comprises a plurality of electrical conductors mounted intermittently on the rotatable structure, and wherein a coil is mounted on the stationary structure, the method further comprising generating electricity by moving the electrical conductors relative to the coil during rotation of the rotatable structure.

17. The system of claim 3, wherein the electrical conductor comprises a steel C-core or a steel yoke.

18. The system of claim 1, wherein the rotatable structure and the stationary structure are closed-looped structures.

19. The system of claim 1, wherein the axial displacement between the first magnetic bearing mechanism component and the second magnetic bearing mechanism component occurs in response to forces exerted by the fluid currents.

20. The method of claim 6, wherein forces exerted by the fluid currents cause the axial displacement between the first magnetic bearing mechanism component and the second magnetic bearing mechanism component.

\* \* \* \* \*